(12) United States Patent
Dinan et al.

(10) Patent No.: US 11,178,678 B2
(45) Date of Patent: *Nov. 16, 2021

(54) V2X SUPPORTED BAND COMBINATION SEQUENCE OF A WIRELESS DEVICE

(71) Applicant: Ofinno, LLC, Reston, VA (US)

(72) Inventors: Esmael Hejazi Dinan, McLean, VA (US); Alireza Babaei, Fairfax, VA (US)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,726

(22) Filed: Dec. 18, 2019

(65) Prior Publication Data

US 2020/0128572 A1    Apr. 23, 2020

Related U.S. Application Data

(63) Continuation of application No. 15/674,286, filed on Aug. 10, 2017, now Pat. No. 10,517,110.
(Continued)

(51) Int. Cl.
*H04W 4/00* (2018.01)
*H04W 72/12* (2009.01)
(Continued)

(52) U.S. Cl.
CPC ......... *H04W 72/1263* (2013.01); *H04W 4/40* (2018.02); *H04W 4/44* (2018.02);
(Continued)

(58) Field of Classification Search
CPC ........... H04W 72/042; H04W 72/0446; H04W 72/14; H04W 72/0413; H04W 76/11;
(Continued)

(56) References Cited

U.S. PATENT DOCUMENTS 10,470,207 B2    11/2019   Jiao et al.
10,517,110 B2 *  12/2019   Dinan ............... H04W 72/1263
(Continued)

FOREIGN PATENT DOCUMENTS

EP      3179802 A1     6/2017
WO   2016021995 A1     2/2016
(Continued)

OTHER PUBLICATIONS

3GPP TS 36.213 V13.2.0 (Jun. 2016), Technical Specification, 3rd Generation Partnership Project; Technical Specification Group Radio Access Network; Evolved Universal Terrestrial Radio Access (E-UTRA);Physical layer procedures (Release 13).
(Continued)

*Primary Examiner* — Khalid W Shaheed
(74) *Attorney, Agent, or Firm* — Arch & Lake LLP

(57) ABSTRACT

A base station receives a first sequence of capability parameters from a wireless device. Each of the first sequence of capability parameters indicate whether a vehicle-to-everything (V2X) transmission is supported in a corresponding frequency band combination of a second sequence of frequency band combinations of the wireless device. The corresponding frequency band combination comprises one or more frequency band identifiers each indicating a specific frequency band. V2X configuration parameters of a cell operating in one of the frequency band combinations on which the wireless device supports the V2X transmission is transmitted.

20 Claims, 30 Drawing Sheets

Example UE V2X capabilities

A supported V2X band combination:

| V2X band identifier 1 | Configuration parameter(s) for V2X band identifier 1 | Whether at least one V2X configuration is supported for band identifier 1 |
|---|---|---|
| V2X band identifier 2 | Configuration parameter(s) for V2X band identifier 2 | Whether at least one V2X configuration is supported for band identifier 2 |
| ⋮ | ⋮ | ⋮ |
| V2X band identifier k | Configuration parameter(s) for V2X band identifier k | Whether at least one V2X configuration is supported for band identifier k |

Related U.S. Application Data

(60) Provisional application No. 62/374,803, filed on Aug. 13, 2016, provisional application No. 62/373,254, filed on Aug. 10, 2016.

(51) Int. Cl.

| | | |
|---|---|---|
| *H04W 4/40* | (2018.01) | |
| *H04W 4/44* | (2018.01) | |
| *H04W 4/46* | (2018.01) | |
| *H04W 4/70* | (2018.01) | |
| *H04W 36/00* | (2009.01) | |
| *H04W 36/38* | (2009.01) | |
| *H04W 72/04* | (2009.01) | |
| *H04W 36/08* | (2009.01) | |
| *H04W 76/14* | (2018.01) | |

(52) U.S. Cl.
CPC ............... *H04W 4/46* (2018.02); *H04W 4/70* (2018.02); *H04W 36/0033* (2013.01); *H04W 36/08* (2013.01); *H04W 36/38* (2013.01); *H04W 72/04* (2013.01); *H04W 72/1242* (2013.01); *H04W 72/1257* (2013.01); *H04W 72/1289* (2013.01); *H04W 76/14* (2018.02)

(58) Field of Classification Search
CPC ............. H04W 76/27; H04W 72/1284; H04W 72/1289; H04W 4/40; H04W 4/42; H04W 4/44; H04W 4/46

See application file for complete search history.

(56) References Cited

U.S. PATENT DOCUMENTS

| | | | |
|---|---|---|---|
| 2011/0170495 | A1 | 7/2011 | Earnshaw |
| 2011/0239072 | A1 | 9/2011 | Cai |
| 2013/0163532 | A1 | 6/2013 | Anderson et al. |
| 2013/0336296 | A1* | 12/2013 | Dinan ............... H04W 72/0406 370/336 |
| 2014/0092829 | A1 | 4/2014 | Han et al. |
| 2015/0282210 | A1 | 10/2015 | Li |
| 2016/0127955 | A1 | 5/2016 | Damnjanovic et al. |
| 2016/0295624 | A1 | 10/2016 | Novlan et al. |
| 2017/0019887 | A1* | 1/2017 | Jiang ................... H04W 72/042 |
| 2017/0099624 | A1 | 4/2017 | Baghel et al. |
| 2017/0188391 | A1 | 6/2017 | Rajagopal et al. |
| 2017/0223708 | A1 | 8/2017 | Jung et al. |
| 2018/0042023 | A1 | 2/2018 | Sheng |
| 2018/0049235 | A1* | 2/2018 | Baghel .................... H04W 4/70 |
| 2018/0199181 | A1 | 7/2018 | Jung et al. |
| 2019/0268908 | A1 | 8/2019 | Jung et al. |
| 2020/0146014 | A1 | 5/2020 | Jung et al. |

FOREIGN PATENT DOCUMENTS

| | | | |
|---|---|---|---|
| WO | 2016022099 | A1 | 2/2016 |
| WO | 2017128274 | A1 | 8/2017 |

OTHER PUBLICATIONS

3GPP TS 36.300 V13.4.0 (Jun. 2016), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

3GPP TS 36.321 V13.2.0 (Jun. 2016), Technical Specification, 3rd Generation Partnership Project; Technical Specification Group Radio Access Network; Evolved Universal Terrestrial Radio Access (E-UTRA);Medium Access Control (MAC) protocol specification (Release 13).

3GPP TS 36.331 V13.2.0 (Jun. 2016), Technical Specification, 3rd Generation Partnership Project; Technical Specification Group Radio Access Network; Evolved Universal Terrestrial Radio Access (E-UTRA); Radio Resource Control (RRC); Protocol specification (Release 13).

R1-164878, 3GPP TSG RAN WG1 Meeting #85, Nanjing, China May 23-27, 2016, Source: CMCC, Title: Discussion on SPS configurations.

R1-162122, 3GPP TSG RAN WG1 Meeting #84bis, Busan, Korea, Apr. 11-15, 2016, Agenda Item: 7.3.2.2.2, Source: Huawei, HiSilicon, Title: SPS enhancement for V2V.

R1-162340, 3GPP TSG RAN WG1 Meeting #84 bis, Busan, Korea, Apr. 11-15, 2016, Source: OPPO, Title: Discussion on the SPS configuration.

R1-162413, 3GPP TSG-RAN WG1 Meeting #84bis, Busan, Korea Apr. 11-15, 2016, Source: ZTE, Title: Discussion on V2V SPS resource scheme.

R1-162500, RAN WG1 Meeting #84bis, Busan, Korea, Apr. 11-15, 2016, Source: LG Electronics, Title: Discussions on UL enhancements for V2X.

R1-164421, 3GPP TSG-RAN WG1 #85, May 23-27, 2016, Nanjing, China, Agenda item: 6.2.2.3.1, Source: Qualcomm Incorporated, Title: eNodeB signaling for SPS resource allocation.

R1-164422, 3GPP TSG-RAN WG1 #85, May 23-27, 2016, Nanjing, China, Agenda item: 6.2.2.3.2, Source: Qualcomm Incorporated, Title: UE reporting for eNodeB resource allocation.

R1-164468, 3GPP TSG RAN WG1 Meeting #85, Nanjing, China, May 23-27, 2016, Source: Guangdong OPPO Mobile Telecom, Title: Discussion on the SPS configuration for mode-2.

R1-164514, 3GPP TSG RAN WG1 Meeting #85, Nanjing, China May 23-27, 2016, Source: LG Electronics, Title: Discussion on details of (E)PDCCH used for sidelink SPS.

R1-164515, 3GPP TSG RAN WG1 Meeting #85, Nanjing, China, May 23-27, 2016, Agenda item: 6.2.2.3.2, Source: LG Electronics, Title: Discussion on details of UE reporting.

R1-164538, 3GPP TSG RAN WG1 Meeting #85, Nanjing, China, May 23-27, 2016, Source: LG Electronics, Title: Discussion on UL SPS for V2X.

R1-164762, 3GPP TSG RAN WG1 Meeting #85, Nanjing, May 23-27, 2016, Agenda Item: 6.2.2.3.1, Source: Samsung, Title: Multiple SPS configuration support for SL.

R1-164763, 3GPP TSG RAN WG1 Meeting #85, Nanjing, May 23-27, 2016, Agenda Item: 6.2.2.3.2, Source: Samsung, Title: UE reporting procedure for SL SPS transmissions.

R1-164818, 3GPP TSG RAN WG1 Meeting #85, Nanjing, China, May 23-27, 2016, Agenda Item: 6.2.2.3, Source: Huawei, HiSilicon, Title: SPS enhancement for V2V.

R1-164906, 3GPP TSG RAN WG1 Meeting #85, Nanjing, China May 23-27, 2016, Source: Panasonic, Title: Signaling design to support SPS activation/release in V2V.

R1-164963, 3GPP TSG-RAN WG1 Meeting #85, Nanjing, China May 23-27, 2016, Source: ZTE, Title: Trigger and release of V2V SPS resources.

R1-164964, 3GPP TSG RAN WG1 Meeting #85, Nanjing, China May 23-27, 2016, Agenda item: 6.2.2.3.2, Source: ZTE, Title: Discussion on UE reporting.

R1-165193, 3GPP TSG RAN WG1 Meeting #85, Nanjing, China May 23-27, 2016, Source: NTT DOCOMO, Inc., Title: (E)PDCCH for sidelink SPS configuration switching.

R1-165194, 3GPP TSG RAN WG1 Meeting #85, Nanjing, China May 23-27, 2016, Source: NTT DOCOMO, Inc., Title: UE reporting for sidelink SPS operation.

R1-165246, 3GPP TSG RAN WG1 Meeting #85, Nanjing, PRC, May 23-27, 2016, Source: Ericsson, Title: Contents of Downlink Control Information for V2V over PC5.

R1-165272, 3GPP TSG RAN WG1 Meeting #85, Nanjing, PRC, May 23-27, 2016, Source: Ericsson, Title: Mode-1 SPS for V2V over PC5.

R1-165274, 3GPP TSG RAN WG1 Meeting #85, Nanjing, May 23-27, 2016, Source: Ericsson, Title: UL SPS and reporting to eNB for V2X.

R1-165309, 3GPP TSG RAN WG1 Meeting #85, Nanjing, China May 23-27, 2016, Source: Panasonic, Title: Details on PC5 SPS enhancement.

(56) References Cited

OTHER PUBLICATIONS

R2-162197, 3GPP TSG-RAN2 Meeting #93bis, Dubrovnik, Croatia, Apr. 11-15, 2016, Agenda Item: 8.2.1, Source: OPPO, Title: Discussion on SPS Enhancements for V2V.
R2-162454, 3GPP TSG RAN WG2 Meeting #93bis, Dubrovnik, Croatia, Apr. 11-15, 2016, Agenda item: 8.2.1, Source: Intel Corporation, Title: SL resource allocation in SPS manner.
R2-162927, 3GPP TSG-RAN2 Meeting #93bis, Dubrovnik, Croatia, Apr. 11-15, 2016, Agenda item: 8.2.1, Source: LG Electronics Inc., Title: SL SPS enhancement for V2V.
R2-163406, 3GPP TSG-RAN2 Meeting #94, Nanjing, P. R. China, Apr. 23-27, 2016, Agenda Item: 8.11.1, Source: OPPO, Title: Discussion on SPS Enhancements for V2X.
R2-163421, 3GPP TSG-RAN WG2 #94, Nanjing, China, May 23-25, 2016, Source: CATT, Title: Consideration on SPS Enchancement.
R2-163451, 3GPP TSG RAN WG2 Meeting #94, Nanjing, China, Apr. 23-25, 2016, Agenda Item: 8.2.4, Source: Samsung, Title: UE reporting and dynamic SL SPS transmission.
R2-163807, 3GPP TSG-RAN WG2 Meeting #94, Nanjing, China, May 23-27, 2016, Agenda Item: 8.11.1, Source: Huawei, HiSilicon, InterDigital, LG Electronics Inc., OPPO, Title: Discussions on CAM Characteristics.
R2-163812, 3GPP TSG-RAN WG2 #94, Nanjing, China, May 23-27, 2016, Agenda Item: 8.2.4, Source: Huawei, HiSilicon, Title: Enhancements for Sidelink Resource Allocation.
R2-163840, 3GPP TSG RAN WG2 Meeting #94, Nanjing, China, May 23 27, 2016, Source: ZTE, Title: SPS enhancements for V2X over Uu.
R2-163865, 3GPP TSG RAN WG2 Meeting #94, Nanjing, China, May 23-25, 2016, Source: ITL, Title: SL SPS for V2V.
R2-163885, 3GPP TSG RAN WG2 Meeting #94, Nanjing, China, May 23-27, 2016, Source: Potevio, Title: UE assisted information for SPS.
R2-163900, 3GPP TSG-RAN WG2 Meeting #94, Nanjing, China, May 23-27, 2016, Agenda item: 8.11.1, Source: Nokia, Alcatel-Lucent Shanghai Bell, Title: Multiple inter-dependent UL SPS occasions.
R2-164063, 3GPP TSG-RAN WG2 Meeting #94, Nanjing, China, May 23-27, 2016, Agenda item: 8.2.4, Source: Qualcomm Incorporated, Title: SPS for V2V Communication.
R2-164079, 3GPP TSG-RAN2 Meeting #94, Nanjing, China, Apr. 11-15, 2016, Agenda item: 8.2.4, Source: LG Electronics Inc. Title: Support of Semi-Persistent Scheduling for PC5 mode 1.
R2-164082, 3GPP TSG-RAN2 Meeting #94, Nanjing, China, Apr. 11-15, 2016, Agenda item: 8.11.1, Source: LG Electronics Inc, InterDigital, OPPO, Huawei, Title: Proposed TP for UL SPS enhancements.
R2-164377, 3GPP TSG-RAN WG2 Meeting #94, Nanjing, China, May 23-27, 2016, Agenda item: 8.11.1, Source: Huawei, HiSilicon, Title: TP on CAM Characteristics.
Tdoc R2-161571, 3GPP TSG-RAN WG2 #93 , St. Julians, Malta, Feb. 15-19, 2016, Agenda Item: 7.11, Source: Ericsson, Title: Overview of V2X Enhancements for Further RAN2 Work.
Tdoc R2-164112, 3GPP TSG-RAN WG2 #94, Nanjing, P.R. China, May 23-27, 2016, Agenda Item: 8.11.1, Source: Ericsson, Title: SPS Enhancements for Uu Operations in V2X.
An Assessment of LTE-V2X (PC5) and 802.11p direct communications technologies for improved road safety in the EU May 12, 2017.
International Search Report in the international application No. PCT/US2017/046363, dated Jan. 4, 2018.
Written Opinion of the International Search Authority in the international application No. PCT/US2017/046363, dated Jan. 4, 2018.
ZTE, "SPS enhancements for V2V over PC5", 3GPP TSG RAN WG2 #94, R2-163836, SPS Enhancements for V2V Over PC5, 3rd Generation Partnershipproject(3GPP), Mobile Competence Centre; 650, Route Des Lucioles; F-06921 Sophia-Antipolis Cedex; France; vol. RAN WG2, No. Nanjing China; May 23, 2016-May 27, 2016 May 22, 2016(May 22, 2016), XP051105236, section 2.1 section 2.4; figure 1.
Non-Final Office Action of the U.S. Appl. No. 15/674,270, dated Oct. 1, 2018.
Final Office Action of the U.S. Appl. No. 15/674,270, dated Mar. 28, 2019.
Non-Final Office Action of the U.S. Appl. No. 16/670,342, dated Feb. 24, 2020.
Final Office Action of the U.S. Appl. No. 16/670,342, dated Jul. 20, 2020.
Non-Final Office Action of the U.S. Appl. No. 15/674,286, dated Oct. 4, 2018.
Non-Final Office Action of the U.S. Appl. No. 15/674,286, dated Apr. 16, 2019.
Non-Final Office Action of the U.S. Appl. No. 16/670,342, dated Mar. 26, 2021, (22p).
"D2D capability for muli-carrier capable UE", R2-163900, 3GPP TSG-RAN WG2 #86, Seoul, Korea, May 19-23, 2014, (3p).
Rapporteur ( LG Electronics Inc.), "Summary of [87bis#17][LTE/ProSe] Capabilities for Prose Communication", 3GPP TSG-RAN WG2 #88, Sanfrancisco, USA, Nov. 17-21, 2014, (19p).
Qualcomm Incorporated, "eD2D RF requirements: General aspects", 3GPP TSG-RAN WG4 #76, sophia Antipolis, France, Oct. 12-16, 2015, (4p).
Extended European Search Report in the European Application No. 21156081.8, dated May 31, 2021, (13p).

* cited by examiner

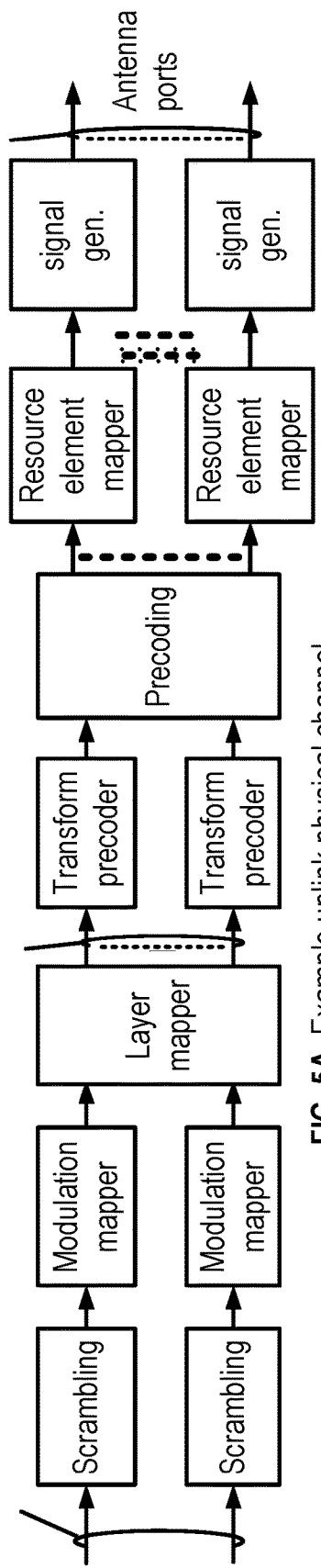
FIG. 5A Example uplink physical channel
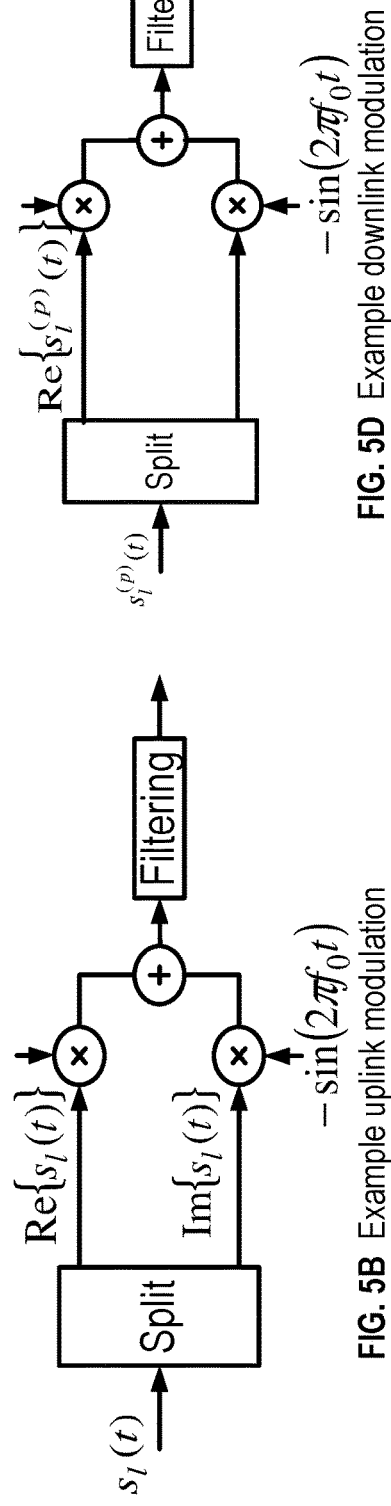
FIG. 5B Example uplink modulation
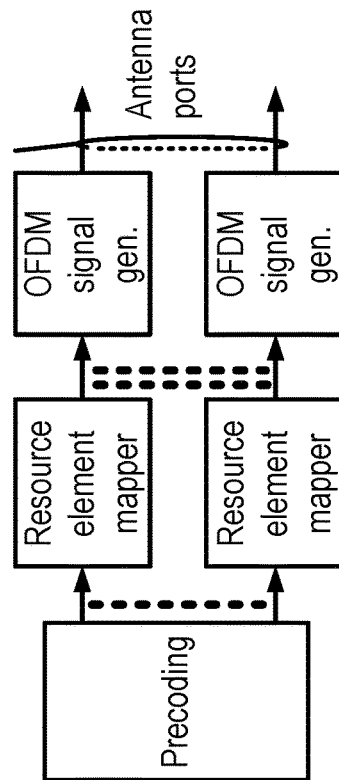
FIG. 5D Example downlink modulation
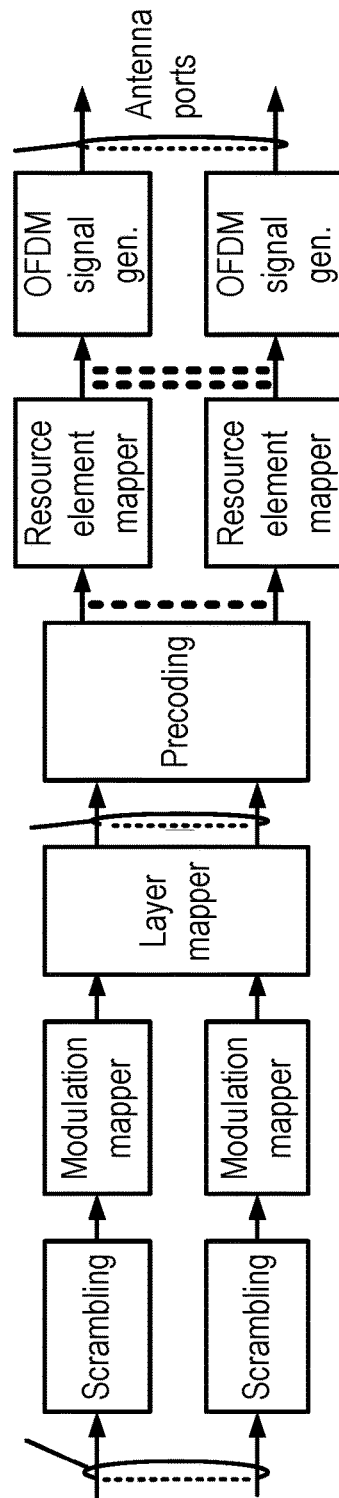
FIG. 5C Example downlink physical channel Dual-Connectivity at eNB FIG. 7 Dual-Connectivity- two MAC entities at UE side Example 1: 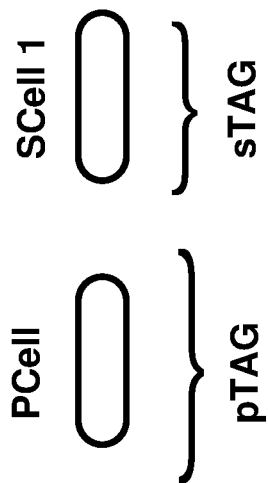
Example 2: 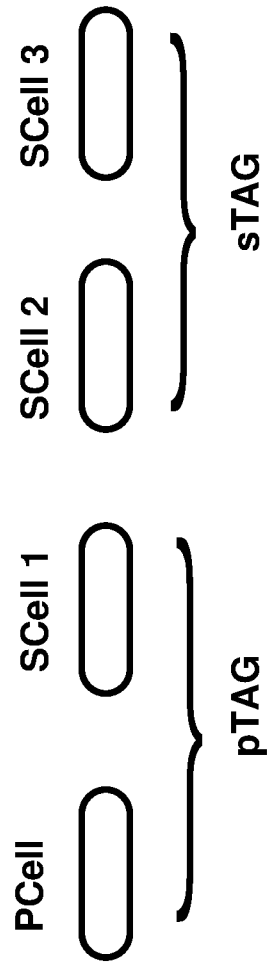
Example 3: 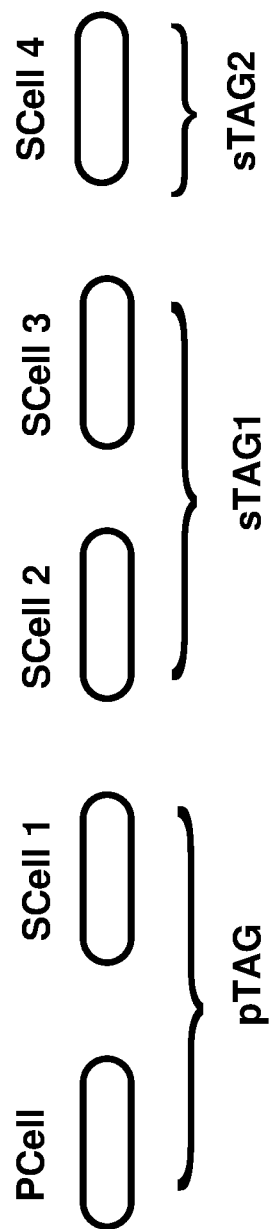
FIG. 8

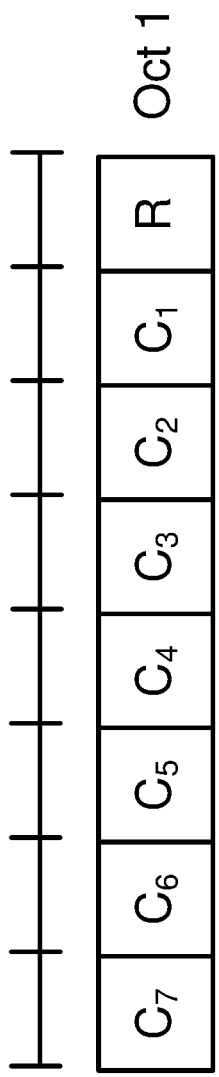
Example Activation/Deactivation MAC control element of one octet
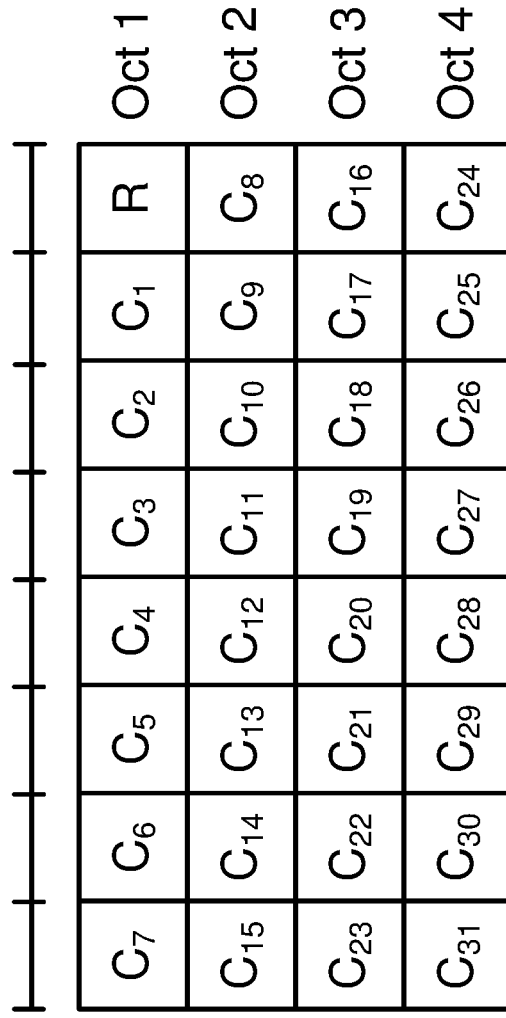
Example Activation/Deactivation MAC control element of four octets
FIG. 10

| TDD UL/DL configuration | Position of initial Semi-Persistent grant | Subframe_Offset value (ms) |
|---|---|---|
| 0 | N/A | 0 |
| 1 | Subframes 2 and 7 | 1 |
| 1 | Subframes 3 and 8 | -1 |
| 2 | Subframe 2 | 5 |
| 2 | Subframe 7 | -5 |
| 3 | Subframes 2 and 3 | 1 |
| 3 | Subframe 4 | -2 |
| 4 | Subframe 2 | 1 |
| 4 | Subframe 3 | -1 |
| 5 | N/A | 0 |
| 6 | N/A | 0 |

FIG. 11

Example UE V2X capabilities

| Supported V2X band combinations | |
|---|---|
| V2X band combination 1 | Configuration parameter(s) for V2X band combination 1 |
| V2X band combination 2 | Configuration parameter(s) for V2X band combination 2 |
| ⋯ | ⋯ |
| V2X band combination k | Configuration parameter(s) for V2X band combination k |

FIG. 20

Example UE V2X capabilities

A supported V2X band combination:

| | |
|---|---|
| V2X band identifier 1 | Whether at least one V2X configuration is supported for band identifier 1 |
| V2X band identifier 2 | Whether at least one V2X configuration is supported for band identifier 2 |
| ... | ... |
| V2X band identifier k | Whether at least one V2X configuration is supported for band identifier k |
| Configuration parameter(s) for V2X band identifier 1 | |
| Configuration parameter(s) for V2X band identifier 2 | |
| Configuration parameter(s) for V2X band identifier k | |

FIG. 21

V2X SUPPORTED BAND COMBINATION SEQUENCE OF A WIRELESS DEVICE

CROSS-REFERENCE TO RELATED APPLICATIONS

This application is a continuation of U.S. patent Ser. No. 15/674,286, filed Aug. 10, 2017, which claims the benefit of U.S. Provisional Application No. 62/373,254, filed Aug. 10, 2016 and U.S. Provisional Application No. 62/374,803, filed Aug. 13, 2016, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 10 is an example diagram depicting Activation/Deactivation MAC control elements as per an aspect of an embodiment of the present disclosure.

FIG. 11 is an example diagram depicting example subframe offset values as per an aspect of an embodiment of the present disclosure.

FIG. 20 is an example diagram depicting example UE V2X capabilities as per an aspect of an embodiment of the present disclosure.

FIG. 21 is an example diagram depicting example UE V2X capabilities as per an aspect of an embodiment of the present disclosure.

DETAILED DESCRIPTION OF EMBODIMENTS

Figure 1:
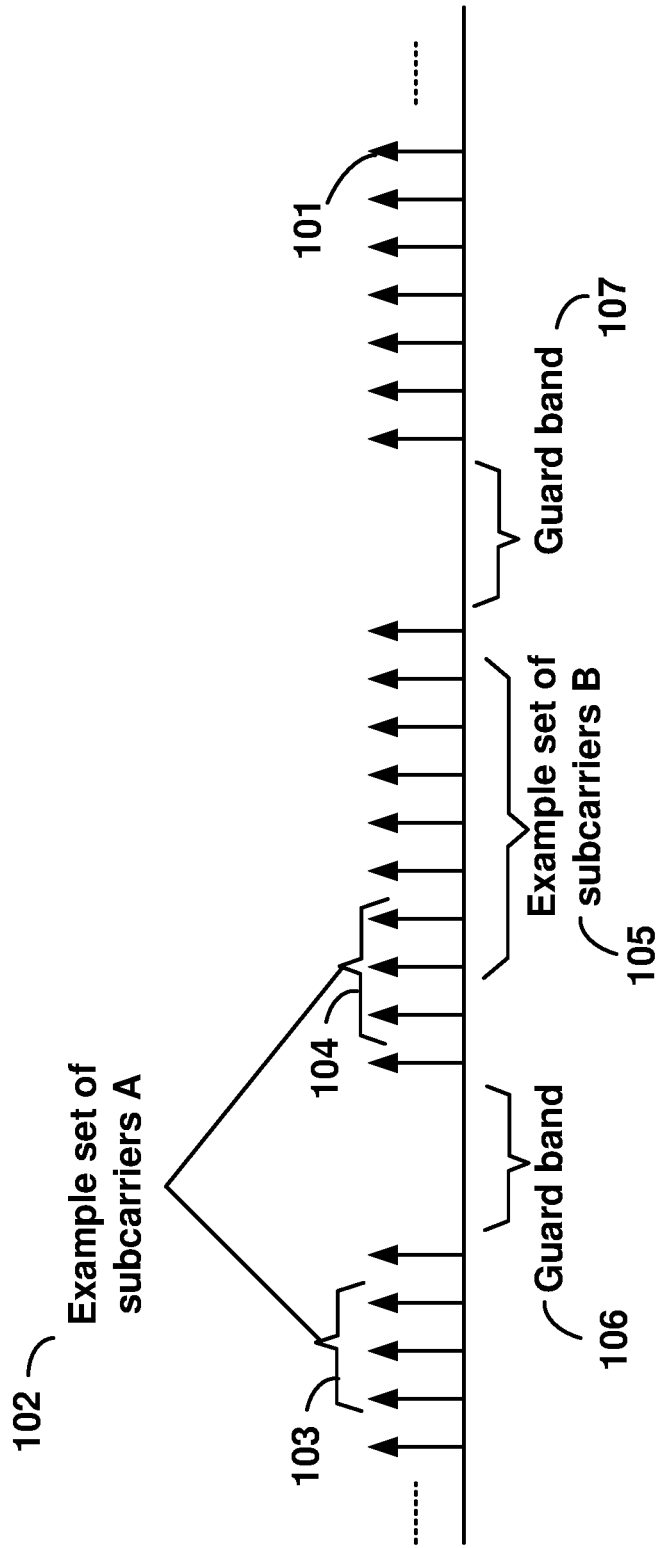
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| DL | downlink |
| DCI | downlink control information |
| DC | dual connectivity |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LAA | licensed assisted access |
| LTE | long term evolution |
| MCG | master cell group |
| MeNB | master evolved node B |
| MIB | master information block |

-continued

| | |
|---|---|
| MAC | media access control |
| MAC | media access control |
| MME | mobility management entity |
| NAS | non-access stratum |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |
| pTAG | primary timing advance group |
| QAM | quadrature amplitude modulation |
| QPSK | quadrature phase shift keying |
| RBG | Resource Block Groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TB | transport block |
| UL | uplink |
| UE | user equipment |
| VHDL | VHSIC hardware description language |

Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
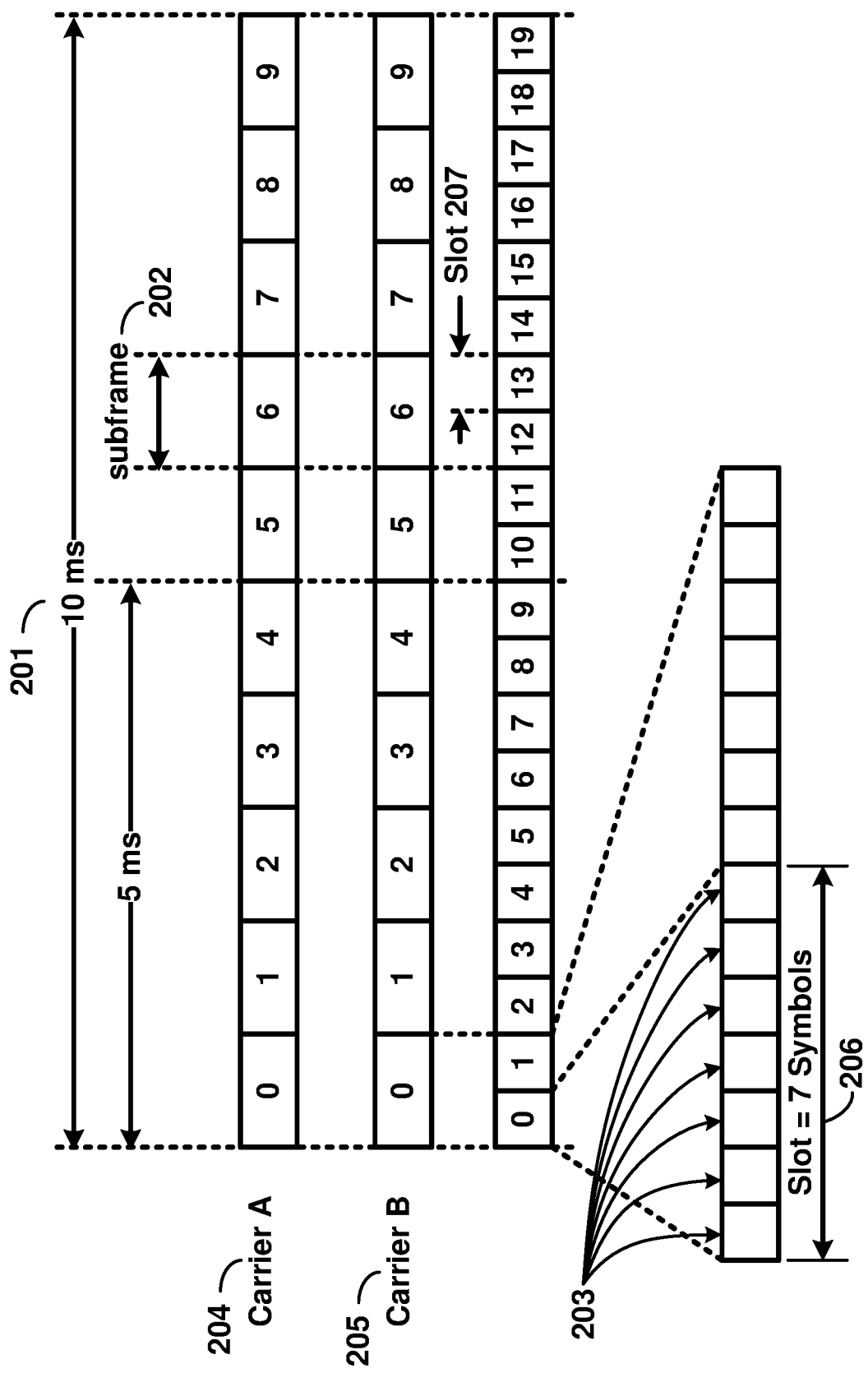
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
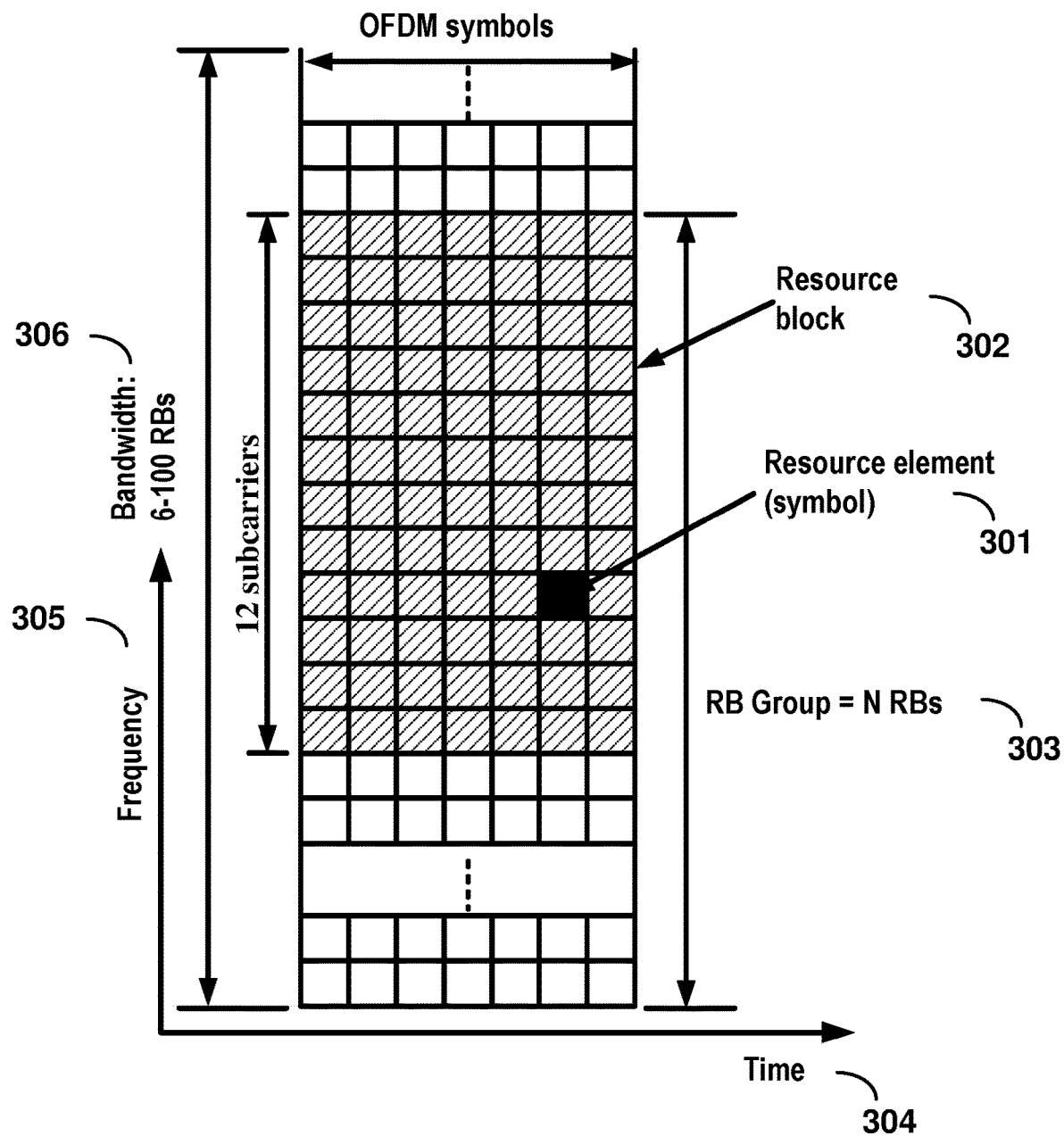
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
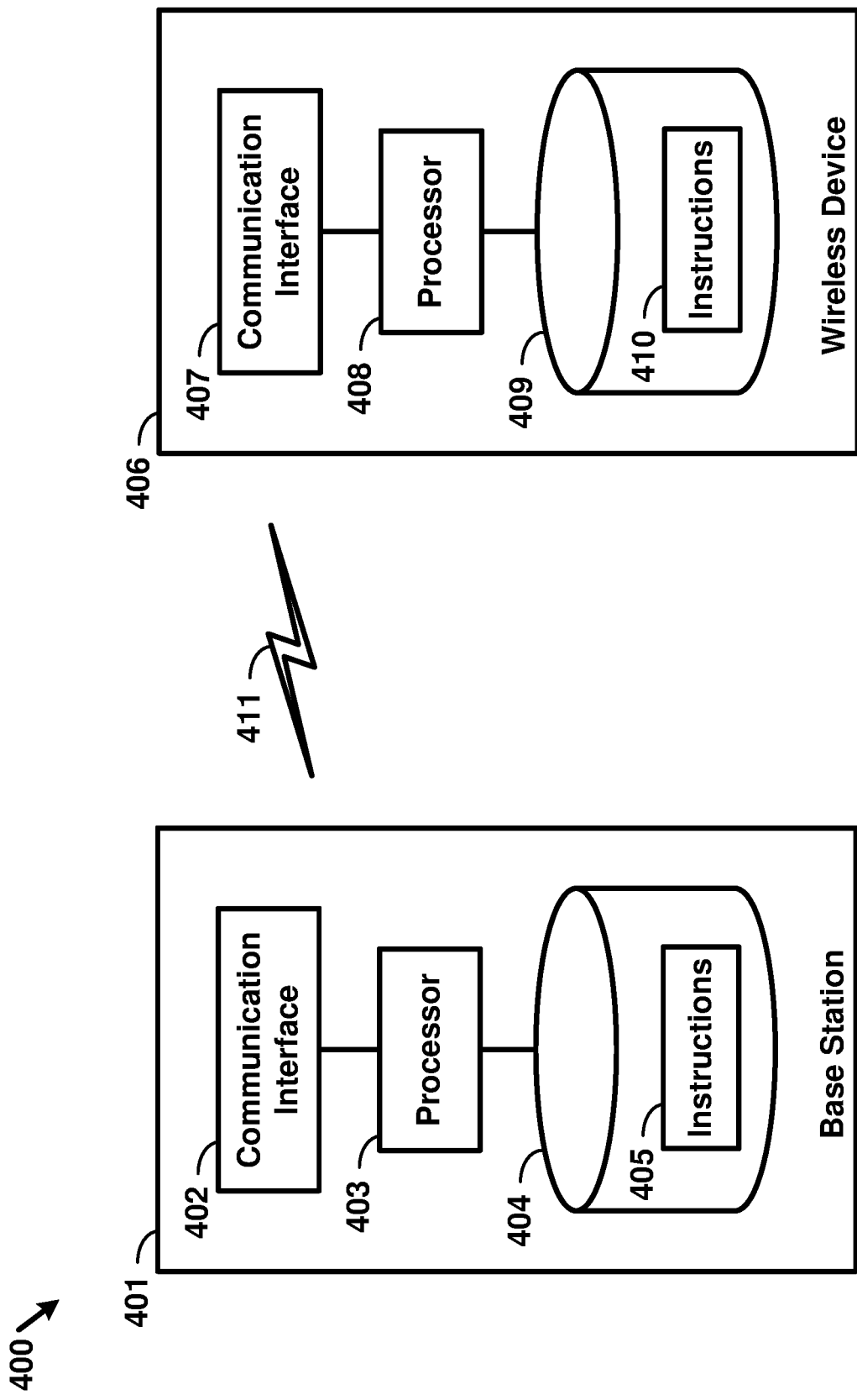
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
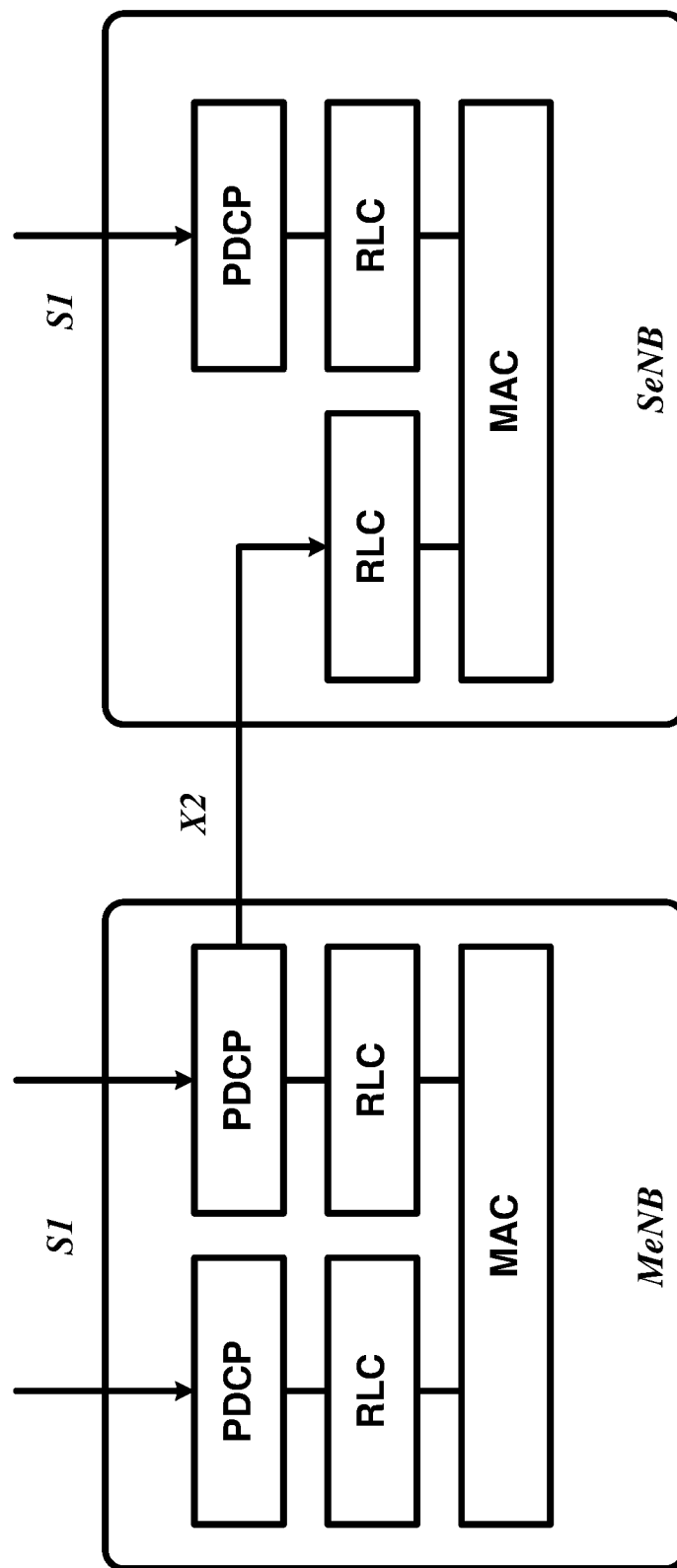
FIG. 6 is an example diagram for a protocol structure with CA and DC as per an aspect of an embodiment of the present disclosure.
Figure 7:
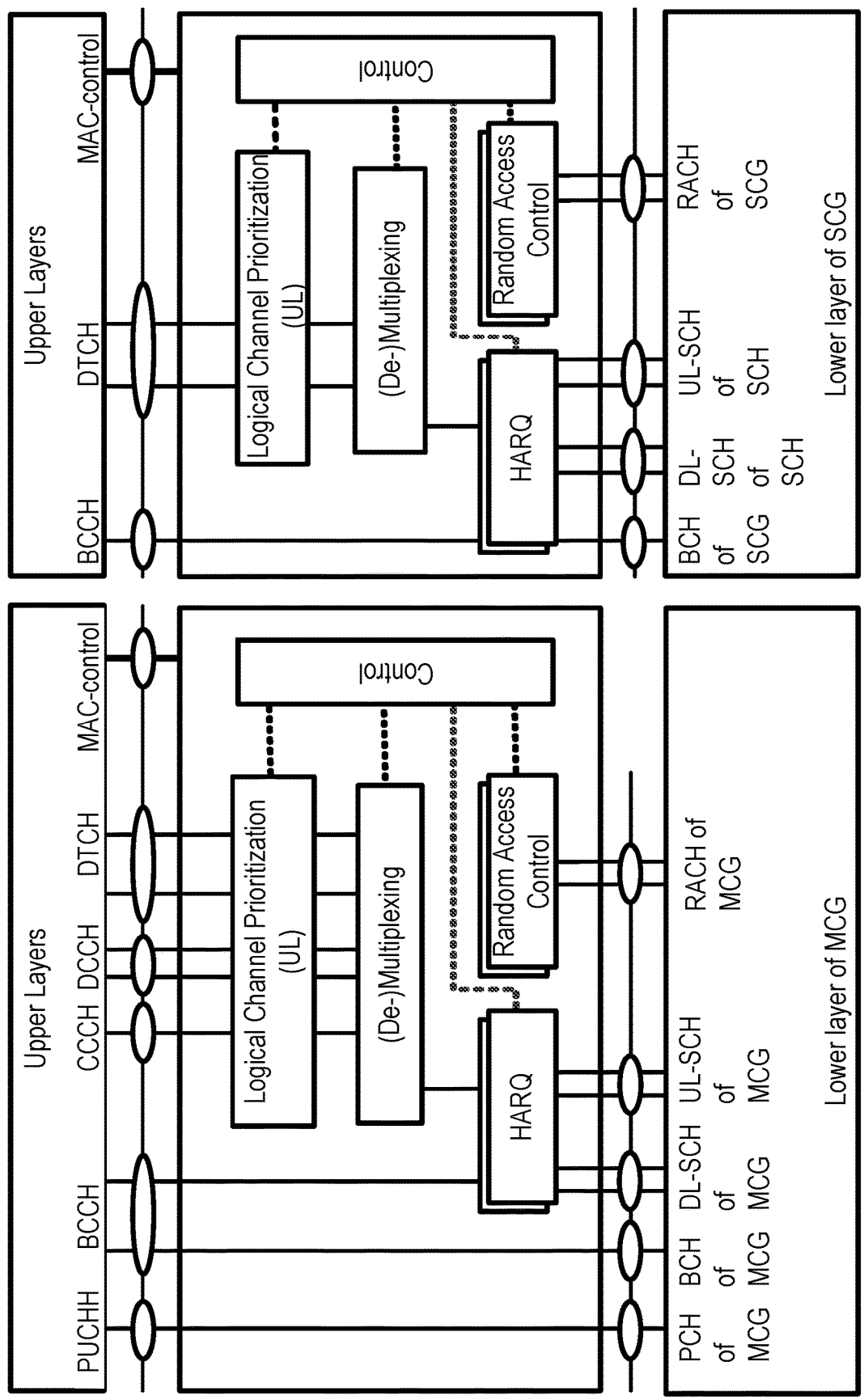
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
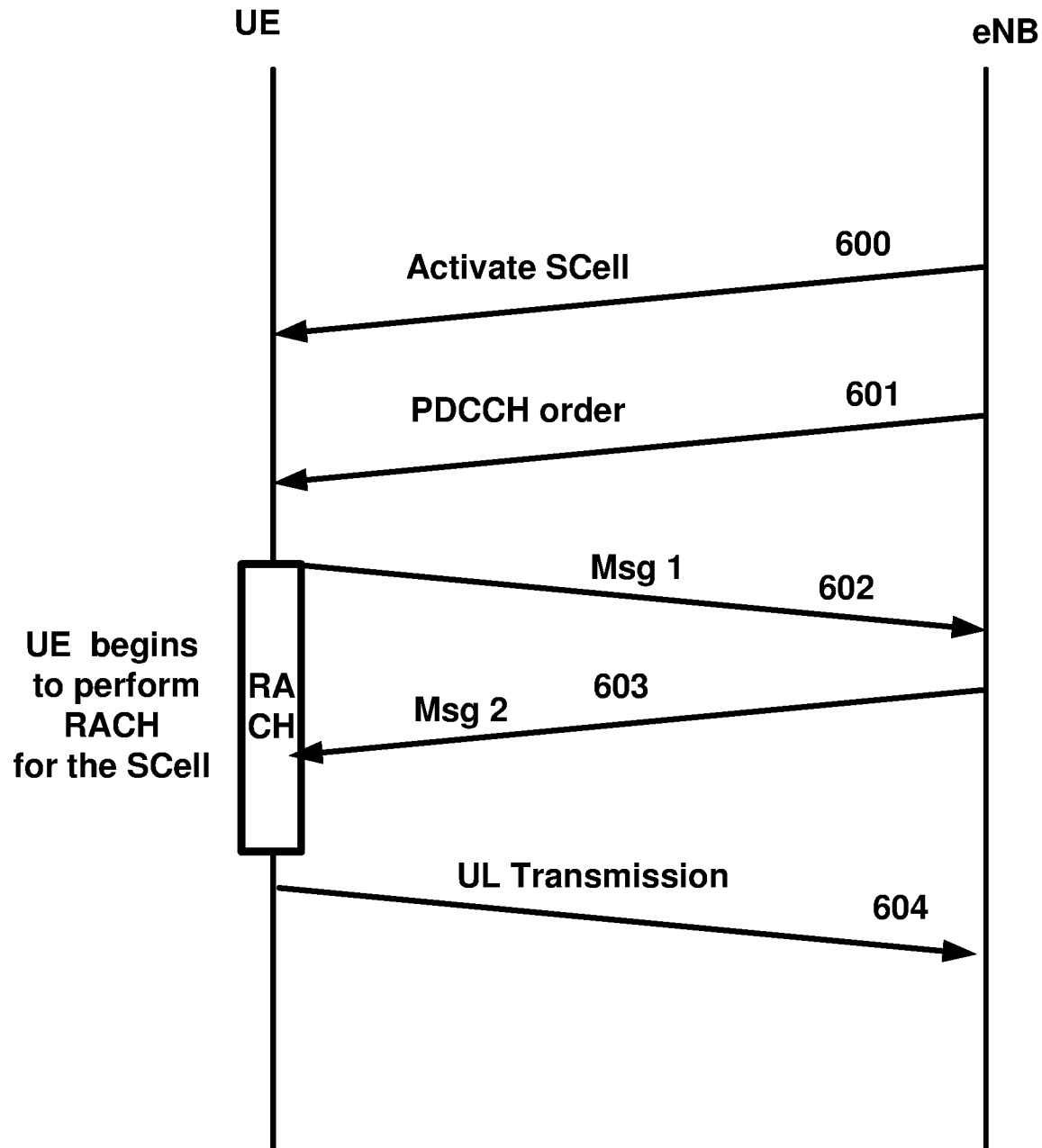
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

In an example, the MAC entity may be configured with one or more SCells. In an example, the network may activate and/or deactivate the configured SCells. The SpCell may always be activated. The network may activate and deactivates the SCell(s) by sending the Activation/Deactivation MAC control element. The MAC entity may maintain a sCellDeactivationTimer timer for a configured SCell. Upon the expiry of sCellDeactivationTimer timer, the MAC entity may deactivate the associated SCell. In an example, the same initial timer value may apply to each instance of the sCellDeactivationTimer and it may be configured by RRC. The configured SCells may initially be deactivated upon addition and after a handover. The configured SCG SCells may initially be deactivated after a SCG change.

In an example, if the MAC entity receives an Activation/Deactivation MAC control element in a TTI activating a SCell, the MAC entity may, in a TTI according to the timing defined below, activate the SCell and apply normal SCell operation including SRS transmissions on the SCell, CQI/PMI/RI/PTI/CRI reporting for the SCell, PDCCH monitoring on the SCell, PDCCH monitoring for the SCell and PUCCH transmissions on the SCell, if configured. The MAC entity may start or restart the sCellDeactivationTimer associated with the SCell and trigger power headroom report (PHR). In an example, if the MAC entity receives an Activation/Deactivation MAC control element in a TTI deactivating a SCell or if the sCellDeactivationTimer associated with an activated SCell expires in the TTI, the MAC entity may, in a TTI according to the timing defined below, deactivate the SCell, stop the sCellDeactivationTimer associated with the SCell and flush all HARQ buffers associated with the SCell.

In an example, when a UE receives an activation command for a secondary cell in subframe n, the corresponding actions above may be applied no later than the minimum requirements and no earlier than subframe n+8, except for the actions related to CSI reporting on a serving cell which may be active in subframe n+8 and the actions related to the sCellDeactivationTimer associated with the secondary cell which may be applied in subframe n+8. The actions related to CSI reporting on a serving cell which is not active in subframe n+8 may be applied in the earliest subframe after n+8 in which the serving cell is active.

In an example, when a UE receives a deactivation command for a secondary cell or the sCellDeactivationTimer associated with the secondary cell expires in subframe n, the corresponding actions above may apply no later than the minimum requirement except for the actions related to CSI reporting on a serving cell which is active which may be applied in subframe n+8.

In an example, if the PDCCH on the activated SCell indicates an uplink grant or downlink assignment or if the PDCCH on the Serving Cell scheduling an activated SCell indicates an uplink grant or a downlink assignment for the activated SCell, the MAC entity may restart the sCellDeactivationTimer associated with the SCell.

In an example, if a SCell is deactivated, the UE may not transmit SRS on the SCell, may not report CQI/PMI/RI/PTI/CRI for the SCell, may not transmit on UL-SCH on the SCell, may not transmit on RACH on the SCell, may not monitor the PDCCH on the SCell, may not monitor the PDCCH for the SCell and may not transmit PUCCH on the SCell.

In an example, the HARQ feedback for the MAC PDU containing Activation/Deactivation MAC control element may not be impacted by PCell interruption due to SCell activation/deactivation. In an example, when SCell is deactivated, the ongoing Random Access procedure on the SCell, if any, may be aborted.

In an example, the Activation/Deactivation MAC control element of one octet may be identified by a MAC PDU subheader with LCID 11000. FIG. 10 shows example Activation/Deactivation MAC control elements. The Activation/Deactivation MAC control element may have a fixed size and may consist of a single octet containing seven C-fields and one R-field. Example Activation/Deactivation MAC control element with one octet is shown in FIG. 10. The Activation/Deactivation MAC control element may have a fixed size and may consist of four octets containing 31 C-fields and one R-field. Example Activation/Deactivation MAC control element of four octets is shown in FIG. 10. In an example, for the case with no serving cell with a serving cell index (ServCellIndex) larger than 7, Activation/Deactivation MAC control element of one octet may be applied, otherwise Activation/Deactivation MAC control element of four octets may be applied. The fields in an Activation/Deactivation MAC control element may be interpreted as follows. Ci: if there is an SCell configured with SCellIndex i, this field may indicate the activation/deactivation status of the SCell with SCellIndex i, else the MAC entity may ignore the Ci field. The Ci field may be set to "1" to indicate that the SCell with SCellIndex i is activated. The Ci field is set to "0" to indicate that the SCell with SCellIndex i is deactivated. R: Reserved bit, set to "0".

Figure 12:
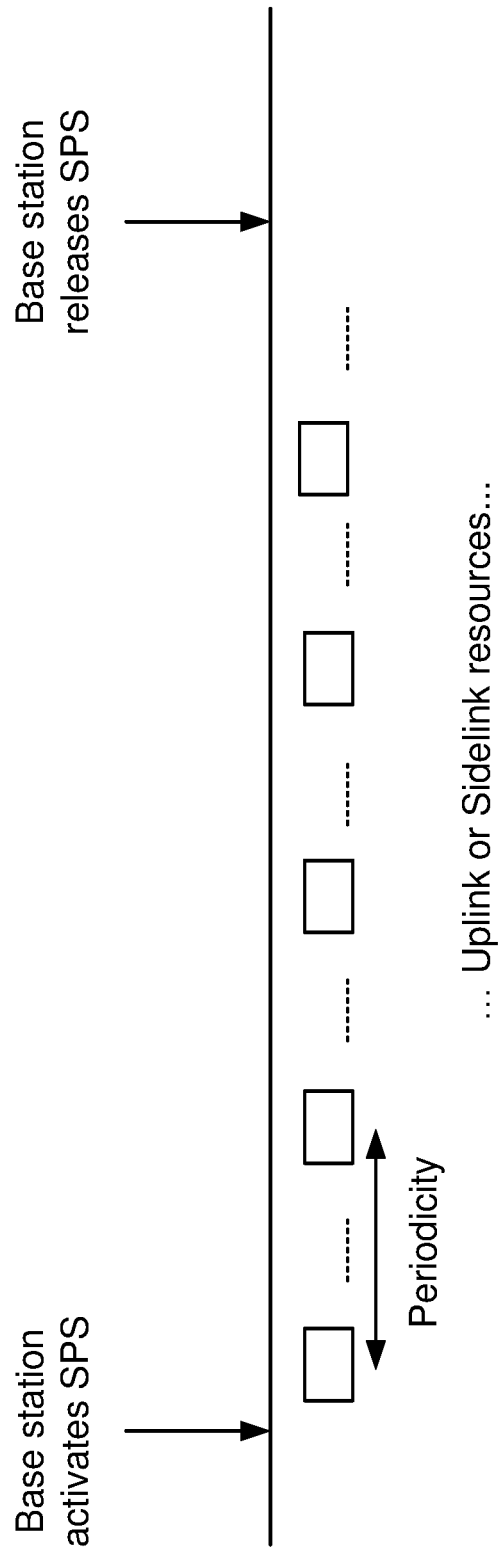
FIG. 12 is an example diagram depicting example uplink SPS activation and release as per an aspect of an embodiment of the present disclosure.

A base station may provide a periodic resource allocation. In a periodic resource allocation, an RRC message and/or a DCI may activate or release a periodic resource allocation. The UE may be allocated in downlink and/or uplink periodic radio resources without the need for transmission of additional grants by the base station. The periodic resource allocation may remain activated until it is released. The periodic resource allocation for example, may be called, semi-persistent scheduling or grant-free scheduling, or periodic multi-subframe scheduling, and/or the like. In this specification, the example term semi-persistent scheduling is mostly used, but other terms may also be equally used to refer to periodic resource allocation, e.g. grant-free scheduling. An example periodic resource allocation activation and release is shown in FIG. 12.

In the downlink, a base station may dynamically allocate resources (PRBs and MCS) to UEs at a TTI via the C-RNTI on PDCCH(s). A UE may monitor the PDCCH(s) in order to find possible allocation when its downlink reception is enabled (e.g. activity governed by DRX when configured). When CA is configured, the same C-RNTI applies to serving cells. Base station may also allocate semi-persistent downlink resources for the first HARQ transmissions to UEs. In an example, an RRC message may indicate the periodicity of the semi-persistent downlink grant. In an example, a PDCCH DCI may indicate whether the downlink grant is a semi-persistent one e.g. whether it can be implicitly reused in the following TTIs according to the periodicity defined by RRC.

In an example, when required, retransmissions may be explicitly signaled via the PDCCH(s). In the sub-frames where the UE has semi-persistent downlink resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE finds its C-RNTI on the PDCCH(s), the PDCCH allocation may override the semi-persistent allocation for that TTI and the UE may not decode the semi-persistent resources.

When CA is configured, semi-persistent downlink resources may be configured for the PCell and/or SCell(s). In an example, PDCCH dynamic allocations for the PCell and/or SCell(s) may override the semi-persistent allocation.

In the uplink, a base station may dynamically allocate resources (PRBs and MCS) to UEs at a TTI via the C-RNTI on PDCCH(s). A UE may monitor the PDCCH(s) in order to find possible allocation for uplink transmission when its downlink reception is enabled (activity governed by DRX when configured). When CA is configured, the same C-RNTI applies to serving cells. In addition, a base station may allocate a semi-persistent uplink resource for the first HARQ transmissions and potentially retransmissions to UEs. In an example, an RRC may define the periodicity of the semi-persistent uplink grant. PDCCH may indicate whether the uplink grant is a semi-persistent one e.g. whether it can be implicitly reused in the following TTIs according to the periodicity defined by RRC.

In an example, in the sub-frames where the UE has semi-persistent uplink resource, if the UE cannot find its C-RNTI on the PDCCH(s), an uplink transmission according to the semi-persistent allocation that the UE has been assigned in the TTI may be made. The network may perform decoding of the pre-defined PRBs according to the pre-defined MCS. Otherwise, in the sub-frames where the UE has semi-persistent uplink resource, if the UE finds its C-RNTI on the PDCCH(s), the PDCCH allocation may override the persistent allocation for that TTI and the UE's transmission follows the PDCCH allocation, not the semi-persistent allocation. Retransmissions may be either implicitly allocated in which case the UE uses the semi-persistent uplink allocation, or explicitly allocated via PDCCH(s) in which case the UE does not follow the semi-persistent allocation.

Vehicular communication services, represented by V2X services, may comprise of the following different types: V2V, V2I, V2N and/or V2P. V2X services may be provided by PC5 interface (sidelink) and/or Uu interface (UE to base station interface). Support of V2X services via PC5 interface may be provided by V2X sidelink communication, which is a mode of communication whereby UEs may communicate with each other directly over the PC5 interface. This communication mode may be supported when the UE is served by E-UTRAN and when the UE is outside of E-UTRA coverage. The UEs authorized to be used for V2X services may perform V2X sidelink communication.

The user plane protocol stack and functions for sidelink communication may be used for V2X sidelink communication. In order to assist the eNB to provide sidelink resources, the UE in RRC_CONNECTED may report geographical location information to the eNB. The eNB may configure the UE to report the complete UE geographical location information based on periodic reporting via the existing measurement report signaling.

In an example, for V2X communication, k SPS (e.g. k=8 or 16, etc) configurations with different parameters may be configured by eNB and SPS configurations may be active at the same time. The activation/deactivation of an SPS configuration may signaled via a PDCCH DCI and/or an RRC message by eNB. The logical channel prioritization for Uu may be used.

For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

In an example, for unicast transmission of V2X messages, the V2X message may be delivered via Non-GBR bearers as well as GBR bearers. In order to meet the QoS requirement for V2X message delivery for V2X services, a Non-GBR QCI value and a GBR QCI value for V2X messages may be used. For broadcasting V2X messages, SC-PTM or MBSFN transmission may be used. In order to reduce SC-PTM/MBSFN latency, shorter (SC-)MCCH repetition period for SC-PTM/MBSFN, modification period for SC-PTM/MBSFN and MCH scheduling period for MBSFN may be supported. Reception of downlink broadcast of V2X messages in different carriers/PLMNs may be supported by having multiple receiver chains in the UE.

In an example embodiment, various DCI formats may be used for SPS scheduling. For example, the DCI format 0 may be used for uplink SPS. In an example, the fields for DCI format 0 may comprise one or more of the following fields: Carrier indicator e.g. 0 or 3 bits. Flag for format0/format1A differentiation e.g. 1 bit, where value 0 may indicate format 0 and value 1 may indicate format 1A. Frequency hopping flag, e.g. 1 bit. This field may be used as the MSB of the corresponding resource allocation for resource allocation type 1. Resource block assignment and hopping resource allocation, e.g. clog $\lceil \log_2(N_{RB}^{UL}(N_{RB}^{UL}+1)) \rceil$ bits where $N_{RB}^{UL}$ may be the uplink bandwidth configuration in number of resource blocks. Modulation and coding scheme and redundancy version e.g. 5 bits. New data indicator e.g. 1 bit. TPC command for scheduled PUSCH e.g. 2 bits. Cyclic shift for DM RS and OCC index e.g. 3 bits. UL index e.g. 2 bits (this field may be present for TDD operation with uplink-downlink configuration 0). Downlink Assignment Index (DAI) e.g. 2 bits (this field may be present for cases with TDD primary cell and either TDD operation with uplink-downlink configurations 1-6 or FDD operation).

CSI request e.g. 1, 2 or 3 bits. The 2-bit field may apply to UEs configured with no more than five DL cells and to UEs that are configured with more than one DL cell and when the corresponding DCI format is mapped onto the UE specific search space given by the C-RNTI, UEs that are configured by higher layers with more than one CSI process and when the corresponding DCI format is mapped onto the UE specific search space given by the C-RNTI, UEs that are configured with two CSI measurement sets by higher layers with the parameter csi-MeasSubframeSet, and when the corresponding DCI format is mapped onto the UE specific search space given by the C-RNTI; the 3-bit field may apply to the UEs that are configured with more than five DL cells and when the corresponding DCI format is mapped onto the UE specific search space given by the C-RNTI; otherwise the 1-bit field may apply. SRS request e.g. 0 or 1 bit. This field may be present in DCI formats scheduling PUSCH which are mapped onto the UE specific search space given by the C-RNTI. Resource allocation type e.g. 1 bit. This field may be present if $N_{RB}^{UL} \leq N_{RB}^{DL}$ where $N_{RB}^{UL}$ may be the uplink bandwidth configuration in number of resource blocks and Na may be the downlink bandwidth configuration in number of resource blocks. In example, one or more fields may be added to a DCI for SPS to enhance SPS scheduling process. In example, one or more of the fields may be replaced with new fields, or new values, or may be interpreted differently for SPS to enhance SPS scheduling process.

A base station may transmit one or more RRC messages to a wireless device to configure SPS. The one or more RRC messages may comprise SPS configuration parameters. Example SPS configuration parameters are presented below. In example, one or more parameters may be added to an RRC message for SPS to enhance SPS scheduling process. In example, one or more some of the parameters for an SPS in an RRC message may be replaced with new parameters, or new values, or may be interpreted differently for SPS to enhance SPS scheduling process. In an example, IE SPS-Config may be used by RRC to specify the semi-persistent scheduling configuration. In an example, the IE SPS-Config may be SEQUENCE {semiPersistSchedC-RNTI: C-RNTI; sps-ConfigDL: SPS-ConfigDL; sps-ConfigUL: SPS-ConfigUL}. SPS-ConfigDL IE may comprise semiPersistSchedIntervalDL, numberOfConfSPS-Processes, n1PUCCH-AN-PersistentList, twoAntennaPortActivated, n1PUCCH-AN-PersistentListP1, and/or other parameters. In an example, SPS-ConfigUL IE may comprise semiPersistSchedIntervalUL, implicitReleaseAfter, p0-NominalPUSCH-Persistent, p0-UE-PUSCH-Persistent, twoIntervalsConfig, p0-PersistentSubframeSet2, p0-NominalPUSCH-PersistentSubframeSet2, p0-UE-PUSCH- and/or PersistentSubframeSet2, and/or other parameters.

In an example, one or more RRC configuration parameters may comprise one or more of the following parameters to configure SPS for a wireless device. In an example, SPS configuration may include MCS employed for packet transmission of an MCS grant. In an example, implicitReleaseAfter IE may be the number of empty transmissions before implicit release, e.g. value e2 may corresponds to 2 transmissions, e3 may correspond to 3 transmissions and so on. In an example, n1PUCCH-AN-PersistentList IE, n1PUCCH-AN-PersistentListP1 IE may be the List of parameter: $n_{PUCCH}^{(1,p)}$ for antenna port P0 and for antenna port P1 respectively. Field n1-PUCCH-AN-PersistentListP1 IE may be applicable if the twoAntennaPortActivated-PUCCH-Format1a1b in PUCCH-ConfigDedicated-v1020 is set to true. Otherwise the field may not be configured.

In an example, numberOfConfSPS-Processes IE may be the number of configured HARQ processes for Semi-Persistent Scheduling. In an example, p0-NominalPUSCH-Persistent IE may be the parameter: $P_{O\_NOMINAL\_PUSCH}(0)$ used in PUSCH power control with unit in dBm and step 1. This field may be applicable for persistent scheduling. If choice setup is used and p0-Persistent is absent, the value of p0-NominalPUSCH for p0-NominalPUSCH-Persistent may be applied. If uplink power control subframe sets are configured by tpc-SubframeSet, this field may apply for uplink power control subframe set 1.

In an example, p0-NominalPUSCH-PersistentSubframeSet2 IE may be the parameter: $P_{O\_NOMINAL\_PUSCH}(0)$ used in PUSCH power control with unit in dBm and step 1. This field may be applicable for persistent scheduling. If p0-PersistentSubframeSet2-r12 is not configured, the value of p0-NominalPUSCH-SubframeSet2-r12 may be applied for p0-NominalPUSCH-PersistentSubframeSet2. E-UTRAN may configure this field if uplink power control subframe sets are configured by tpc-SubframeSet, in which case this field may apply for uplink power control subframe set 2. In an example, p0-UE-PUSCH-Persistent IE may be the parameter: $P_{O\_UE\_PUSCH}(0)$ used in PUSCH power control with unit in dB. This field may be applicable for persistent scheduling. If choice setup is used and p0-Persistent is absent, the value of p0-UE-PUSCH may be applied for p0-UE-PUSCH-Persistent. If uplink power control subframe sets are configured by tpc-SubframeSet, this field may be applied for uplink power control subframe set 1. In an example, p0-UE-PUSCH-PersistentSubframeSet2 IE may be the parameter: $P_{O\_UE\_PUSCH}(0)$ used in PUSCH power control with unit in dB. This field may be applicable for persistent scheduling. If p0-PersistentSubframeSet2-r12 is not configured, the value of p0-UE-PUSCH-SubframeSet2 may be applied for p0-UE-PUSCH-PersistentSubframeSet2. E-UTRAN may configure this field if uplink power control subframe sets are configured by tpc-SubframeSet, in which case this field may apply for uplink power control subframe set 2.

In an example, semiPersistSchedC-RNTI IE may be Semi-Persistent Scheduling C-RNTI. In an example, semiPersistSchedIntervalDL IE may be Semi-persistent scheduling interval in downlink. Its value may be in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, semiPersistSchedIntervalUL IE may be semi-persistent scheduling interval in uplink. Its value in number of sub-frames. Value sf10 may correspond to 10 sub-frames, sf20 may correspond to 20 sub-frames and so on. For TDD, the UE may round this parameter down to the nearest integer (of 10 sub-frames), e.g. sf10 may correspond to 10 sub-frames, sf32 may correspond to 30 sub-frames, sf128 may correspond to 120 sub-frames. In an example, twoIntervalsConfig IE may be trigger of two-intervals-Semi-Persistent Scheduling in uplink. If this field is present, two-intervals-SPS is enabled for uplink. Otherwise, two-intervals-SPS is disabled.

In an example, multiple downlink or uplink SPS may be configured for a cell. In an example, multiple SPS RNTIs may be configured when a plurality of SPSs is configured. A base station may transmit to a UE at least one RRC message comprising SPS configuration parameters comprising a first SPS RNTI and a second SPS RNTI. For example, a first SPS RNTI may be configured for a first SPS configuration (e.g. for VOIP), and a second SPS RNTI may be configured for a second SPS configuration (e.g. for V2X communications). The UE may monitor PDCCH for at least DCIs corresponding to the first SPS RNTI and the second SPS RNTI.

When Semi-Persistent Scheduling is enabled by RRC, at least one or more of the following information may be provided: Semi-Persistent Scheduling C-RNTI(s); Uplink Semi-Persistent Scheduling interval semiPersistSchedIntervalUL, number of empty transmissions before implicit release implicitReleaseAfter, if Semi-Persistent Scheduling is enabled for the uplink; Whether twoIntervalsConfig is enabled or disabled for uplink, for TDD; Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink; and/or other parameters.

When Semi-Persistent Scheduling for uplink or downlink is disabled by RRC, the corresponding configured grant or configured assignment may be discarded.

In an example, after a Semi-Persistent downlink assignment is configured, the MAC entity may consider sequentially that the Nth assignment occurs in the subframe for which: (10*SFN+subframe)=[(10*SFNstart time+subframestart time)+N*semiPersistSchedIntervalDL] modulo 10240. Where SFNstart time and subframestart time may be the SFN and subframe, respectively, at the time the configured downlink assignment were (re)initialized.

In an example, after a Semi-Persistent Scheduling uplink grant is configured, the MAC entity may: if twoIntervalsConfig is enabled by upper layer: set the Subframe_Offset according to Table below. else: set Subframe_Offset to 0. consider sequentially that the Nth grant occurs in the subframe for which: (10*SFN+subframe)=[(10*SFNstart time+ subframestart time)+N*semiPersistSchedIntervalUL+Subframe_Offset*(N modulo 2)] modulo 10240. Where SFNstart time and subframestart time may be the SFN and subframe, respectively, at the time the configured uplink grant were (re-)initialised. FIG. 11. shows example subframe offset values.

The MAC entity may clear the configured uplink grant immediately after implicitReleaseAfter number of consecutive MAC PDUs containing zero MAC SDUs have been provided by the Multiplexing and Assembly entity, on the Semi-Persistent Scheduling resource. Retransmissions for Semi-Persistent Scheduling may continue after clearing the configured uplink grant.

In an example embodiment, SPS configurations may be enhanced to support transmission of various V2X traffic and/or voice traffic by a UE. There is a need to support multiple SPS configurations for a UE. For example, a UE supporting V2X may need to support multiple uplink SPS configurations for transmitting various periodic (or semi-periodic) traffic and/or voice traffic in the uplink. Other examples may be provided. For example, CAM messages in V2X may be semi-periodic. In some scenarios, CAM message generation may be dynamic in terms of size, periodicity and timing. Such changes may result in misalignment between SPS timing and CAM timing. There may be some regularity in size and periodicity between different triggers. Enhanced SPS mechanisms may be beneficial to transmit V2X traffic, voice traffic, and/or the like. In an example, various SPS periodicity, for example 100 ms and is may be configured.

In an example, multiple SPS configurations may be configured for UU and/or PC5 interface. An eNB may configure multiple SPS configurations for a given UE. In an example, SPS configuration specific MCS (e.g. MCS as a part of the RRC SPS-configuration) and/or SPS-configuration-specific periodicity may be configured. In an example, some of the SPS configuration parameters may be the same across multiple SPS and some other SPS configuration parameters may be different across SPS configurations. The eNB may dynamically trigger/release the different SPS-configurations employing (E)PDCCH DCIs. In an example, the multiple SPS configurations may be indicated by eNB RRC signaling. The dynamical triggering and releasing may be performed by eNB transmitting (E)PDCCH DCI to the UE employing SPS C-RNTI.

In an example embodiment, a UE may transmit UE SPS assistant information to a base station indicating that the UE does not intend and/or intend to transmit data before a transmission associated to an SPS configuration. The eNB may acknowledge the UE indication. For V2X communication, a UE may provide UE assistance information to an eNB. Reporting of UE assistance information may be configured by eNB transmitting one or more RRC messages. The UE assistance information may include parameters related to the SPS configuration. Triggering of UE assistance information transmission may be left to UE implementation. For instance, the UE may be allowed to report the UE assistance information when change in estimated periodicity and/or timing offset of packet arrival occurs. For V2X communication via Uu, SR mask as per legacy mechanism may be used.

Some example V2X messages are CAM, DENM and BSM. For Example, CAM message may have the following characteristics. Content: status (e.g. time, position, motion state, activated system), attribute (data about dimension, vehicle type and role in the road traffic). Periodicity: typical time difference between consecutive packets generation is bounded to the [0.1, 1] sec range. Length: Variable. For Example, DENM message may have the following characteristics. Content: Contain information related to a variety of events. Periodicity: Event triggers the DENM update. In between two consequent DENM updates, it is repeated with a pre-defined transmission interval. Length: Fixed until DENM update. For Example, BSM message may have the following characteristics. Content: Part I contains some of the basic vehicle state information such as the message ID, vehicle ID, vehicle latitude/longitude, speed and acceleration status. Part II contains two option data frames: VehicleSafetyExtension and VehicleStatus. Periodicity: Periodic, the periodicity may be different considering whether BSM part II is included or not and the different application type. Length: Fixed, with different message size considering whether part II exists or not.

In an example, SPS may be employed for the transmission of BSM, DENMs and CAMs. For example, the UE's speed/position/direction changes within a range. BSM may be periodic traffic with a period of 100 ms. The message size of BSM may be in the range of 132~300 Bytes without certificate and 241~409 Bytes with certificate. DENMs, once triggered, may be transmitted periodically with a given message period which may remain unchanged. The message size of the DENM may be 200~1200 Bytes. If the UE's speed/position/direction does not change or changes within a small range, the CAM generation periodicity may be fixed.

The SPS may be supported for the UL and DL VoIP transmission. In the current SPS specification, the base station may configure SPS periodicity via dedicated RRC signaling. The periodicity of VoIP packet is generally fixed.

The UE may transmit traffic associated with multiple V2X services, which may require different periodicity and packet sizes. The SPS TB size and period may be adapted to different V2X services. Multiple parallel SPS processes may be activated at the UE. The SPS processes may differ in the amount of resource blocks (RBs) allocated and/or SPS period and may correspond to different types of V2X packets. Once the AS layer of UE receives the V2X packets from upper layer, the UE may trigger V2X packet transmissions on the corresponding SPS grant. Multiple UL SPS configurations may be configured for the UE.

The eNB may configure different SPS C-RNTIs for different SPS processes of the UE. SPS activation and release mechanism may be implemented. Employing at least one or more SPS RNTIs, the eNB may trigger which SPS process is activated or released. In an example implementation, in order to support multiple SPS configurations different SPS C-RNTIs may be configured for different SPS traffic types. For example, a first SPS C-RNTI may be configured for SPS configuration to transmit voice traffic, a second SPS C-RNTI may be configured for SPS configuration to transmit a V2X traffic. An eNB may transmit one or more RRC messages comprising multiple SPS configuration parameters. The multiple SPS configuration parameters may comprise multiple SPS-RNTI parameters for multiple SPS traffic types (e.g. multiple UL SPS configurations).

In the current LTE standard, a maximum of one downlink SPS and/or one uplink SPS may be configured for the PCell. Configuration of multiple SPSs are not supported for the PCell or any other cell. An SPS RNTI is configured for the UE to support one DL SPS configuration and/or one UL SPS configuration. The current SPS-Config IE comprises: semi-PersistSchedRNTL: RNTI; sps-ConfigDL: SPS-ConfigDL; sps-ConfigUL: SPS-ConfigUL. Example embodiments enhance SPS configuration and processes to enable multiple SPS configuration for downlink, uplink and/or sidelink of a cell.

In an example, CAM message generation may be dynamic in terms of size, periodicity and timing. Such changes may result in misalignment between SPS timing and CAM timing. There may be some regularity in size and periodicity between different triggers. UE assistance may be needed to trigger and/or employ SPS.

Figure 17:
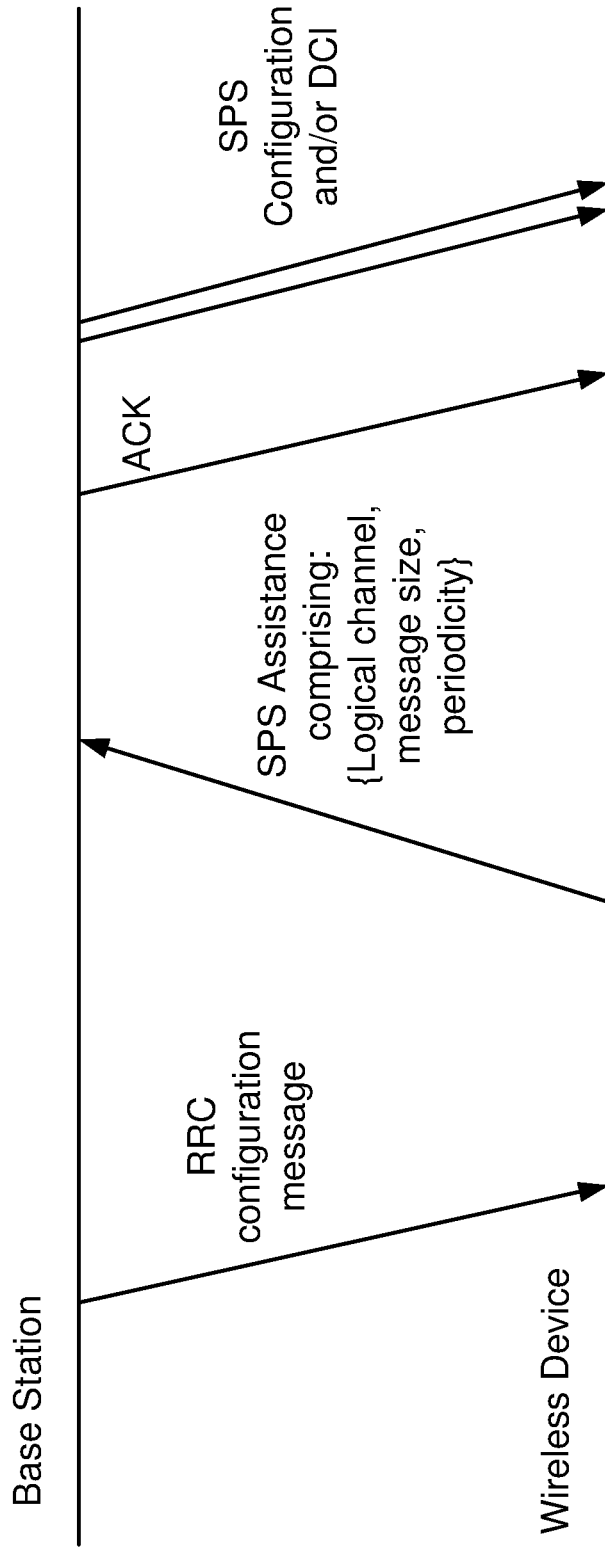
FIG. 17 is an example diagram depicting example signaling flow as per an aspect of an embodiment of the present disclosure.

FIG. 17 shows an example signaling flow for configuring and transmitting UE SPS assistance. In an example embodiment, a base station may transmit one or more RRC messages to configure reporting of UE assistance information. A UE may transmit UE SPS assistance information to a base station indicating that the UE intends to transmit data associated to an SPS configuration. In response, the base station may transmit to the UE an acknowledgement to the UE indication. A UE may provide UE assistance information to a base station for V2X communications. The UE assistance information may include parameters related to SPS traffic and configurations. Triggering of UE assistance information transmission may be left to UE implementation. For instance, the UE may be allowed to report the UE assistance information when change in an estimated periodicity and/or a timing offset of packet arrival occurs.

In an example, a base station may provide one or more SPS configurations for the UE via RRC signaling. SPS configurations may be for transmission of SPS traffic via a downlink, an uplink and/or via a sidelink. When a UE needs to transmit a type of message employing SPS, the UE may report UE SPS assistance information about one or more SPS traffic types to the base station. UE SPS assistance information may indicate at least one of the following SPS assistance parameters for an SPS traffic type. The SPS assistance parameters may indicate at least one of the following: message type, logical channel, traffic/message size, SPS configuration index, traffic type, and/or traffic periodicity. The base station may transmit an SPS transmission grant (e.g. DCI activating an SPS) based on the UE assistance report. The base station may provide an SPS DCI grant for an SPS configuration and SPS radio resources based on the assistance information transmitted by the UE. After receiving the grant, the UE may initialize the corresponding SPS configuration and may transmit the data via the radio resources allocated to the UE. The UE assistance information may enable the base station to determine logical channels and traffic priority and size. The base station may configure/activate the corresponding SPS for the UE. For example, legacy mechanisms do not provide UE SPS assistance information comprising at least one logical channel and other assistance parameters. This improved process enhances SPS transmission efficiency in the uplink.

In an example, multiple SPSs may be activated in parallel. For example, a new service may be triggered while a previous service is on-going. In an example, the UE may transmit an assistance message to the base station indicating new information about new messages (SPS traffic) for transmission. The base station may provide a second SPS transmission grant for transmission of the new service/message(s). The UE may select the second SPS configuration and corresponding resources for transmission of new SPS traffic. In an example, a previous SPS grant and a new SPS grant may continue in parallel.

In an example, a UE may transmit traffic associated with multiple V2X services, which may require different periodicity and packet sizes. The SPS TB size and period may be adapted to different V2X services. Multiple parallel SPS processes may be activated in parallel at the UE. Different SPS processes may differ in the number of allocated resource blocks (RBs) and/or SPS periodicity and may correspond to different types of V2X packets. Once the radio layer of UE receives the V2X packets from a V2X application, the UE may trigger V2X packet transmissions on the corresponding SPS grant. Multiple UL SPS configurations may be configured for a UE.

When configuration of multiple SPSs are required, legacy mechanisms may be extended to support multiple SPSs. The base station may configure different SPS RNTIs for different SPS processes of the UE. SPS activation and release mechanism may be implemented. The base station may trigger which SPS process is activated or released employing at least one or more SPS RNTIs. In an example implementation, in order to support multiple SPS configurations different SPS RNTIs may be configured for different SPS configurations. For example, a first SPS RNTI may be configured for SPS configuration to transmit a first V2X traffic, a second SPS RNTI may be configured for SPS configuration to transmit a second V2X traffic. A base station may transmit one or more RRC messages comprising multiple SPS configuration parameters. The multiple SPS configuration parameters may comprise multiple SPS-RNTI parameters for multiple SPS configurations (e.g. multiple UL SPS configurations). Some of the example embodiments may implement multiple SPS RNTIs, and some may implement a single SPS RNTI.

A UE configured with multiple SPS RNTIs may need to monitor search space of PDCCH for multiple SPS RNTIs. When the number of required SPS configurations increases, this mechanism may increase UE processing requirements and/or power consumption. Extension of legacy mechanisms, for implementation of multiple SPS configurations, increases UE processing requirements and battery power consumption. In an example, a UE may be configured with many SPS configurations (e.g. 4, or 8, etc) for different types of V2X traffic. There is a need to improve SPS configuration and activation/release mechanisms in a base station and wireless device when multiple SPSs are configured. Example embodiments may increase signaling overhead, however the potential benefits outweight the increased overhead when V2X communication is enabled. Example embodiments improve base station and UE implementations, enhance network performance, reduce UE monitoring requirements, and reduce battery power consumption, when multiple SPSs are configured for a given UE for transmission of SPS traffic via an uplink (UL) or a sidelink (SL).

In an example, multiple downlink, uplink, and/or sidelink SPSs may be configured for a cell. In an example, one or more SPS RNTIs may be configured when a plurality of SPSs are configured. In an example, an RRC message may comprise an index identifying an SPS configuration of a cell. In an example, the DCI employing SPS RNTI and triggering an SPS may include the index of the SPS that is triggered (initialized, activated) or released (deactivated). For example, the DCI activating or releasing an uplink SPS corresponding to a V2X SPS traffic may comprise an UL SPS configuration index field (e.g. 3 bits) identifying the SPS configuration corresponding the SPS configuration index. SPS configuration index may indicate the index of one of one or more SL/UL SPS configurations. Using this enhanced mechanism multiple SPSs may be configured using the same SPS RNTI (e.g. for V2X traffic). This may reduce UE battery power consumption and provide flexibility in configuring multiple SPSs.

Figure 14:
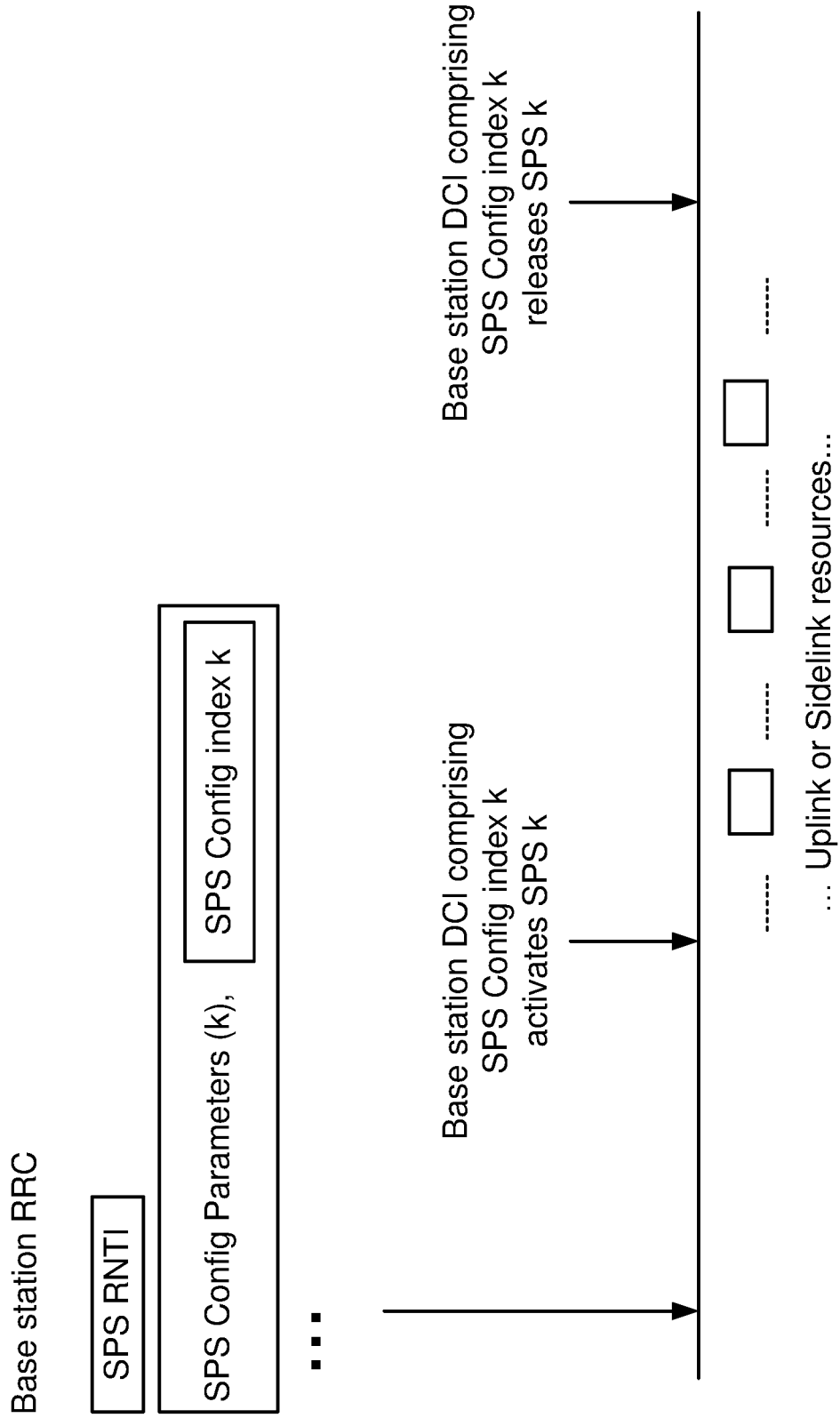
FIG. 14 is an example diagram depicting example RRC configuration and example DCIs as per an aspect of an embodiment of the present disclosure.

In an example embodiment, when one or more SPS grant configurations are configured for a UE, for example, when one or more SPS-ConfigUL and/or SPS-ConfigSL are configured on a cell or when one or more SPS grant configurations are configured within an SPS-ConfigUL and/or SPS-ConfigSL, RRC configuration parameters may comprise an SPS configuration index. One or more uplink SPS configuration parameters may be assigned to (associated with) the same SPS RNTI. Different SPS configurations (e.g. having different SPS periodicity) may be assigned to the same SPS RNTI, and may be identified by different SPS configuration indexes. In an example embodiment, one or more SPS configurations (e.g. multiple periodicity, MCS, and/or other parameters) may be triggered employing the same SPS RNTI, and using different SPS configuration indexes. FIG. 14 shows an example RRC configuration and example DCIs activating and releasing an SPS for an uplink or a sidelink. A similar mechanism may be applied to the downlink.

The example mechanism may be applied to downlink, uplink and/or sidelink SPS configurations. For example, when one or more SPS grant configurations are configured for transmission of various V2X traffic via sidelink by a UE, for example, when one or more SPS configurations are configured for a sidelink of a cell, RRC configuration parameters may comprise an SPS RNTI for the sidelink, and one or more SPS configuration indexes (each associated with a sidelink SPS RRC configuration). One or more uplink SPS configuration parameters may be assigned to (associated with) the same sidelink SPS RNTI for sidelink SPS activation and release. Different SPS configurations (e.g. having different periodicity) may be assigned to the same sidelink SPS RNTI, and may be identified by different SPS configuration indexes. In an example embodiment, one or more sidelink SPS configurations (e.g. multiple periodicity, MCS, and/or other parameters) may be triggered employing the same sidelink SPS RNTI for transmission of SPS V2X traffic via a sidelink.

In an example, SPS-ConfigUL1 may be assigned SPS RNTI and SPS-ConfigIndex1, and SPS-ConfigUL2 may be assigned SPS RNTI and SPS-ConfigIndex2. A base station may transmit one or more RRC messages comprising configuration parameters of one or more cells (e.g. PCell and/or SCell(s)). The configuration parameters may comprise configuration parameters for one or more SPSs. The configuration parameters may comprise the SPS RNTI, SPS-ConfigIndex1 and SPS-ConfigIndex2.

In an example, SPS-ConfigUL IE may comprise an SPS RNTI and an SPS-ConfigIndex1 and an SPS-ConfigIndex2. One or more first SPS configuration parameters may be associated with SPS-ConfigIndex1 and one or more second SPS configuration parameters may be associated with SPS-ConfigIndex2. Example of SPS configuration parameters maybe periodicity, HARQ parameter(s), MCS, grant size, and/or any other SPS configuration parameter presented in RRC SPS configuration. A base station may transmit one or more RRC messages comprising configuration parameters of one or more cells (e.g. PCell and/or SCell(s)). The configuration parameters may include configuration parameters for one or more SPSs. The configuration parameters may comprise the SPS RNTI, SPS-ConfigIndex1 and SPS-ConfigIndex2.

The UE configured with SPS configurations may monitor PDCCH and search for a DCI associated with the SPS RNTI (e.g. scrambled with SPS-RNTI). The base station may transmit a DCI associated to SPS RNTI to the UE to activate or release an SPS grant. The UE may decode a DCI associated with the SPS RNTI. The DCI may comprise one or more fields comprising information about the grant. The DCI may further comprise an SPS configuration index. The SPS configuration index may determine which one of the SPS configurations are activated or released.

Some of example fields in the DCI grants for an SPS in a legacy system is employed. Many of fields are marked by N/A. In an example embodiment, one of the existing fields (e.g. one of the N/A fields), or a new field may be introduced in a DCI for indicating the SPS configuration index. An SPS configuration index field in the DCI may identify which one of the SPS configurations is activated or released. The UE may transmit or receive data according the grant and SPS configuration parameters.

In an example embodiment, a wireless device may receive at least one message comprising: a semi-persistent scheduling (SPS) cell radio network temporary identifier (RNTI); a first SPS configuration parameter(s); a second SPS configuration parameter(s); a first SPS configuration index value associated with the first SPS configuration parameters; and a second SPS configuration index value associated with the second SPS configuration parameters. The wireless device may receive a downlink control information (DCI) associated with the SPS RNTI. The DCI comprises one or more fields of an SPS grant and an SPS configuration index value. The wireless device may transmit/receive SPS traffic on radio resources identified in the SPS grant considering the SPS configuration parameters associated with the SPS configuration index value. The SPS configuration parameter associated with the SPS configuration index may include, for example, SPS periodicity, MCS, radio resource parameters, and/or other SPS parameters included in SPS configurations.

Figure 15:
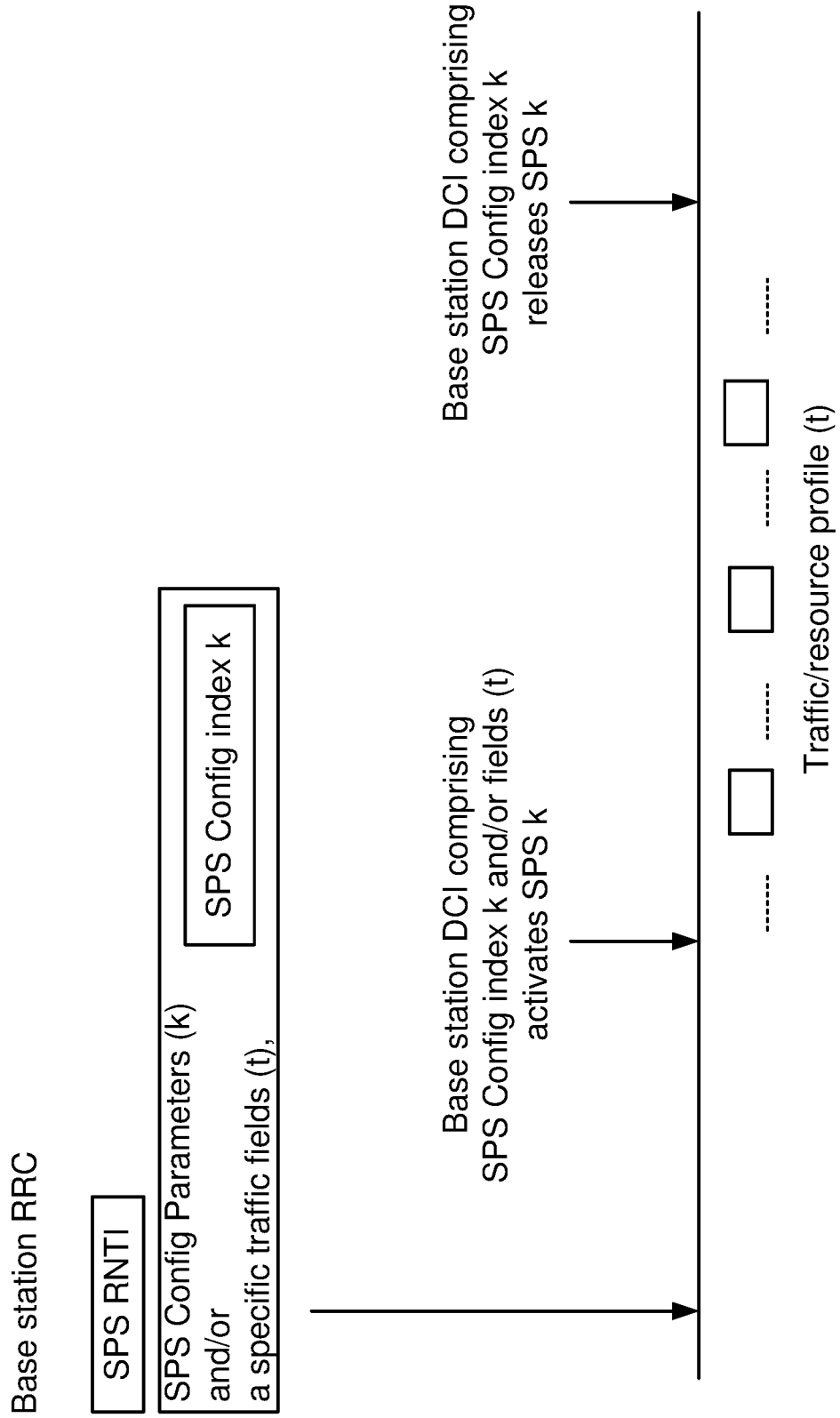
FIG. 15 is an example diagram depicting example RRC configuration and example DCIs as per an aspect of an embodiment of the present disclosure.

In an example embodiment, an SPS grant may be for a specific message type. In current mechanisms, SPS configuration parameters and/or an SPS DCI grant do(es) not comprise information on traffic types associated with the grant. In an example embodiment, a wireless device may receive at least one message comprising: a semi-persistent scheduling (SPS) cell radio network temporary identifier (RNTI); and a sequence of one or more SPS configuration IEs. An SPS configuration IE may comprise SPS configuration parameters, SPS configuration index, and/or one or more fields indicating a traffic/resource profile (e.g. traffic index value) associated with the SPS configuration parameters. The index for the traffic type may be a logical channel identifier, bearer identifier, V2X traffic type identifier, a service type, a radio resource type and/or the like. The one or more fields may also determine a relative priority of the traffic type compared with other traffics. The wireless device may receive a downlink control information (DCI) associated with the SPS RNTI. The DCI may comprise at least one of SPS Config index and/or traffic/resource profile fields. Example embodiments may increase signaling overhead, however the potential benefits outweigh the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 15 shows an example SPS configuration and example activation/release DCIs for transmission of various traffic types. When RRC SPS configuration parameters and/or one or more DCI fields indicate traffic/resource profile, the UE may transmit uplink data including the corresponding traffic type in the corresponding SPS grant.

In an example, SPS configurations may include a sequence of various configuration parameters. In an example embodiment, a wireless device may receive at least one message comprising: a semi-persistent scheduling (SPS) cell radio network temporary identifier (RNTI); a sequence of one or more SPS configuration parameters, e.g. periodicities. In an example, each of the one or more SPS configurations parameters (e.g. SPS Config IE comprising a periodicity IE value) may be associated with an SPS configuration index. The wireless device may receive a downlink control information (DCI) associated with the SPS RNTI. The DCI may comprise one or more fields of an SPS grant (e.g. a first SPS configuration index value). The wireless device may activate (transmit/receive) SPS traffic on radio resources identified in the SPS grant considering the SPS configuration parameters (e.g. associated with the first SPS configuration index value). In an example, the DCI may comprise one or more fields comprising traffic/resource profile parameters.

Figure 16:
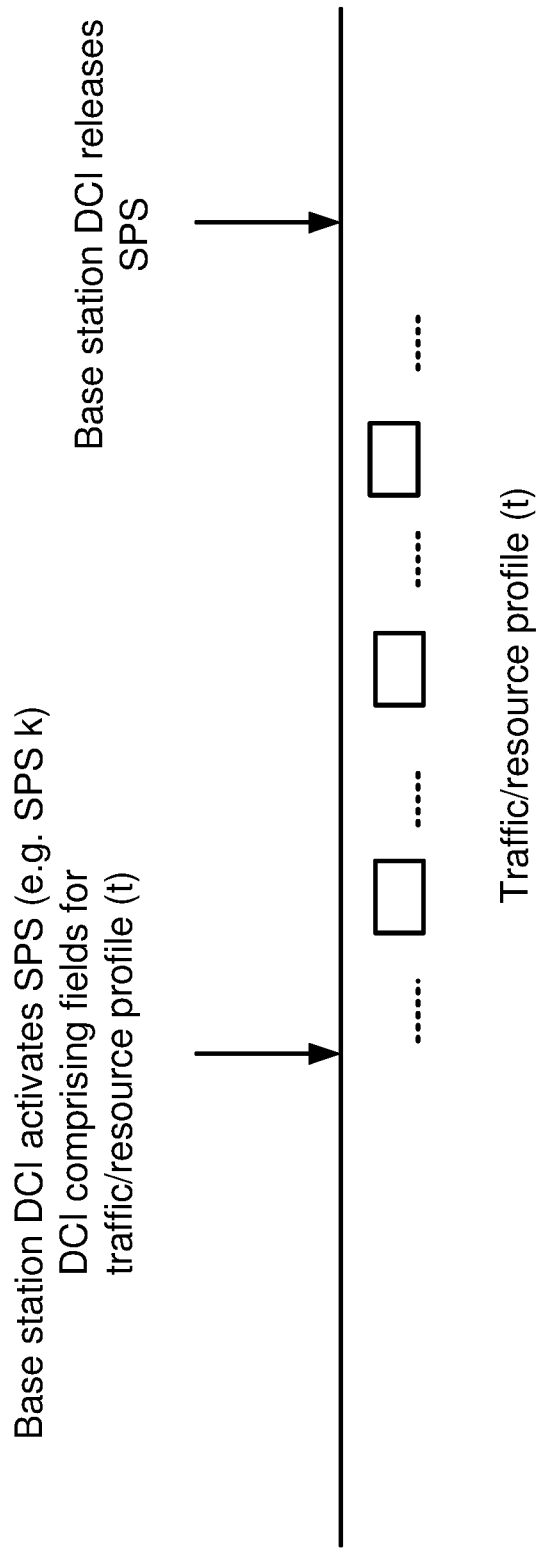
FIG. 16 is an example diagram depicting example DCIs as per an aspect of an embodiment of the present disclosure.

The DCI may comprise one or more fields indicating a traffic/resource profile (e.g. traffic/resource index value) associated with the SPS configuration parameters. The index for the traffic type may be a logical channel identifier, bearer identifier, V2X traffic type identifier, a service type, a radio resource type and/or the like. In an example, the one or more fields may also determine a relative priority of the traffic type compared with other traffics. Example embodiments may increase signaling overhead, however the potential benefits outweight the increased overhead when communications of various traffic types are enabled. Example embodiments enable a UE and a base station to provide SPS (periodic) resources for one or more specific traffic types. This process enhances UE uplink traffic multiplexing and enhances overall spectral efficiency of the air interface. In an example, a grant can be provided for transmission of traffic with high priority, while lower priority traffic may use dynamic grants. FIG. 16 shows an example activation/release DCIs for transmission of various traffic types. When one or more DCI fields indicate traffic/resource profile, the UE may transmit uplink data including the corresponding traffic type in the corresponding SPS grant.

Example embodiments may be employed when one or more SPS RNTIs are configured. A given SPS traffic (message type) may be transmitted with various periodicity depending on vehicle speed or other parameters. Example embodiments enable updating SPS grant configuration without the need for reconfiguring SPS grants. Example embodiments may be employed for activation or release of an SPS configuration.

Figure 13:
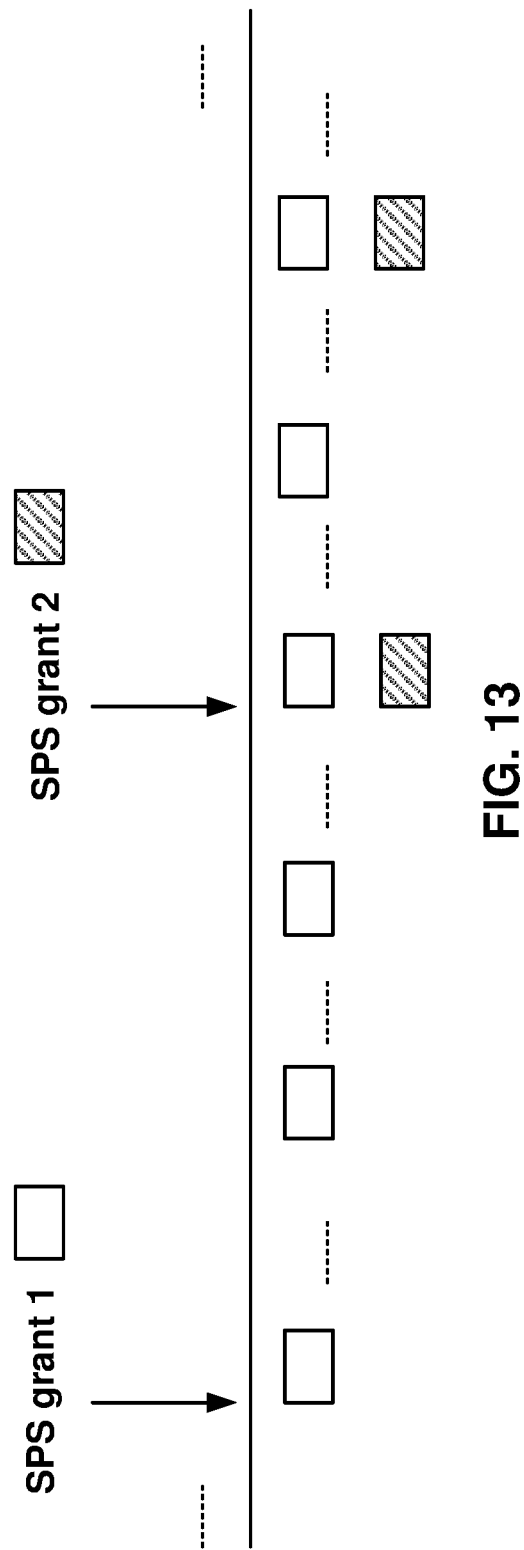
FIG. 13 is an example diagram depicting example multiple parallel SPSs as per an aspect of an embodiment of the present disclosure.

In an example, multiple SPSs may be activated in parallel. For example, a new SPS may be triggered while a previous SPS is on-going. In an example, the UE may transmit to a base station a message comprising assistant information indicating that the UE requires new SPS resources for transmission of new messages. The assistant information may comprise information about at least one SPS traffic type, e.g. logical channel, periodicity, message size, and/or the like. The base station may provide an SPS grant for the new service/message(s). The UE may employ an SPS configuration and a corresponding SPS resources for uplink transmission of a corresponding traffic. In an example, a previous SPS grant and a new SPS grant may be employed in parallel. FIG. 13 shows an example when multiple SPS grants are activated in parallel. A base station may transmit SPS grant 1 in a first subframe for transmission of a first SPS traffic. The base station may transmit SPS grant 2 in a second subframe for transmission of a second SPS traffic. The first SPS grant and the second SPS grant may have different parameters, for example, may comprise different RBs assignments, may have different periodicity, may have different DCI and RRC configuration parameter(s), and/or the like. In an example embodiment, an instance of the first SPS grant and an instance of the second SPS grant may overlap in the same subframe.

In an example embodiment, a base station scheduling mechanism may avoid or reduce the possibility of such a scenario. Such limitation may add additional complexity and constraint on base station scheduling mechanism and may reduce overall spectral efficiency in the uplink. There is a need to implement mechanisms for a UE and/or base station to enhance uplink transmission mechanisms when multiple uplink SPS grants coincide in the same subframe and/or TTI.

In an example embodiment, multiple uplink SPSs are configured on a cell, for example, with different periodicity, or other parameters. In an example, some of the RRC parameters may be the same for various SPS configurations on a cell. For example, when multiple SPSs are configured on a cell, the SPSs may employ the same p0-Persistent, and/or p0-PersistentSubframeSet2-r12 to enable the same uplink power calculation configuration for multiple SPSs on the cell. In an example, some other parameters, such as twoIntervalsConfig, implicitReleaseAfter, and/or MCS (if configured as an RRC parameter) may be the same across more than one SPS configuration. Multiple SPS configurations may have the same common parameters, and have its own SPS specific parameter.

In an example, DCI format 0 may be used for the scheduling of PUSCH in one UL cell. Other DCI formats may be used for downlink or uplink SPS grants. When multiple SPS are activated in parallel, some instances of the SPSs may coincide in the same subframe. The UE may be able to transmit on both grants in the same subframe when some of the transmission parameters are the same across SPS grants. For example, the UE may transmit on multiple grants in the same subframe, when the grants have the same MCS, and/or same hopping pattern. In an example, additional limitations may apply. For example, two grants may need to have the same Cyclic shift for DM RS and OCC index, and/or may need to have adjacent RB assignments. In an example embodiment, a base station scheduling mechanism may consider these constraints when activating parallel SPSs on a cell (for example, when an instance of SPS grants coincides on the same subframe). In an example, parallel transmission based on multiple grants on a subframe may be implemented.

In an example, a UE may aggregate multiple grants in a subframe. For example, the UL PUSCH transmit power may be calculated considering the common RRC configuration parameters, aggregated RBs for both grants, and power control parameters for the cell on the subframe containing both grants. The UE may add the number of RBs in the first grant and the second grant to calculate the number of RBs for uplink transmission. The UE may consider the same MCS for both grants in calculating the power. If the two grants have the same MCS, the MCS may be either MCS of the grants. If the two grants have different MCSs, the UE may consider the more stringent MCS (lower modulation and coding), MCS of the higher priority grant, or one of the two MCS according to a UE implementation rule. The UE may transmit both grants employing the same MCS that is employed for power control calculations. In an example, a MAC TB may be transmitted on the resources assigned in the aggregate of multiple grants. The base station may transmit an ACK for the received TB. In an example, MAC TBs of each grant may be built and transmitted on the associated grant. When multiple TBs are transmitted, the base station may transmit different ACK/NACK for different grants.

In an example, when multiple SPS grants coincide in the same subframe, the UE may calculate the power of each grant separately based on PUSCH power calculation formula. Example PUSCH power calculation method is shown in below. Other example formula and scenarios are described in the Appendix.

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$

In the event that the sum of the powers of multiple SPS grants in the subframe exceeds PcMAX, the UE may scale the transmit powers so that the sum of the powers is below the PcMAX. In an example, the UE may assign a higher priority to power of one of the grants compared with the other one(s). In an example, the UE may use a predetermined rule to determine the priority, e.g., based on the grant priority, size of the grant, MCS, and/or timing of the grant.

In an example, the UE may calculate the PUSCH power of PUSCH for each grant without considering PcMAX. The UE may add the power of PUSCHs, and when the total power exceeds PcMAX, the UE may employ a scaling rule to scale the transmit powers, so that transmit power on a cell does not exceed PcMAX.

$$P_{PUSCH,c}(i) = \min\begin{Bmatrix} P_{CMAX,c}(i), \\ P_{PUSCH,c}(i)_{grant1} + P_{PUSCH,c}(i)_{grant2} \end{Bmatrix}$$

In an example, when multiple SPS grants coincide in the same subframe, the UE may employ some of the grant parameters (e.g. MCS, and/or power parameters) of a selected grant (e.g. a grant with a higher priority). In an example, the UE may select one of the grants based on criteria, e.g. the grants that was received first, higher priority grant, larger grant, grant associated with a logical channel with higher priority and/or according to a predefined implementation rule. The UE may use some the parameters of the selected grant for uplink transmission for multiple grants. The UE may calculate the power based on the parameters of the selected grant, e.g. employing the above example methods.

In an example, when multiple SPS grants coincide in the same subframe, the UE may transmit uplink TBs employing a selected grant (e.g. a grant with a higher priority). The UE may drop other grant(s). In an example, the UE may select one of the grants based on criteria, e.g. the grants that was received first, the higher priority grant, the larger grant, grant associated with a logical channel with higher priority and/or according to a predefined implementation rule. The UE may transmit uplink signals employing the selected grant. The UE may drop/ignore other grant(s) and may not transmit uplink signals (TBs) in the other grant(s). The base station may be configured with this rule, and may not expect to receive TBs in a grant that is dropped/ignored.

In an example, when multiple SPS grants coincide in the same subframe n, the UE may transmit uplink TB s employing a selected grant (e.g. a grant with a higher priority) in the subframe n. The UE may shift other grant(s) and employ those grants for subframe n+k, e.g. k=1 (other values fork may also implemented, e.g. k=1, 2, etc). In an example, the UE may select one of the grants based on criteria, e.g. the grants that was received first, the higher priority grant, the larger grant, and/or according to a predefined implementation rule. The UE may transmit uplink signals in subframe n employing the selected grant. The UE may employ the other grant(s) for subframe n+k, and may transmit uplink signals (TBs) for the other grant(s) in subframe n+k. For example, k=1 for a second grant, and k=2 for a third grant. This mechanism may be preconfigured in the UE and base station, the base station may expect to receive TB(s) for the other grant in subframe n+k, and may not schedule those resources for other UEs.

Example embodiments may be preconfigured in the UE and base station, the base station may expect to receive TB(s) according to the example mechanism. Some of the examples may be combined, and different UEs may implement different example implementations based on UE configuration and/or capability.

According to various embodiments, a device (such as, for example, a wireless device, off-network wireless device, a base station, and/or the like), may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 25:
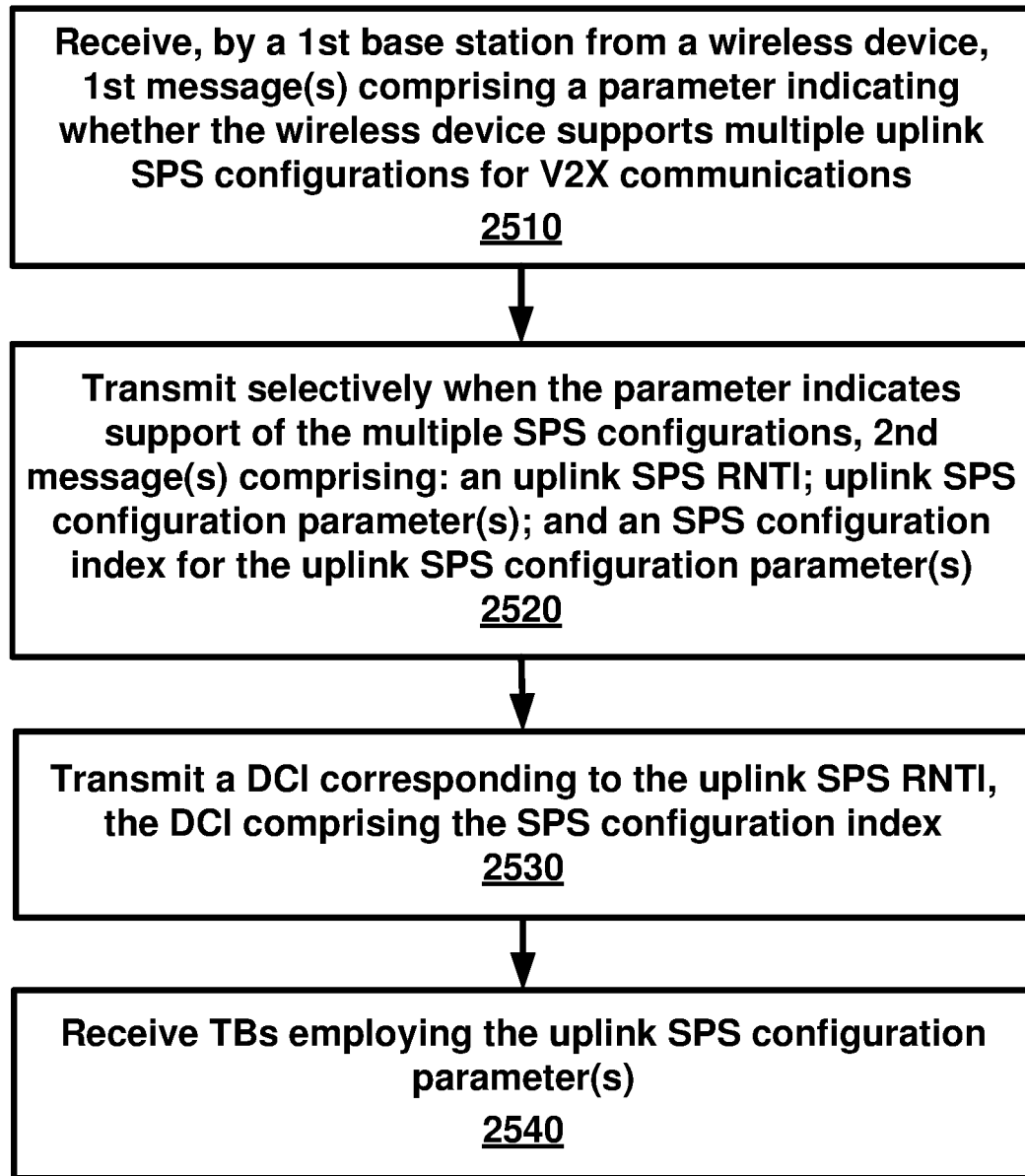
FIG. 25 is an example flow diagram as per an aspect of an embodiment of the present disclosure.

FIG. 25 is an example flow diagram as per an aspect of an embodiment of the present disclosure. At 2510, a first base station may receive, from a wireless device, at least one first message 1800. The first message 1800 may comprise UE SPS/V2X capabilities comprising a parameter indicating whether the wireless device supports multiple uplink semi persistent scheduling (SPS) configurations for V2X communications. According to an embodiment, the at least one parameter may further indicate whether the wireless device supports reporting SPS assistance information. According to an embodiment, the at least one parameter may further indicate whether the wireless device supports V2X communications with the base station.

At least one second (RRC) message, e.g. 1810 and/or 1830, may be selectively transmitted at 2520 when the parameter indicates support of the multiple SPS configurations. The at least one second message may comprise: an uplink SPS radio network temporary identifier (RNTI), at least one uplink SPS configuration parameter, and an SPS configuration index for the at least one uplink SPS configuration parameter. A downlink control information (DCI) corresponding to the uplink SPS RNTI may be transmitted at 2530. The DCI may comprise the SPS configuration index. At 2540, at least one transport block may be received employing the at least one uplink SPS configuration parameter. FIG. 13 through FIG. 17 show multiple examples of RRC configurations and DCIs. According to an embodiment, the DCI may indicate activation of the at least one uplink SPS configuration. The DCI may further comprise at least one resource parameter. The first base station may receive the at least one transport block in a subframe employing the at least one resource parameter. The subframe may be determined employing an uplink SPS interval of the at least one uplink SPS configuration parameter. According to an embodiment, the at least one uplink SPS configuration parameter may comprise at least one parameter indicating one or more traffic types corresponding to the uplink SPS IE. According to an embodiment, the at least one uplink SPS configuration parameter may comprise at least one parameter indicating one or more traffic types corresponding to the uplink SPS IE. According to an embodiment, the DCI may comprise at least one parameter indicating one or more traffic types corresponding to the uplink SPS IE.

According to an embodiment, the first base station may further transmit, to a second base station and in response to the first base station making a handover decision for the wireless device, a second message 1840 comprising the UE SPS/V2X capabilities comprising the parameter indicating whether the wireless device supports multiple uplink SPS configurations for V2X communications.

Figure 26:
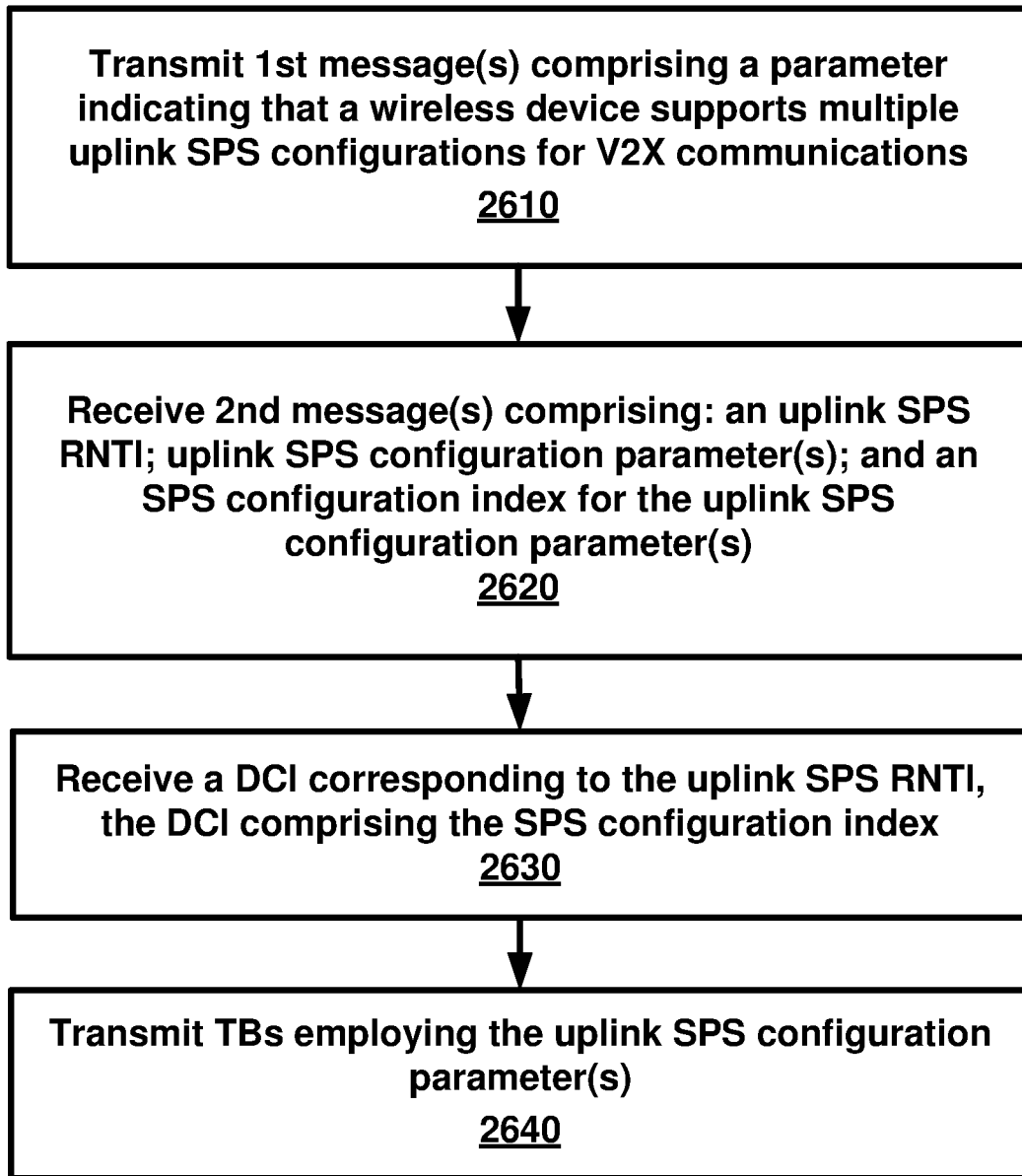
FIG. 26 is an example flow diagram as per an aspect of an embodiment of the present disclosure.

FIG. 26 is an example flow diagram as per an aspect of an embodiment of the present disclosure. At 2610, a wireless device may transmit, to a first base station, at least one first message 1800. The at least one first message may comprise UE SPS/V2X capabilities comprising a parameter indicating that the wireless device supports multiple uplink semi persistent scheduling (SPS) configurations for V2X communications. At least one second (RRC) message, e.g. 1810 and/or 1830, may be received at 2620. The at least one second message may comprise: an uplink SPS radio network temporary identifier (RNTI), at least one uplink SPS configuration parameter, and an SPS configuration index for the at least one uplink SPS configuration parameter. At 2630, a downlink control information (DCI) may be received. The DCI may correspond to the uplink SPS RNTI. The DCI may comprise the SPS configuration index. At 2640, at least one transport block may be transmitted employing the at least one uplink SPS configuration parameter.

Figure 27:
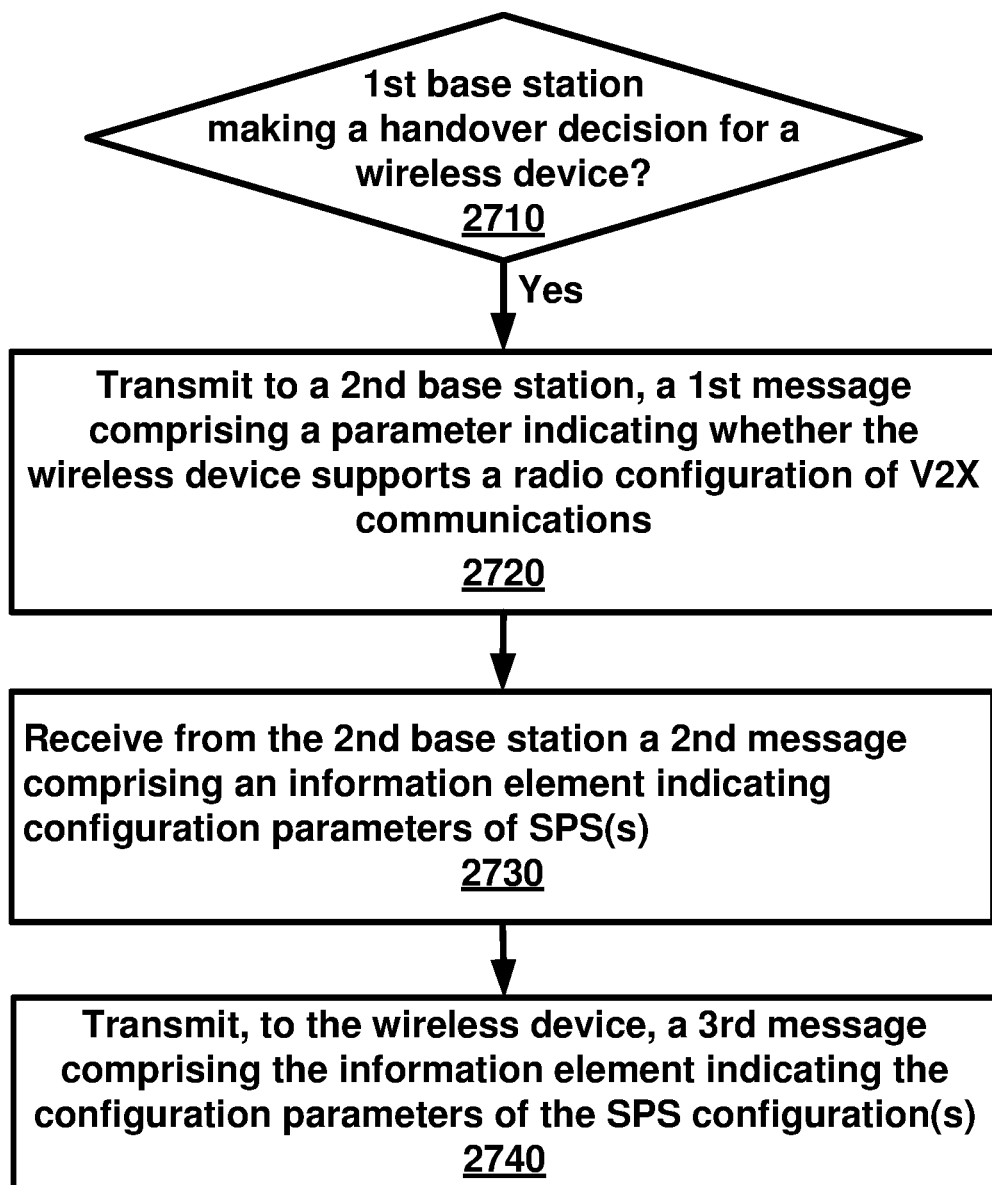
FIG. 27 is an example flow diagram as per an aspect of an embodiment of the present disclosure.

FIG. 27 is an example flow diagram as per an aspect of an embodiment of the present disclosure. At 2710, a determination may be made whether a first base station makes a handover decision for a wireless device. In response to a positive determination, the first base station may transmit to a second base station at 2720, a first message 1840 comprising UE SPS/V2X capabilities comprising a parameter indicating whether the wireless device supports multiple uplink semi persistent scheduling (SPS) configurations for V2X communications. According to an embodiment, the first message 1840 may indicate the configuration parameters of the at least one SPS when the wireless device supports the multiple SPS configurations. At 2730, a second message 1850 may be received from the second base station. The second message may comprise an information element indicating configuration parameters of at least one SPS. The configuration parameters may comprise: an uplink SPS radio network temporary identifier (RNTI), at least one uplink SPS configuration parameter, and an SPS configuration index for the at least one uplink SPS configuration parameter. At 2740, a third message 1860 may be transmitted to the wireless device. The third message 1860 may comprise the information element indicating the configuration parameters of the at least one SPS configuration.

According to an embodiment, the first message 1840 further comprises first configuration parameters for a first plurality of SPSs. According to an embodiment, the first base station may receive from the wireless device and prior to transmitting the first message 1840, at least one fourth message 1800 comprising UE SPS/V2X capabilities comprising the parameter indicating whether the wireless device supports the multiple uplink SPS configurations.

Figure 28:
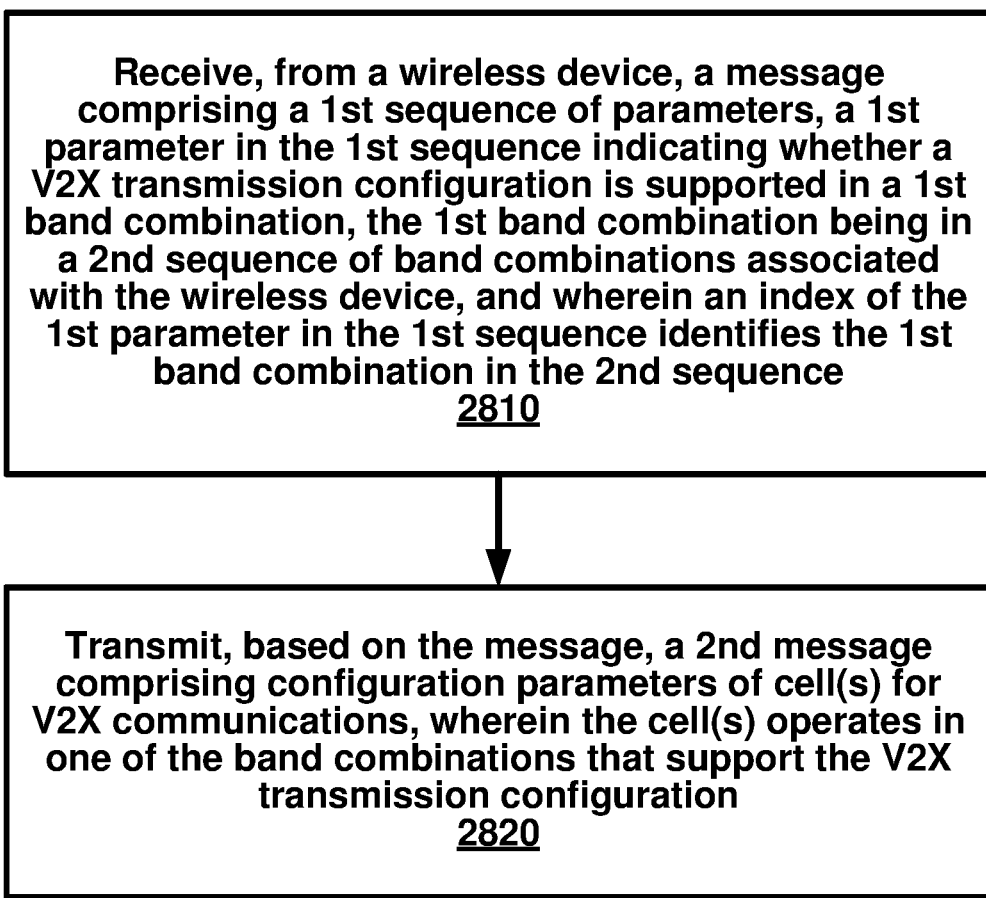
FIG. 28 is an example flow diagram as per an aspect of an embodiment of the present disclosure.

FIG. 28 is an example flow diagram as per an aspect of an embodiment of the present disclosure. At 2810, a base station may receive, from a wireless device, a message 1800 comprising UE SPS/V2X capabilities comprising a first sequence of a plurality of parameters. The UE SPS/V2X capabilities may also comprise the parameter indicating whether the wireless device supports the multiple uplink SPS configurations.

Figure 19:
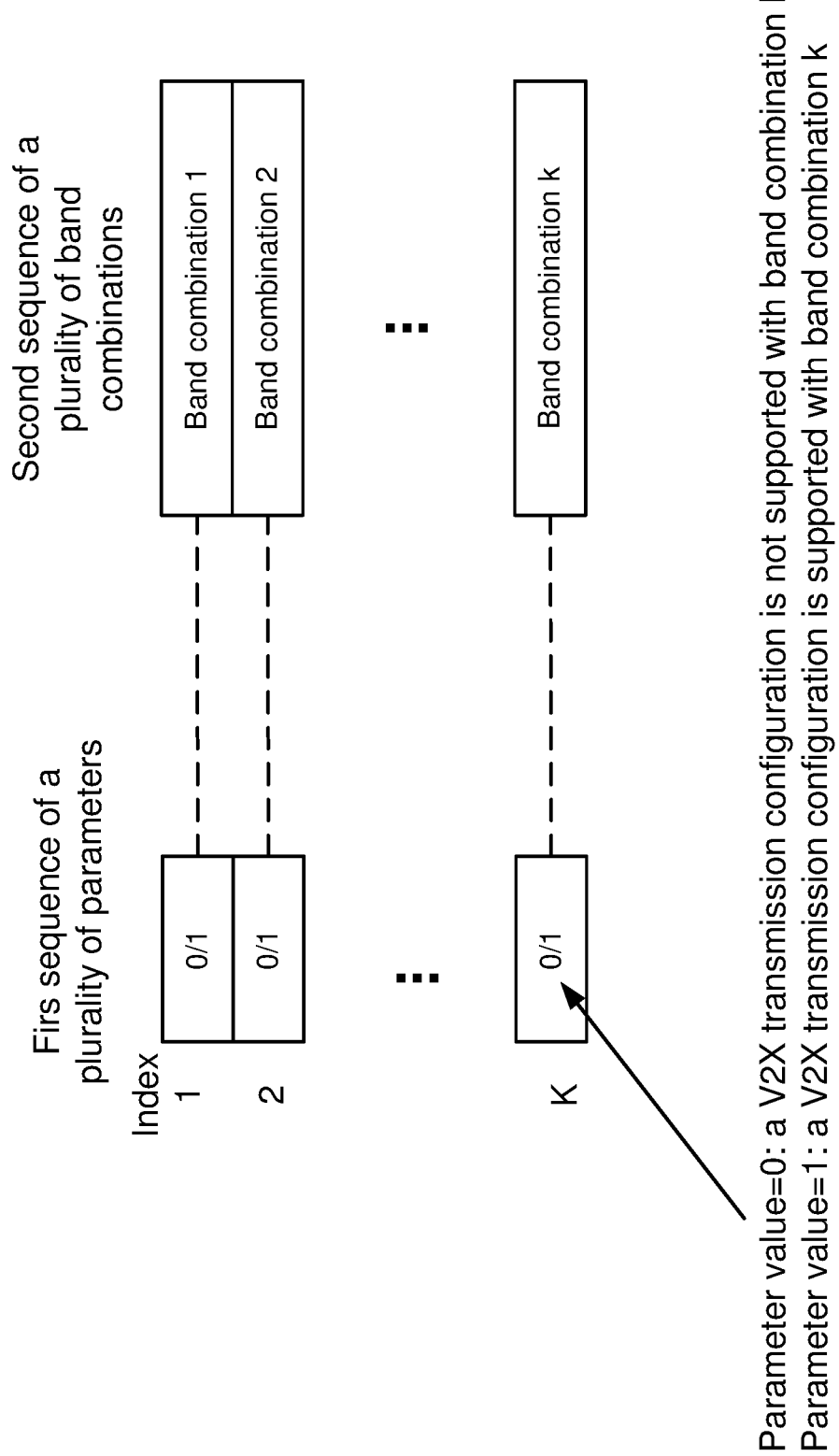
FIG. 19 is an example diagram depicting example UE V2X capabilities as per an aspect of an embodiment of the present disclosure.

FIG. 19 shows an example of UE V2X capabilities comprising the first sequence and the second sequence. A first parameter in the first sequence may indicate whether a V2X transmission configuration is supported in a first band combination. The first band combination may be in a second sequence of a plurality of band combinations associated with the wireless device. An index of the first parameter in the first sequence may identify the first band combination in the second sequence. According to an embodiment, the first band combination may comprise a third sequence of one or more band identifiers, and a band identifier of the sequence may indicate a specific band. At 2820, a second (RRC) message, e.g. 1810 and/or 1830, may be transmitted based on the message 1800. The second message, e.g. 1810 and/or 1830, may comprise configuration parameters of at least one cell for V2X communications. The at least one cell may operate in one of the plurality of band combinations that supports the V2X transmission configuration.

FIG. 19 shows an example of UE V2X capabilities comprising the first sequence and the second sequence. In an example embodiment, the base station may receive a message comprising UE SPS/V2X capabilities may be received e.g. via a first signaling bearer on the primary cell. The plurality of UE SPS/V2X capability parameters may comprise a first sequence of one or more parameters. A first parameter in the first sequence may indicate whether a V2X transmission configuration is supported for first band combination. The first band combination may be in a second sequence of one or more band combinations. The index of the first parameter in the first sequence may determine the index of the first band combination in the second sequence. According to some of the various embodiments, the size of the first sequence may be the same as the size of the second sequence. The index may determine the order of: the first parameter in the first sequence; and the first band combination in the second sequence. The first band combination may be identified by a first band combination parameter. The first band combination parameter may comprise a list of band identifier(s). Each of the band identifier(s) may be one of a finite set of numbers. Each of the numbers may identify a specific band. According to some of the various embodiments, the wireless device may support one or more inter-band V2Xs if the list of band identifier(s) includes more than one band; and the first parameter indicates that V2X is supported. In an example embodiment, the wireless device may support multiple intra-band V2X if the list of band identifier(s) includes one band; and the first parameter indicates that SPS/V2X is supported.

According to an embodiment, the second message, e.g. 1810 and/or 1830, may comprise: an uplink SPS radio network temporary identifier (RNTI), at least one uplink SPS configuration parameter, and an SPS configuration index for the at least one uplink SPS configuration parameter. According to an embodiment, the base station may further transmit a downlink control information (DCI) corresponding to the uplink SPS RNTI 1830. The DCI may comprise the SPS configuration index. According to an embodiment, the base station may further receive at least one transport block employing the at least one uplink SPS configuration parameter. According to an embodiment, the DCI may indicate activation of the at least one uplink SPS configuration. The DCI may further comprise at least one resource parameter. The base station may further receive the at least one transport block in a subframe employing the at least one resource parameter. The subframe may be determined employing an uplink SPS interval of the at least one uplink SPS configuration parameter. According to an embodiment, the at least one uplink SPS configuration parameter may comprise at least one parameter indicating one or more traffic types corresponding to the uplink SPS IE. According to an embodiment, the at least one uplink SPS configuration parameter may comprise at least one parameter indicating one or more traffic types corresponding to the uplink SPS IE. According to an embodiment, the DCI may comprise at least one parameter indicating one or more traffic types corresponding to the uplink SPS IE.

According to an embodiment, the first base station may transmit, to a second base station and in response to the first base station making a handover decision for the wireless device, a first message 1850 comprising UE SPS/V2X capabilities comprising the first sequence of the plurality of parameters. According to an embodiment, the first message may further comprise first configuration parameters for a first plurality of SPSs. The first base station may receive from the second base station, a second message 1850 comprising an information element indicating configuration parameters of at least one SPS. The configuration parameters may comprise, an uplink SPS radio network temporary identifier (RNTI), an SPS configuration index indicating an index of at least one uplink SPS configuration parameter, and at least one uplink SPS configuration parameter. A third message 1860 may be transmitted to the wireless device. The third message may comprise the information element indicating the configuration parameters of the at least one SPS configuration.

Figure 29:
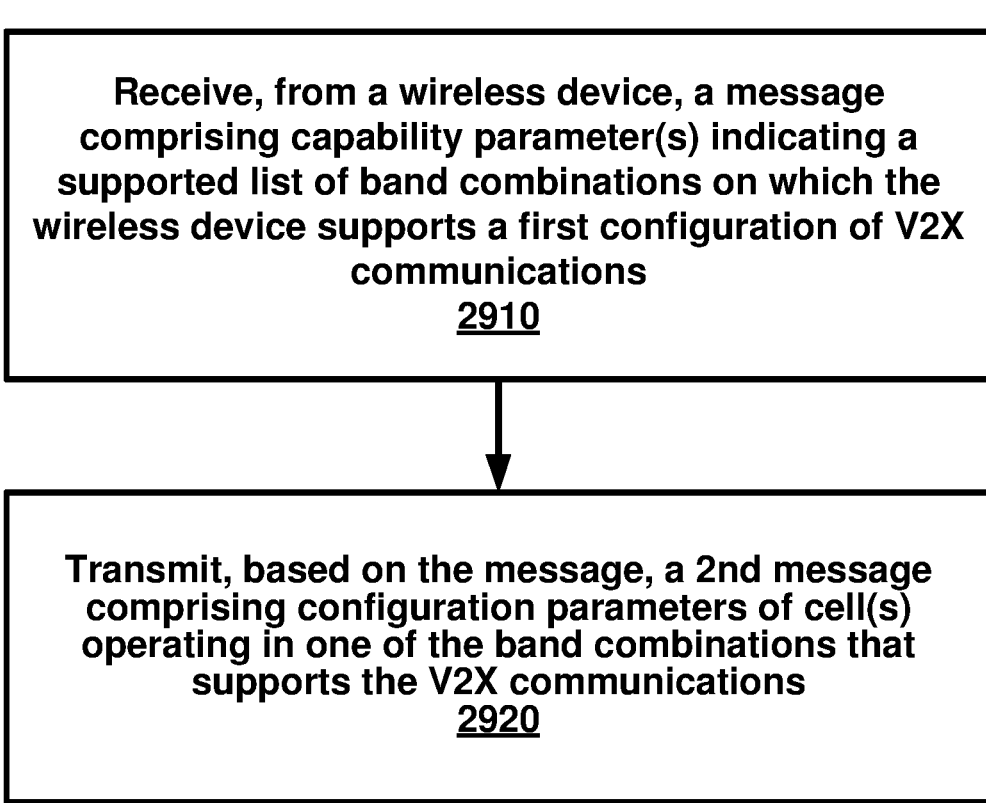
FIG. 29 is an example flow diagram as per an aspect of an embodiment of the present disclosure.

FIG. 29 is an example flow diagram as per an aspect of an embodiment of the present disclosure. At 2910, a base station may receive, from a wireless device, a message comprising a plurality of capability parameters comprising UE SPS/V2X capabilities. FIG. 20 shows an example UE V2X capability parameters. The plurality of UE V2X capability parameters may indicate a supported list of band combinations on which the wireless device supports a first configuration of V2X communications. A band combination of the supported list of band combinations may comprise a sequence of one or more band identifiers. A band identifier of the sequence may indicate a specific band. According to an embodiment, the plurality of capability parameters may further indicate configuration parameters for each of the supported list of band combinations. In an example, configuration parameters for a supported band combination may indicate a transmit power class for the band combination, and/or an uplink and/or sidelink configuration for the band combination. In an example, configuration parameters for a supported band combination may indicate configuration parameter(s) for a band in the band combination. For example, configuration parameters for a supported band combination may indicate a transmit power class, or uplink/sidelink configuration, modulation configuration, configuration of link parameters/timers for each band in the band combination.

FIG. 20 shows an example UE V2X capability parameters. The plurality of UE SPS/V2X capability parameters may indicate a supported list of band combinations on which the wireless device supports a first configuration of V2X communications. In an example implementation, the plurality of UE SPS/V2X capability parameters may comprise a first sequence of one or more parameters. A first parameter in the first sequence may indicate whether a V2X transmission configuration is supported for first band combination. The first band combination may be in a second sequence of one or more band combinations. The index of the first parameter in the first sequence may determine the index of the first band combination in the second sequence. In an example, a list (sequence) of one or more supported band combination may be supported. Each IE in the list may comprise band identifiers of a band combination. The plurality of capability parameters may further indicate radio configuration parameters for each of the supported list of band combinations. In an example, configuration parameters for a supported band combination may indicate a transmit power class for the band combination, and/or an uplink and/or sidelink configuration for the band combination. In an example, configuration parameters for a supported band combination may indicate configuration parameter(s) for a band in the band combination. For example, configuration parameters for a supported band combination may indicate a transmit power class, or uplink/sidelink configuration, modulation configuration, configuration of link parameters/timers for each band in the band combination.

At 2920, a second (RRC) message, e.g. 1810 and/or 1830, may be transmitted based on parameters comprised in the message 1800. The second message may comprise configuration parameters of at least one cell operating in one of the band combinations that supports the V2X communications. According to an embodiment, the second message may comprise: an uplink SPS radio network temporary identifier (RNTI), at least one uplink SPS configuration parameter, and an SPS configuration index for the at least one uplink SPS configuration parameter. According to an embodiment, the base station may further transmit a downlink control information (DCI) corresponding to the uplink SPS RNTI.

The DCI may comprise the SPS configuration index. At least one transport block may be further received employing the at least one uplink SPS configuration parameter.

Figure 30:
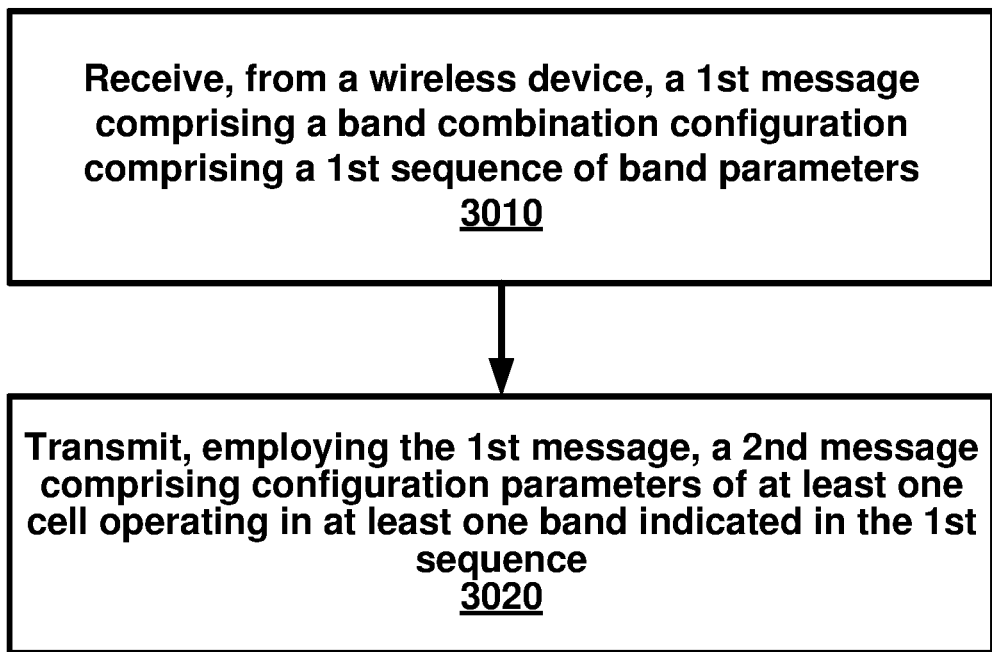
FIG. 30 is an example flow diagram as per an aspect of an embodiment of the present disclosure.

FIG. 30 is an example flow diagram as per an aspect of an embodiment of the present disclosure. At 3010, a base station may receive, from a wireless device, a first message 1800 comprising UE SPS/V2X capabilities comprising a band combination configuration. FIG. 21 shows an example of the band combination configuration. The band combination configuration may comprise a first sequence of a plurality of band parameters. A first band parameter in the first sequence may comprise: a first band identifier indicating a first band, a first radio configuration parameter, and at least one parameter indicating whether at least one V2X configuration is supported in the first band. Example, V2X configuration may be sidelink V2X communication, uplink V2X communication, a power class, a V2X transmission capability, and/or the like. At 3020, a second (RRC) message, e.g. 1810 and/or 1830, may be transmitted employing the parameters in the first message 1800. The second message may comprise configuration parameters of at least one cell operating in at least one band indicated in the first sequence.

FIG. 21 shows an example of the band combination configuration. The plurality of radio capability parameters may comprise a first sequence of one or more radio configuration IEs. A radio configuration IE in the sequence comprises radio configuration parameters for V2X/SPS and a first parameter indicating whether SPS/V2X may be supported for a first band. A band may be identified by a band identifier. A band combination may comprise a list of band identifier(s). Each of the band identifier(s) may be one of a finite set of numbers. Each of the numbers may identify a specific band.

According to an embodiment, a first base station may transmit to a second base station and in response to the first base station making a handover decision for the wireless device, a first message 1840 comprising UE SPS/V2X capabilities comprising the first sequence of the plurality of parameters. According to an embodiment, the first message may further comprise first configuration parameters for a first plurality of SPSs. According to an embodiment, a second message 1850 may be received from the second base station. The second message 1850 may comprise an information element indicating configuration parameters of at least one SPS. The configuration parameters may comprise: an uplink SPS radio network temporary identifier (RNTI), an SPS configuration index indicating an index of at least one uplink SPS configuration parameter, and the at least one uplink SPS configuration parameter.

According to an embodiment, the second message 1850 may comprise: an uplink SPS radio network temporary identifier (RNTI), at least one uplink SPS configuration parameter, and an SPS configuration index for the at least one uplink SPS configuration parameter. According to an embodiment, downlink control information (DCI) corresponding to the uplink SPS RNTI may be transmitted. The DCI may comprise the SPS configuration index. According to an embodiment, at least one transport block may be received employing the at least one uplink SPS configuration parameter. According to an embodiment, the DCI may indicate activation of the at least one uplink SPS configuration. According to an embodiment, the DCI may further comprise at least one resource parameter. According to an embodiment, receiving the at least one transport block in a subframe may further employs the at least one resource parameter. According to an embodiment, the subframe may be determined employing an uplink SPS interval of the at least one uplink SPS configuration parameter.

According to an embodiment, a third message 1860 may be transmitted to the wireless device. The third message may comprise the information element indicating the configuration parameters of the at least one SPS configuration.

The base station may configure multiple SPS configurations for a given UE. In an example, SPS-configuration-specific MCS and/or SPS-configuration-specific periodicity may be configured. Some SPS parameters may differ across the SPS-configurations. The base station may dynamically trigger/release the different SPS-configurations by use of (E)PDCCH. The UE may transmit to the base station SPS assistance information indicating that the UE intends to transmit data before a transmission associated to an SPS configuration.

SPS/V2X configuration in the specification refers to V2X and/or enhanced SPS configuration supporting multiple uplink and/or sidelink SPS configuration and reporting SPS assistance information. SPS/V2X configuration may support enhanced SPS configuration features, including at least one of: configuration of multiple SPSs for a UE, reporting SPS assistance information, supporting V2X communications via uplink (e.g. UU air interface), SPS configuration and capability on SCells for a UE, and/or other enhanced SPS features. These configurations may not be necessarily employed for V2X and may be applicable to other applications. In an example, SPS/V2X feature may be referred to SPS or enhanced SPS feature. In an example, SPS/V2X feature may indicate configuration of V2X services on a specific band or a band combination. A UE may support V2X communications on a specific band or a specific band combination depending on UE transmitter/receiver capabilities. In an example, for a given LTE-A configured cell communications (e.g. using a first band combination), a wireless device may or may not support V2X communications. A UE may support different V2X transmission configuration parameters in different frequency bands depending on UE transmitter/receiver capability.

A UE may be configured with a first SPS/V2X configuration with a serving base station. A target base station may maintain the same SPS/V2X configuration, or may update the UE SPS/V2X configuration. The target base station may have a different cell configuration and may require a different SPS/V2X configuration. In an example embodiment, the target base station may employ cells with the same frequencies as the serving cell and may require maintaining the same SPS/V2X configuration. The target base station may configure SPS/V2X configuration after the handover is completed or may configure SPS/V2X configuration during the handover process. Release 13 of LTE does not support SPS/V2X configuration, and addressing the SPS/V2X configuration changes during handover is not addressed in release 13 LTE technology. There is a need for developing signaling flows, UE processes, and base station processes to address SPS/V2X configuration, and SPS/V2X configuration parameter handling during the handover to reduce the handover overhead and delay, and increase handover efficiency. There is a need to develop handover signaling and handover message parameters to address SPS/V2X configuration during a handover process.

According to some of the various aspects of embodiments, in RRC_connected mode, the network may control UE mobility, for example, the network may decide when the UE connects to which E-UTRA cell(s) or inter-RAT cell. For network controlled mobility in RRC_connected, the PCell may be changed using an RRC Connection Reconfiguration message including the mobilityControlInfo (handover). The SCell(s) may be changed using the RRC connection reconfiguration message either with or without the mobilityControlInfo. The network may trigger the handover procedure e.g. based on radio conditions, load, QoS, UE category, and/or the like. To facilitate this, the network may configure the UE to perform measurement reporting (possibly including the configuration of measurement gaps). The network may also initiate handover blindly, for example without having received measurement reports from the UE. Before sending the handover message to the UE, the source base station may prepare one or more target cells. The source base station may select the target PCell. The source base station may also provide the target base station with a list of best cells on each frequency for which measurement information is available, for example, in order of decreasing RSRP. The source base station may also include available measurement information for the cells provided in the list. The target base station may decide which SCells are configured for use after handover, which may include cells other than the ones indicated by the source base station.

Figure 18:
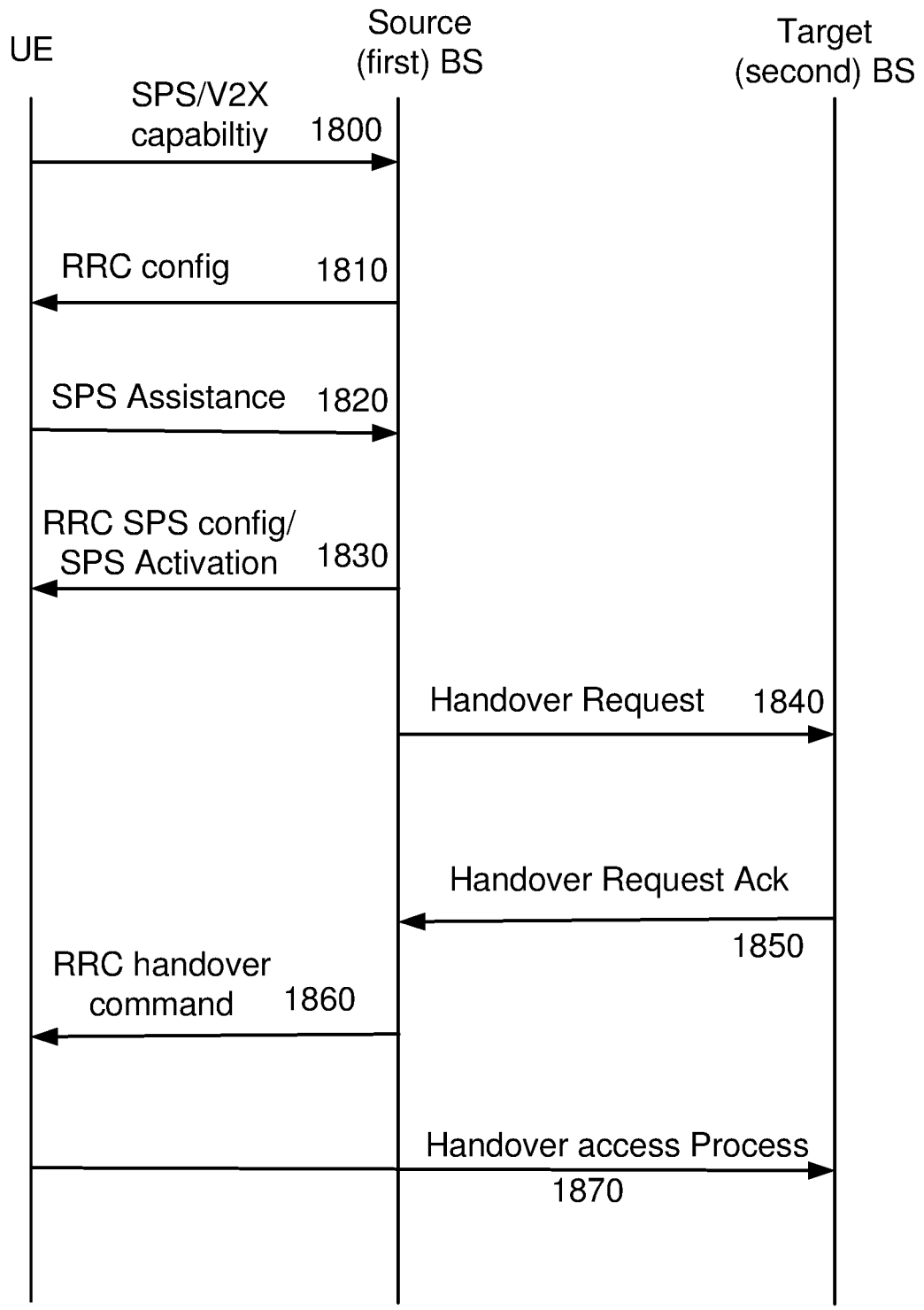
FIG. 18 is an example diagram depicting example signaling flow as per an aspect of an embodiment of the present disclosure.

FIG. 18 shows an example signaling flow for UE configuration and handover process. The UE may transmit and/or receive other messages (not shown in the figure) in addition to the messages FIG. 18. For example, a UE may transmit one or more messages comprising measurement reports to the serving base station to assist the serving base station in making a handover decision. In an example, there may be additional communications of RRC messages between the UE and base station(s). In an example, some of the messages may be combined, for example, RRC message 1810 may configure SPS configurations indicated in message 1830.

In an example, a UE may transmit to a base station a message 1800 comprising SPS/V2X capabilities of the UE. A base station transmit one or more RRC messages (e.g. 1810, and/or 1830) providing one or more SPS configurations for the UE. SPS configurations may be for transmission of SPS traffic via a downlink, an uplink and/or via a sidelink. When a UE needs to transmit a type of message employing SPS, the UE may transmit a message/report 1820 comprising a UE SPS assistance information about one or more SPS traffic types to the base station. UE SPS assistance information may indicate at least one of the following SPS assistance parameters for an SPS traffic type. The SPS assistance parameters may indicate at least one of the following: message type, logical channel, traffic/message size, SPS configuration index, traffic type, and/or traffic periodicity. The base station may transmit an SPS transmission grant (e.g. DCI activating an SPS) based on the UE assistance report. The base station may transmit SPS RRC configurations and/or an SPS DCI grant 1830 for an SPS configuration and SPS radio resources based on the assistance information transmitted by the UE. After receiving the grant, the UE may initialize the corresponding SPS configuration and may transmit the data via the radio resources allocated to the UE. The UE assistance information may enable the base station to determine logical channels and traffic priority and size. The base station may configure/activate the corresponding SPS for the UE. For example, legacy mechanisms do not provide UE SPS assistance information comprising at least one logical channel and other assistance parameters. This improved process enhances SPS transmission efficiency in the uplink.

In an example, the source base station may initiate the handover procedure by sending a handover request message 1840 to one or more potential target base stations. The target base station may generate a message 1850 used to configure the UE for the handover. For example, the message 1850 may include the access stratum configuration to be used in the target cell(s). The source base station may transmit a message 1860 to the UE. The message 1860 may transparently (for example, does not alter values/content) forward the handover information received from the target base station to the UE. When appropriate, the source base station may initiate data forwarding for (a subset of) the dedicated radio bearers. After receiving the handover message, the UE may attempt to access the target PCell at the available RACH occasion according to a random access resource selection at process 1870. When allocating a dedicated preamble for the random access in the target PCell, the target base station may make the preamble available from the first RACH occasion the UE may use. Upon successful completion of the handover, the UE may send a message (as a part of process 1870) used to confirm the handover to the target base station.

In an example, if the target base station does not support the release of RRC protocol which the source base station used to configure the UE, the target base station may be unable to comprehend the UE configuration provided by the source base station. In this case, the target base station may use the full configuration option to reconfigure the UE for handover and re-establishment. Full configuration option includes an initialization of the radio configuration, which makes the procedure independent of the configuration used in the source cell(s) with the exception that the security algorithms are continued for the RRC re-establishment.

In an example, after the successful completion of handover, PDCP SDUs may be re-transmitted via the target cell(s). This may apply for dedicated radio bearers using RLC-AM mode and/or for handovers not involving full configuration option. After the successful completion of handover not involving full configuration option, the SN (sequence number) and/or the HFN (hyper frame number) may be reset for some radio bearers. For the dedicated radio bearers using RLC-AM mode both SN and HFN may continue. For reconfigurations involving the full configuration option, the PDCP entities may be newly established (SN and HFN may not continue) for dedicated radio bearers irrespective of the RLC mode. UE behavior to be performed upon handover may be the same regardless of the handover procedures used within the network (e.g. whether the handover includes X2 or S1 signaling procedures).

The source base station may, for some time, maintain a context to enable the UE to return in case of handover failure. After having detected handover failure, the UE may attempt to resume the RRC connection either in the source PCell or in another cell using the RRC re-establishment procedure. This connection resumption may succeed if the accessed cell is prepared. For example, when the access cell is a cell of the source base station or of another base station towards which handover preparation has been performed. The cell in which the re-establishment procedure succeeds becomes the PCell while SCells, if configured, may be released.

Normal measurement and mobility procedures may be used to support handover to cells broadcasting a CSG (closed subscriber group) identity. In addition, E-UTRAN may configure the UE to report that it is entering or leaving the proximity of cell(s) included in its CSG whitelist. E-UTRAN may request the UE to provide additional information broadcast by the handover candidate cell e.g. cell global identity, CSG identity, CSG membership status. E-UTRAN may use the proximity report to configure measurements as well as to decide whether or not to request additional information broadcast by the handover candidate cell. The additional information may be used to verify whether or not the UE is authorised to access the target PCell and may also be needed to identify handover candidate cell. This may involve resolving PCI confusion, for example, when the physical layer identity that is included in the measurement report may not uniquely identify the cell.

According to some of the various aspects of embodiments, configuration of SPS/V2X may be configured by the serving base station with RRC signaling e.g. employing message(s) 1810 and/or 1830. The mechanism for SPS/V2X configuration and reconfiguration may be based on RRC signaling. When needed, configuration of SPS/V2X may be reconfigured with RRC signaling. In an example, the mapping between an SCell and a SPS/V2X configuration may not be reconfigured with RRC while the SCell is configured. For example if there is a need modify SPS/V2X configurations, at least one RRC message, for example at least one RRC reconfiguration message, may be send to the UE to reconfigure SPS/V2X configurations.

According to some of the various aspects of embodiments, a base station may consider UE's capability in configuring one or more SPS/V2X for a UE. A UE may be configured by a base station with a configuration that is compatible with UE capability. SPS/V2X capability may be an optional feature in LTE release 14 (and/or beyond). UE may transmit its SPS/V2X capability to base station via an RRC message 1800 and base station may consider UE capability in configuring SPS/V2X configuration e.g. employing message(s) 1810 and/or 1830.

The purpose of RRC connection reconfiguration procedure may be to modify an RRC connection, e.g. to establish, modify and/or release RBs, to perform handover, to setup, modify, and/or release measurements, to add, modify, and/or release SCells. As part of the procedure, NAS dedicated information may be transferred from E-UTRAN to the UE. If the received RRC connection reconfiguration message includes the sCellToReleaseList, UE performs SCell release. If the received RRC connection reconfiguration message includes the sCellToAddModList, UE performs SCell additions or modification.

The UE context within the source base station may contain information regarding roaming/handover restrictions which may be provided either at connection establishment or at the last TA (tracking area) update process. The source base station may configure the UE measurement procedures employing at least one RRC connection reconfiguration message. The UE may be triggered to send at least one measurement report by the rules set by, for example, system information, RRC configuration, and/or the like. The source base station may make a handover decision based on many parameters, for example, the measurement reports, RRM information, traffic and load, a combination of the above, and/or the like. The source base station may initiate the handover procedure by sending a handover request message 1840 to one or more potential target base stations. When the source base station sends the handover request message 1840, it may start a handover preparation timer. Upon reception of the handover request acknowledgement message 1850 the source base station may stop the handover preparation timer.

The source base station may transmit a handover request message 1840 to one or more potential target base station passing information to prepare the handover at the target side. The handover request message 1840 may comprise SPS/V2X capability information of the UE. The target base station may employ the SPS/V2X capability of the UE in order to properly configure SPS/V2X configuration of the UE before UE connects to the target UE. The target base station may configure the UE considering the SPS/V2X configuration limitations and capabilities of the UE. For example, if the UE does not support a specific SPS/V2X capability, the target base station may not configure the UE with a SPS/V2X(s) requiring the specific SPS/V2X capability. In an example, if the UE does not support SPS/V2X configurations in certain band(s) or with a certain band combination, the base station may consider this limitation for configuring SPS/V2X for the UE. In an example, a UE may not support SPS/V2X configuration, and base station may consider this in configuring the UE before the UE accesses the target base station. In an example, handover request message 1840 may further comprise a current SPS/V2X configuration of the UE connected to the serving base station.

During the handover preparation phase, the serving base station may transmit one or more handover requests 1840 comprising UE's SPS/V2X capabilities and/or UE's current SPS/V2X configuration (SPS/V2X of the UE in connection with the serving base station) to one or more potential target base stations. This information may be employed, at least in part, by the potential target base station(s) to configure the UE, for example, to configure SPS/V2X configuration parameters.

Handover admission control may be performed by the target base station dependent on many factors, for example, QoS required for the UE bearers, UE capabilities, UE configuration, target base station load, a combination of the above, and/or the like. The target base station may configure the required resources according to the received information from the serving base station and may reserve a C-RNTI and/or a RACH preamble. The access stratum configuration to be used in the target cell may be specified independently (for example as an establishment) or as a delta compared to the access stratum-configuration used in the source cell (for example as a reconfiguration).

The target base station may prepare handover with L1/L2 and may send the handover request acknowledge message 1850 to the source base station. The handover request acknowledge message 1850 may include a transparent container to be sent to the UE as an RRC message to perform the handover. The container may include a new C-RNTI, target base station security algorithm identifiers for the selected security algorithms, a dedicated RACH preamble, access parameters, SIB s, and/or other configuration parameters. The transparent container may further comprise the SPS/V2X configurations for connection of the UE to the target base station. The SPS/V2X configurations may modify the SPS/V2X of the UE or may keep the same SPS/V2X configuration that the UE has with the serving base station. The target base station may generate the RRC message to perform the handover, for example, RRC connection reconfiguration message including the mobility control information. The RRC message may be sent by the source base station towards the UE in RRC handover command 1860. The source base station may perform the necessary integrity protection and ciphering of the message 1860. The UE may receive the RRC connection reconfiguration message 1860 from the source base station and may start performing the handover at 1870. The UE may not need to delay the handover execution for delivering the HARQ/ARQ responses to the source base station.

After receiving the RRC connection reconfiguration message including the mobility control information 1860, UE may perform synchronisation to the target base station and accesses the target cell via RACH on the primary cell at process 1870. A UE Random access procedure may employ a contention-free procedure if a dedicated RACH preamble was indicated in the mobility control information. The UE random access procedure may employ a contention-based procedure if no dedicated preamble was indicated. The UE may derive target base station specific keys and may configure the selected security algorithms to be used in the target cell. The target base station may respond with uplink allocation and timing advance. After the UE has successfully accessed the target cell, the UE may send an RRC connection reconfiguration complete message (C-RNTI) to confirm the handover and to indicate that the handover procedure is completed for the UE. The UE may transmit a MAC uplink Buffer Status Report (BSR) Control Element (CE) along with the uplink RRC Connection Reconfiguration Complete message or may transmit a MAC uplink BSR CE whenever possible to the target base station at process 1870. The target base station verifies the C-RNTI sent in the RRC Connection Reconfiguration Complete message. The target base station may now begin sending data to the UE and receiving data from the UE.

According to some of the various aspects of embodiments, a serving base station may receive a first message 1800 from a wireless device (e.g. on a primary cell in a plurality of cells). The first message 1800 may be an RRC UE capability message. The plurality of cells may comprise the primary cell and at least one secondary cell. The base station may receive a plurality of radio capability parameters from the wireless device. The first message 1800 may comprise at least one parameter indicating whether the wireless device supports configuration of SPS/V2X(s).

In an example embodiment, the capability message 1800 may comprise one or more parameters explicitly and/or implicitly indicating that the UE support configuration of SPS/V2X. For example, a parameter may indicate that the UE is capable of handling some types of V2X configuration, and this may imply that the UE is SPS/V2X capable. In an example, a parameter may indicate that the UE is capable of supporting a set of enhanced configuration parameters including enhanced SPS (e.g. SPS/V2X). In an example, a parameter may explicitly indicate that the UE is capable of handling enhanced SPS configuration. The base station after receiving the UE capability message, may determine whether the UE can support configuration of enhanced SPS (SPS/V2X). The UE may selectively configure SPS/V2X for a UE by transmitting one or more RRC messages to the UE.

In an example embodiment, the capability may be received on a first signalling bearer on the primary cell. The plurality of radio capability parameters may comprise a first sequence of one or more radio configuration parameters. A first radio configuration parameter in the first sequence may comprise a first parameter indicating whether SPS/V2X may be supported for a first band and/or first band combination. The first band and/or first band combination may be in a second sequence of one or more band combinations. The index of the first radio configuration parameter in the first sequence may determine the index of the first band combination in the second sequence.

According to some of the various embodiments, the size of the first sequence may be the same as the size of the second sequence. The index may determine the order of: the first radio configuration parameter in the first sequence; and the first band combination in the second sequence. The first band combination may be identified by a first band combination parameter. The first band combination parameter may comprise a list of band identifier(s). Each of the band identifier(s) may be one of a finite set of numbers. Each of the numbers may identify a specific band.

According to some of the various embodiments, the wireless device may support one or more inter-band SPS/V2Xs if the list of band identifier(s) includes more than one band; and the first parameter indicates that SPS/V2X is supported. In yet other embodiments, the wireless device may support multiple intra-band SPS/V2X if the list of band identifier(s) includes one band; and the first parameter indicates that SPS/V2X is supported.

According to some of the various embodiments, the wireless device may not support SPS/V2X if none of the radio configuration parameters comprise a parameter indicating that SPS/V2X is supported.

In an example embodiment, a wireless device may transmit an RRC message comprising UE capability information. The UE capability information may comprise one or more information elements comprising wireless device LTE radio capability parameters. The LTE radio capability parameters may comprise a plurality of parameters indicating various capability of the wireless device LTE radio.

The serving base station may selectively transmit at least one second message to the wireless device if the at least one parameter indicates support for configuration of SPS/V2X. The at least one second message may configure SPS/V2X in the wireless device. If the at least one parameter does not indicate support for configuration SPS/V2X, the base station may not configure SPS/V2X in the wireless device. If the at least one parameter indicates support for configuration of the SPS/V2X, the base station may or may not configure SPS/V2X in the wireless device depending on the required wireless device configuration and many other parameters, such as types of application running on the UE and the traffic requirements. Transmission or not transmission (selective transmission) of at least one second message to configure SPS/V2X is determined by the base station based on many criteria described in this specification.

The at least one second control message may be configured to cause in the wireless device configuration of at least one cell in the plurality of cells and configuration of SPS/V2X. The first SPS/V2X may comprise a first subset of the plurality of cells. The second SPS/V2X may comprise a second subset of the at least one secondary cell.

The at least one second control message may be configured to further cause in the wireless device configuration of one or more SPS configuration. A cell add-modify information element may comprise a first plurality of dedicated parameters. The first plurality of dedicated parameters may comprise a first cell index for a first secondary cell in the at least one secondary cell. The at least one second control message may further include configuration information for physical channels for the wireless device. The at least one second control message may be configured to further cause the wireless device to set up or modify at least one radio bearer.

The serving base station may receive at least one measurement report from the wireless device in response to the at least one second message. The at least one measurement report may comprise signal quality information of at least one of the at least one cell of at least one of the at least one target base station. The signal quality information may be derived at least in part employing measurements of at least one OFDM subcarrier. The serving base station may make a handover decision, based, at least in part, on the at least one measurement report, and/or other parameters, such as load, QoS, mobility, etc. The serving base station may also make a decision depending on base station internal proprietary algorithm.

The serving base station may transmit at least one third message to at least one of the at least one target base station. The at least one third message may comprise the at least one parameter indicating whether the wireless device supports configuration of SPS/V2X. The at least one third message may comprise a plurality of parameters of the configuration at least indicating association between at least one cell and a corresponding SPS/V2X (configuration information of one or more SPS/V2Xs). The at least one third message may be a handover request message transmitted to at least one target base station to prepare the target base stations for the handover of the wireless device. The UE capability parameters may be included in the at least one third message. UE dedicated radio parameters comprising UE SPS/V2X configuration may also be included in the handover request message. UE dedicated radio parameters may comprise MACMainconfig information element. UE dedicated radio parameters may comprise SPS/V2X configuration including SPS/V2X indices and associated cell indices.

According to some of the various aspects of embodiments, a serving base station, in response to making a handover decision by the serving base station for a wireless device, may transmit at least one third message to at least one target base station. The at least one third message may comprise the at least one parameter indicating whether the wireless device supports configuration of SPS/V2X. The format of the parameter (information element) indicating whether the wireless device supports configuration of a SPS/V2X is the same format as the UE capability message transmitted by the wireless device to the base station in the first message as described in the specification. The at least one third message may further comprise a plurality of parameters of the configuration of SPS/V2X (configuration information of SPS/V2X). The parameters included in the configuration information of SPS/V2X may be the same as the ones included in the at least one second message as described in this specification. The at least one third message may be a handover request message transmitted to at least one target base station to prepare the target base stations for the handover of the wireless device. The UE capability parameters may be included in the at least one third message. UE dedicated radio parameters comprising UE SPS/V2X configuration may also be included in the handover request message. UE dedicated radio parameters may comprise MACMainconfig information element. UE dedicated radio parameters may comprise SPS/V2X configuration including SPS/V2X indices and associated cell indices.

The serving base station may receive from one of the at least one target base station at least one fourth message. The at least one fourth message may comprise configuration of a plurality of cells for the wireless device. The plurality of cells may comprise a primary cell and at least one secondary cell. The configuration may associate SPS/V2X configuration with a cell in the plurality of cells.

The serving base station may transmit a fifth message to the wireless device. The fifth message may comprise a plurality of parameters of the configuration at least indicating association between at least one cell and a corresponding SPS/V2X (configuration information of SPS/V2X). The fifth message may cause the wireless device to start a synchronization process with the target base station (with a cell in the target base station).

The base station may, before transmission of the fifth message, encrypt the fifth message and protect the fifth message by an integrity header. The fifth message may further include configuration information for physical channels for the wireless device. The fifth message may be configured to cause the wireless device to set up or modify at least one radio bearer. The fifth message may be configured to further cause the wireless device to configure at least one of a physical layer parameter, a MAC layer parameter, and an RLC layer parameter. The plurality of cells of the target base station may be in more than one frequency band, for example, one or more cells may be in frequency band A and one or more other cells may be in frequency band B (inter-band carrier aggregation). The wireless device may support configuration of SPS/V2X.

Example embodiments enable V2X communications in multi-carrier communications network. In an example, a UE may be engaged in a V2X communication and may utilize one or more downlink subframes to receive eMBMS or SC-PTM signaling and/or data and one or more downlink subframes to receive unicast SPS traffic and signaling. The UE may utilize one or more uplink/sidelink subframe to send V2X traffic, e.g. subframe with SPS allocations. When communication with multiple cells, some level of inter-cell coordination may be performed to enable a UE to have access to the union of downlink and uplink time resources needed for V2X while maintaining other communication and services through the same cell or different cells.

Transmission of MBMS in E-UTRAN may use single cell point to multipoint transmission (SC-PTM) or multi-cell MBSFN transmission. In an example, the V2X server may use multipoint transmission (SC-PTM) and/or multi-cell MBSFN to deliver V2X related information to users.

In the eMBMS system, the group data may be carried through an eMBMS session identified by a Temporary Mobile Group Identity (TMGI) and may initially be forwarded to an MBMS Coordination Entity (MCE). The MCE may multicast the data to one or more eNodeBs which may be grouped as a service area and may be configured to serve the eMBMS session. In a PMCH subframe, the eNodeBs may simultaneously transmit the same physically encoded signals according to the scheduling by the MCE. In an example, the UEs interested in the eMBMS session may attempt to combine the signals from the eNodeBs to decode the group data. In an example, a UE willing to access the eMBMS session may receive the group data in the PMCH. The data may be decoded based on the broadcasted information. The group data in the PMCH may be scrambled with a Multimedia Broadcast Single Frequency Network (MBSFN) area ID that can be found in SIB13. An MBSFN area configuration message carrying the scheduling information for the eMBMS sessions served in the cell may be also available from the Multicast Control Channel (MCCH), which may be decoded with the information in SIB13.

In an example, IE SystemInformationBlockType13 may contain the information required to acquire the MBMS control information associated with one or more MBSFN areas. SystemInformationBlockType13 information element may comprise mbsfn-AreaInfoList, and/or notificationConfig. A notificationConfig may indicate the MBMS notification related configuration parameters. In an example, the UE may ignore this field when dl-Bandwidth included in MasterInformationBlock is set to n6.

Multi-cell transmission of MBMS may include one or more of the following: Synchronous transmission of MBMS within its MBSFN Area; Combining of MBMS transmission from multiple cells may be supported. Scheduling of a MCH may be done by the MCE; A single transmission may be used for MCH (e.g., neither blind HARQ repetitions nor RLC quick repeat); A single Transport Block may be used per TTI for MCH transmission and the TB may use the MBSFN resources in that subframe; MTCH and MCCH may be multiplexed on the same MCH and may be mapped on MCH for p-t-m transmission; MTCH and MCCH may use the RLC-UM mode. The MAC subheader may indicate the LCID for MTCH and MCCH; The MBSFN Synchronization Area, the MBSFN Area, and the MBSFN cells may be semi-statically configured e.g. by O&M; and/or MBSFN areas may be static, unless changed by O&M (e.g., no dynamic change of areas).

The SC-PTM is a type of a radio access method that may be dedicated to multicast through the PDSCH in a single cell. In SC-PTM transmission, the UEs in a group may receive the group data through a common radio resource region in the PDSCH. The group data may be multiplexed with the normal unicast data within a PDSCH subframe and may not cause the problem of the radio resource granularity. The SC-PTM transmission may utilize a group RNTI which may be allocated to a TMGI. According to the cell list given from the core network, the MCE may disseminate the group data to the corresponding eNodeBs. An eNodeB may transmit the group data through the PDSCH based on its own scheduling and may send the corresponding DCI through the PDCCH with the group RNTI. The UEs may decode the DCI and the group data successfully based on the pre-acquired group RNTI. The UEs in a group may acquire their group RNTI from an SC-PTM configuration message, which may be periodically broadcasted through the Single Cell-MCCH (SC-MCCH) and may provide the mapping between TMGIs and group RNTIs. Since the SC-PTM may allow a UE to receive the group data as in the PMCH case, it may require a single radio resource allocation for disseminating the group data without duplicated data transmissions.

The IE SystemInformationBlockType20 may contain the information required to acquire the control information associated transmission of MBMS using SC-PTM. In an example, IE SystemInformationBlockType20 may contain sc-mcch-RepetionPeriod, sc-mcch-Offset, sc-mcch-FirstSubframe, sc-mcch-duration, and/or sc-mcch-ModificationPeriod. The sc-mcch-ModificationPeriod may define periodically appearing boundaries, e.g., radio frames for which SFN mod sc-mcch-ModificationPeriod=0. The contents of different transmissions of SC-MCCH information may be different if there is at least one such boundary in-between them. In an example, value rf2 may correspond to 2 radio frames, value rf4 may correspond to 4 radio frames and so on. The sc-mcch-duration may indicate, starting from the subframe indicated by sc-mcch-FirstSubframe, the duration in subframes during which SC-MCCH may be scheduled in PDCCH sub-frames. Absence of this IE may mean that SC-MCCH is only scheduled in the subframe indicated by sc-mcch-FirstSubframe. The sc-mcch-Offset may indicate, together with the sc-mcch-RepetitionPeriod, the radio frames in which SC-MCCH is scheduled e.g., SC-MCCH may be scheduled in radio frames for which: SFN mod sc-mcch-RepetitionPeriod=sc-mcch-Offset. The sc-mcch-FirstSubframe may indicate the first subframe in which SC-MCCH is scheduled. The sc-mcch-RepetitionPeriod may define the interval between transmissions of SC-MCCH information, in radio frames. Value rf2 may correspond to 2 radio frames, rf4 may correspond to 4 radio frames and so on.

In an example, single-cell transmission of MBMS may include one or more of the following attributes: MBMS may be transmitted in the coverage of a single cell; One SC-MCCH and one or more SC-MTCH(s) may be mapped on DL-SCH; Scheduling may be done by the eNB; SC-MCCH and SC-MTCH transmissions may be indicated by a logical channel specific RNTI on PDCCH (there may be a one-to-one mapping between TMGI and G-RNTI used for the reception of the DL-SCH to which a SC-MTCH is mapped); A single transmission may be used for DL-SCH (e.g., neither blind HARQ repetitions nor RLC quick repeat) on which SC-MCCH or SC-MTCH is mapped; SC-MCCH and SC-MTCH may use the RLC-UM mode.

For a SC-MTCH, one or more of following scheduling information may be provided on SC-MCCH: SC-MTCH scheduling cycle; SC-MTCH on-duration: duration in downlink subframes that the UE waits for, after waking up from DRX, to receive PDCCHs. If the UE successfully decodes a PDCCH indicating the DL-SCH to which this SC-MTCH is mapped, the UE may stay awake and may start the inactivity timer; SC-MTCH inactivity-timer: duration in downlink subframes that the UE waits to successfully decode a PDCCH, from the last successful decoding of a PDCCH indicating the DL-SCH to which this SC-MTCH is mapped, failing which it may re-enter DRX. The UE may restart the inactivity timer following a single successful decoding of a PDCCH.

A G-RNTI of the MAC entity may be configured by RRC with a DRX functionality that may control the UE's PDCCH monitoring activity for this G-RNTI. When in RRC IDLE or RRC_CONNECTED, if DRX is configured, the MAC entity may be allowed to monitor the PDCCH for this G-RNTI discontinuously using the DRX operation; otherwise the MAC entity may monitor the PDCCH for this G-RNTI continuously. For a G-RNTI of the MAC entity, RRC may control its DRX operation by configuring the timers onDurationTimerSCPTM, drx-InactivityTimerSCPTM, the SC-MTCH-SchedulingCycle and the value of the SC-MTCH-SchedulingOffset. The DRX operation may be performed independently for a G-RNTI and independently from the DRX operation.

When DRX is configured for a G-RNTI, the Active Time may include the time while onDurationTimerSCPTM or drx-InactivityTimerSCPTM is running. When DRX is configured for a G-RNTI, the MAC entity may for a subframe for this G-RNTI start onDurationTimerSCPTM if [(SFN*10)+subframe number] modulo (SC-MTCH-SchedulingCycle)=SC-MTCH-SchedulingOffset. When DRX is configured for a G-RNTI, the MAC entity may for a subframe for this G-RNTI monitor the PDCCH during the Active Time for a PDCCH-subframe and start or restart drx-InactivityTimerSCPTM if the PDCCH indicates a DL transmission.

With the multi-frequency deployment in LTE network, eMBMS services may be provided on more than one frequency. In the 3GPP Rel-11, supplements were introduced to support the continuity of eMBMS by guiding UEs to find their interested services on other frequencies. To avoid the need for LTE mobile devices to read the eMBMS related information on neighboring frequencies in SIB13 and MCCH message, the network may inform the UEs which eMBMS services are provided on which frequency through a combination of User Service Description (USD) and System Information Block Type 15 (SIB15). In the USD, a service may be associated with its own Service Identity which may be included in the Temporary Mobile Group Identity (TMGI), the frequencies and the MBMS Service Area Identities (SAIs) may belong to the MBMS service area. The SIB15 may have a list of neighboring frequencies together with the current frequency. A frequency in the list may contain a list of SAIs supported by that frequency.

Combining the information in USD and SIB15, the UE may determine which frequency provides the eMBMS services it is receiving or interested in. The information obtained from USD and SIB15 may be important to the UE that is interested in receiving eMBMS services.

The IE SystemInformationBlockType15 may contain the MBMS Service Area Identities (SAI) of the current and/or neighboring carrier frequencies. SystemInformationBlockType15 may comprise one of more of the following fields: mbms-SAI-IntraFreq, mbms-SAI-InterFreqList, mbms-SAI-InterFreqList. The mbms-SAI-InterFreqList may contain a list of neighboring frequencies including additional bands, if any, that may provide MBMS services and the corresponding MBMS SAIs. The mbms-SAI-IntraFreq may contain the list of MBMS SAIs for the current frequency. A duplicate MBMS SAI may indicate that this and following SAIs are not offered by this cell and may be offered by neighbor cells on the current frequency. For MBMS service continuity, the UE may use MBMS SAIs listed in mbms-SAI-IntraFreq to derive the MBMS frequencies of interest. The mbms-SAI-List may contain a list of MBMS SAIs for a specific frequency.

In an example, the IE SystemInformationBlockType15 may contain one or more of the following information: multiBandInfoList, and/or InterFreq. The multiBandInfoList may be a list of additional frequency bands applicable for the cells participating in the MBSFN transmission. The InterFreq may be optionally present and may need OR if the mbms-SAI-InterFreqList-r11 is present. Otherwise it may not be present.

In an example, in the idle state, when a user is moving out of one cell, it may prioritize to camp to the cells on the frequencies providing its desired eMBMS service. In such way, the continuity of eMBMS service may be maintained if at least one neighbor frequency provides the service required by the UE. In the connected mode, besides sending the measurement reports like in unicast transmission, the UE who may be receiving or interested in eMBMS service may send one RRC message to the serving cell as a response to the SIB15.

MBMS Interest Indicator and may comprise of a list of frequencies on which the UE may be receiving or interested to receive eMBMS services. This message may contain one bit to indicate to the serving cell whether the UE prefers eMBMS reception to normal unicast reception. The MBMSInterestIndication message may be used to inform E-UTRAN that the UE is receiving/interested to receive or no longer receiving/interested to receive MBMS via an MRB or SC-MRB. mbms-FreqList may be a list of MBMS frequencies on which the UE is receiving or interested to receive MBMS via an MRB or SC-MRB. mbms-Priority may indicates whether the UE prioritizes MBMS reception above unicast reception. The field may be present (e.g., value true), if the UE prioritizes reception of listed MBMS frequencies above reception of a unicast bearers. Otherwise the field may be absent.

In an example, the current eNB may use this information in choosing the cell to hand the UE over. The candidate cell on the frequency providing the appropriate eMBMS services may be in first priority and when the UE switches to this frequency, it may continue to receive its interested service in the target cell. With this additional enhancement, the service continuity support for eMBMS may be improved. The UE may camp or be handed over to the cell on the frequency that transmits the service it desires. In addition to use of eMBMS or SC-PTM in the downlink the system may configure UEs with one or more Semi-Persistent Scheduling (SPS) opportunities to send their data in the uplink or downlink. The configuration of SPS parameters including the sub-frames and resources to be used by UE may be made so that conflicts with other transmission and receptions in the same of different carrier is avoided.

Figure 22:
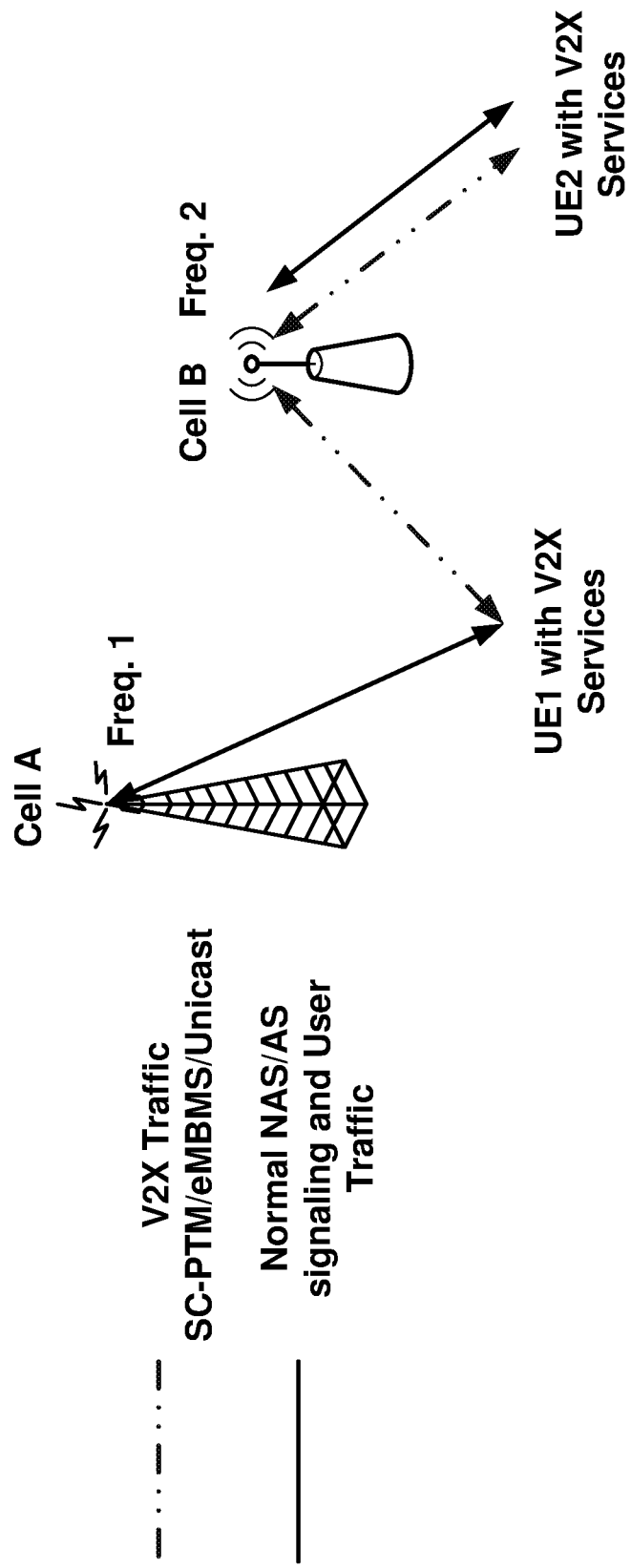
FIG. 22 is an example diagram depicting example network providing V2X services as per an aspect of an embodiment of the present disclosure.

FIG. 22 shows an example multicarrier and multi-cell operation of UEs with V2X services. A UE with V2X services may be in communication with multiple cells at a given time. For example, UE1 may be communicating with Cell A as its primary cell exchanging NAS/AS signaling and user data traffic while also communicating with Cell B for V2X traffic. In an example, the communication of UE with Cell A and B may be on different frequencies, e.g. Freq. 1 and Freq. 2. In an example, eNB A may comprise one or more cells comprising Cell A. In an example, eNB B may comprise one or more cells comprising cell B. In an example, eNB A and eNB B may be the same eNB. That is Cell A and Cell B may belong to the same eNB.

An eNB may comprise one or more cells. In this context, sometimes cell and eNB terms may be used interchangeably. For example, when Cell A of eNB A transmits a message to cell B of eNB B, the eNB A may transmit the message to the eNB B. In an example, when a server sends a message to a cell, the server sends the message to the eNB comprising the cell. For example, when cell A transmits a message to a UE, eNB A may transmit the message to the UE. In an example, when cell A transmits a message to a UE, the message may be transmitted via another cell of the same eNB A to the UE.

Based on UE capabilities, a UE may only be able to operate in one of two frequencies F1 and F2 at a given time, which requires the serving cells to directly or indirectly coordinate their timing and resource configurations to avoid/reduce conflicting assignments to such UE. Some UEs may also be able to concurrently operate on multiple frequencies, e.g. F1 and F2. For example the UE have carrier aggregation capability in which one of frequencies, e.g. F1, may be used by UE's primary serving cell and other frequencies, e.g. F2 or F3, may be used by UEs secondary serving cells. In this case the serving Cell A may also need to know time/frequency resources configured for UE by Cell B, e.g. for V2X services, to avoid making conflicting assignments beyond UE's RF capabilities.

The timing related parameters related to reception of eMBMS or SC-PTM in downlink of Cell B and the SPS timing parameters for transmissions/reception of data by UE if managed by Cell B may need to be communicated with Cell A. The same is also true for configuration of timing resources for side-link communication by UE if configured by Cell B. In the following, V2X subframes used by Cell B refer to union of MB SFN subframes used for eMBMS transmission, subframes configured for SC-PTM transmissions in Cell B. From UE perspective the V2X subframes in downlink includes Cell specific subframes used for V2X transmission of interest for the UE as well as subframes configured for downlink unicast transmission based SPS configurations. In V2X subframes for uplink include subframes configured for SPS transmissions by UE and those reserved for sidelink communications.

In an example embodiment, V2X across two cells may be allowed if two cells are part of the same eNB. In an example, Cell B may be part of the same eNB as Cell A. Cell B and Cell A are managed by collocated MAC and/or RRC entities. In this example, an eNB may manage configuration of time and resources and resource assignment to UE such that the UE can send and receive information to Cell A and B in different subframes and/or frequencies.

In an example, a UE may not be capable of receiving signaling/traffic on Cell A and V2X traffic on cell B simultaneously (e.g. in the same subframe). The eNB (e.g. via Cell A) may transmit subframe configuration information to the UE informing the UE about which of the subframes are employed by Cell A and which of the subframes are employed by Cell B for communications. For example, the eNB may transmit an RRC message to the UE. The message may comprise one or more parameters indicating which subframes are assigned to Cell A for signaling/traffic and which subframes are assigned to Cell B for V2X communications. For example, the eNB (e.g. via Cell A) may transmit a MAC message to the UE. The message may comprise one or more parameters indicating which subframes are assigned to Cell A for signaling/traffic and which subframes are assigned to Cell B for V2X communications. For example, the eNB (e.g. via Cell A) may transmit an PHY control message (e.g. DCI) to the UE. The message may comprise one or more parameters indicating which subframes are assigned to Cell A for signaling/traffic and which subframes are assigned to Cell B for V2X communications. In an example, the eNB may dynamically update the subframe configuration, e.g. when V2X traffic pattern changes. In an example, the allocation may not be static, and may be dynamically controlled by eNB, for example, by transmitting updated control and/or scheduling messages.

In an example, Cell A and Cell B subframe configuration may be configured employing using a bitmap, index of preconfigured subframe configurations, and/or some other parameters.

Handling of concurrent V2X communication on F2 and regular network traffic on Frequency F1 may be based on eNB implementation without specific requirements on the UE.

In an example embodiment, V2X across two independent cells may be allowed if UE has two or more independent RF units which can operate on different frequencies in parallel. The UE may have two or more RF radios which may operate in parallel. The UE may be required to use one radio for V2X traffic and the handling of concurrent V2X communication on F2 and regular network traffic on Frequency F1 may be based on UE implementation.

In an example, a UE may transmit one or more messages to an eNB (e.g. via a serving cell) that one or more of the RF radios (e.g. frequencies, bands, etc) are engaged with other cells and/or eNBs and may not be employed by the eNB for communication. For example, the UE may transmit a message to eNB A (e.g. via Cell A) indicating that the UE is transmitting and/or receiving information (e.g. V2X) on frequency F2 (from Cell B, eNB B). In an example, the UE may transmit a message to a serving eNB that the UE is engaged with communication on a first Radio. The eNB may consider this information and may not configure and/or schedule any data on the first radio.

In an example, a UE may not be able to receive signals on frequency F1 and F2 simultaneously. In example UE2 which is idle mode and is interested in V2X communication may give priority to cells with V2X radios is its cell selection.

In an example, when a UE subscribes to V2X services, the UE may receive bands and/or frequencies employed for V2X communication, e.g. in certain area for the application server. The UE may receive this information from the application layer. The UE may prioritize the frequencies employed for V2X communications during the idle mode cell selection/re-selection process. The UE may select frequencies employed for V2X so that it can receive V2X traffic.

In an example, the information about V2X services may be communicated employing SIB messages. For example, a field in the SIB message may indicate whether certain frequency(ies) is employed for V2X services. The UE may prioritize the frequencies employed for V2X communications during the idle mode cell selection/re-selection process. The UE may select frequencies employed for V2X so that it can receive V2X traffic.

In an example, during the handover process, eNB may consider the information on whether the target eNB supports V2X service in the handover decision process. For example, an eNB may prioritize handover to a target eNB that supports V2X services, over another target eNB that does not support V2X service. eNBs may transmit/receive message to/from eNBs indicating whether the eNB supports V2X services. An eNB may transmit handover request to one or more target eNBs and receive handover ack from the one or more target eNB. In an example, handover request may request V2X services, and handover ack may include information about whether the eNB supports V2X services.

In an example, a UE may transmit a message to an eNB that indicate that the UE is capable of and/or is interested to receive V2X services. The message may comprise the type of V2X services, the frequencies, and other information about the UE and the services. The eNB may use this information to trigger a handover, for example, to another eNB configured with V2X services. In an example, the eNB may expedite the handover process to a target eNB supporting the service.

In an example, Cell A and Cell B may be part of different eNBs but are both in the same operator's network, e.g. in the same PLMN. In this case Cell B and Cell A may have two different MAC operations but may coordinate some RRC configurations through X2 interface and eNBs (cells) may be connected to the same core network. In an example, UE1 may receive/transmit V2X traffic from/to eNB B (e.g. via Cell B) on frequency F2 while using eNB A (e.g. via Cell A) as a primary cell on frequency F1 for NAS/AS signaling and other data traffic. In an example, the V2X traffic may be delivered to UE from Cell B via eMBMS or SC-PTM on a Frequency F2.

Figure 23:
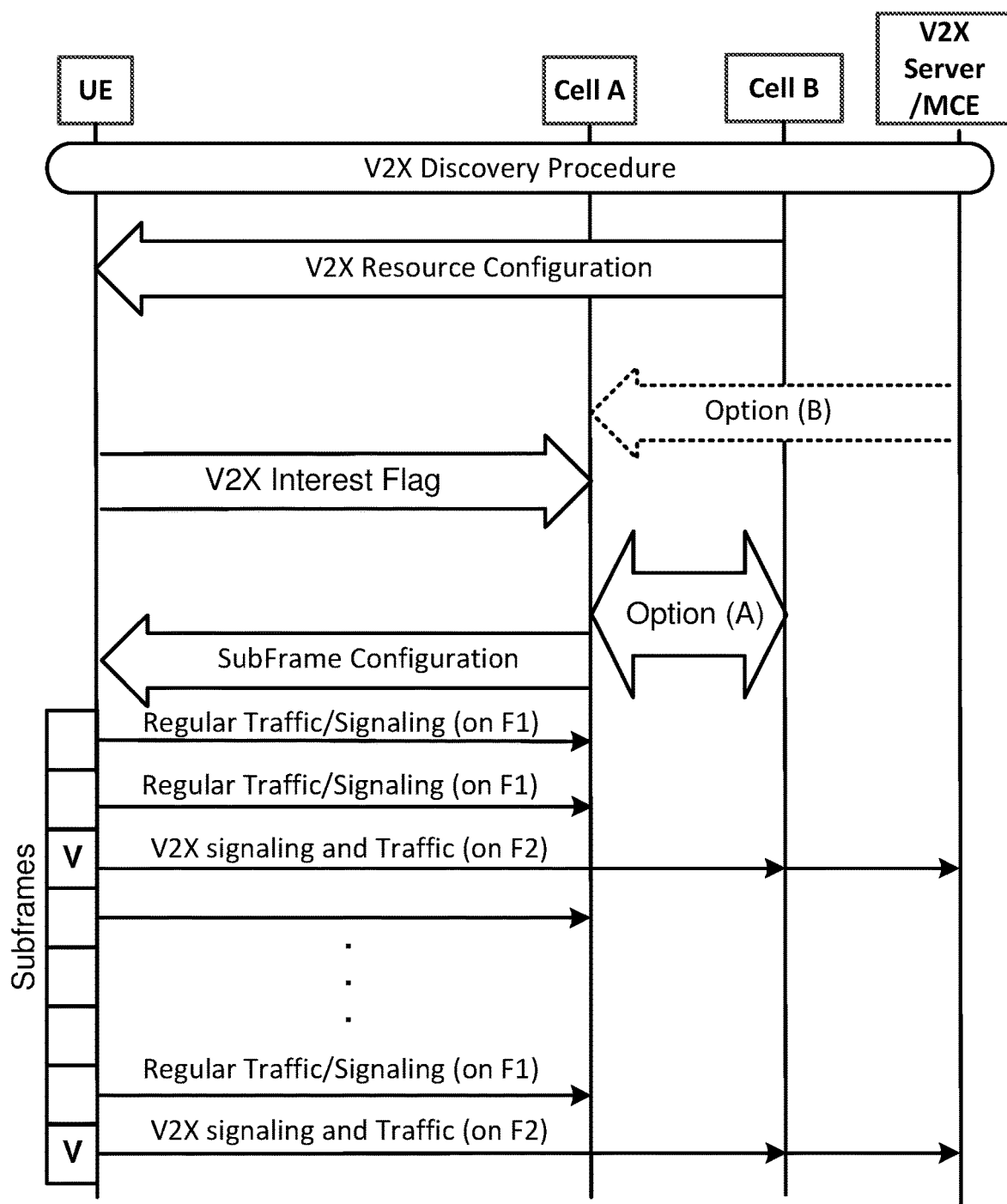
FIG. 23 is an example diagram depicting example signaling flow as per an aspect of an embodiment of the present disclosure.

In an example embodiment, the core network (e.g. MCE) or eNB B (e.g. via Cell B) configures the timing and resource configuration for V2X transmission to UEs independent of eNB A (e.g. for Cell A) and communicates such configurations via X2 interface (Option A in FIG. 23). Cell A may avoid/reduce conflicting assignments for UEs using target V2X services, e.g. UE1. In another example such information may be provided by the core network where MCE shares scheduling decisions on eMBMS and SC-PTM subframes also to those cells not offering these services (Option B in FIG. 23) such as eNB A (e.g. Cell A) in this example so that resource allocation conflicts may be avoided/reduce by eNB A (e.g. for Cell A). In an example, some of the eMBMS and SC-PTM configuration parameters may be exchanged in option A and B. For example, subframe configurations, RB configurations, cell information, service information and/or frequency configurations may be communicated.

The V2X resource configuration information to eNB A (e.g. for Cell A), which may be sent by V2X Server or from eNB B (e.g. Cell B), may comprise information on subframes reserved for V2X services across different frequencies. In an example, the V2X configuration message may include frequency in which V2X is offered, in the example F2, and a bit map showing pattern of V2X subframes reserved for V2X.

FIG. 23 shows an example multiCell V2X coordination in the same PLMN, Option A with X2 signaling and Option B with Core Network signaling. In an example, UE1 that is connected to eNB A (e.g. Cell A) as primary cell communicates with eNB A (e.g. Cell A) its interest in V2X services from eNB B (e.g. Cell B) through a V2X interest flag. This interest flag may include information about which V2X services UE1 is interested and their priority over other services offered by eNB A (e.g. Cell A). For this UE1 the eNB A (e.g. Cell A) may partition time resources, e.g. subframes, in downlink and/or uplink as needed, according to a configuration for communications with eNB A (e.g. Cell A) and according to another configuration for UE to communicate with eNB B (e.g. Cell B). eNB A (e.g. Cell A) may transmit a resource (frequency and/or subframe) configuration message (e.g. subframe configuration message) to the UE indicating the frame/subframe and/or frequencies of V2X service. The UE may use this information for receiving data/traffic from eNB A (e.g. Cell A) and V2X traffic from eNB B (e.g. Cell B). Example messages are shown in FIG. 22. Messages may be transmitted in a different order as shown in FIG. 23.

In an example, the time resources in downlink may be partitioned between eNB A (e.g. Cell A) and eNB B (e.g. Cell B) communications with the UE, and uplink time resources may be managed and assigned by eNB A (e.g. Cell A). In this case V2X related uplink traffic may be routed through eNB A (e.g. Cell A) to V2X server. Uplink V2X traffic may be transmitted via semi-persistent scheduling. The UE may receive configuration and grants for uplink SPS from eNB A (e.g. Cell A). In an example, some of the uplink V2X traffic may be received via eNB A (e.g. Cell A) and some of the uplink V2X traffic may be transmitted via eNB B (e.g. Cell B).

In an example, where a UE may communicate with eNB B (e.g. Cell B) in uplink for V2X, the UE also includes in the V2X interest flag information about subframe used by UE in the uplink for V2X services e.g. based on uplink SPS configurations by eNB B (e.g. Cell B).

In an example, for UEs which can communicate in one frequency at the time, eNB A (e.g. Cell A) may avoid/reduce communicating with UE1 on frequency F1 on subframes designated for V2X on Frequency F2. In another example for UEs which can communicate on multiple frequencies at the same time, e.g. for carrier aggregation, eNB A (e.g. Cell A) may take into account UEs engagement on Frequency F2 on V2X subframes and avoid any secondary cell time/frequency assignment which may conflict with UE1's V2X communication based on UEs capabilities. In an example, frequencies F1 and F2 may be the same frequency.

In an example, Cell B may be part of a different eNB as Cell A and also in a different operator's network, e.g. in the different PLMN. In this case Cell B and Cell A are connected to different core networks and operate independently and may not be able to communicate via direct interface. The two cells, Cell A and B in this example, may also have different timing configuration and may not be synchronized. In this example the information of time resources occupied by V2X services on Cell B may be preconfigured and semi-static and be exchanged with eNB A (e.g. Cell A) operator in management plane (Option 1 in FIG. 24).

Given the two cells may not be synchronized, additional timing reference synchronization information may also be included. In an example this information may include current System Frame Number (SFN) and Subframe (SF) number of the coordinating cells. For example when eNB B (e.g. Cell B) is used for V2X services and eNB A (e.g. Cell A) is the primary cell for a UE, Cell B's network may inform eNB A (e.g. Cell A)'s network through management plane about eNB B (e.g. Cell B)'s current SFN and Subframe number as well as patterns of subframes which are reserved for V2X communication on Frequency F2.

Figure 24:
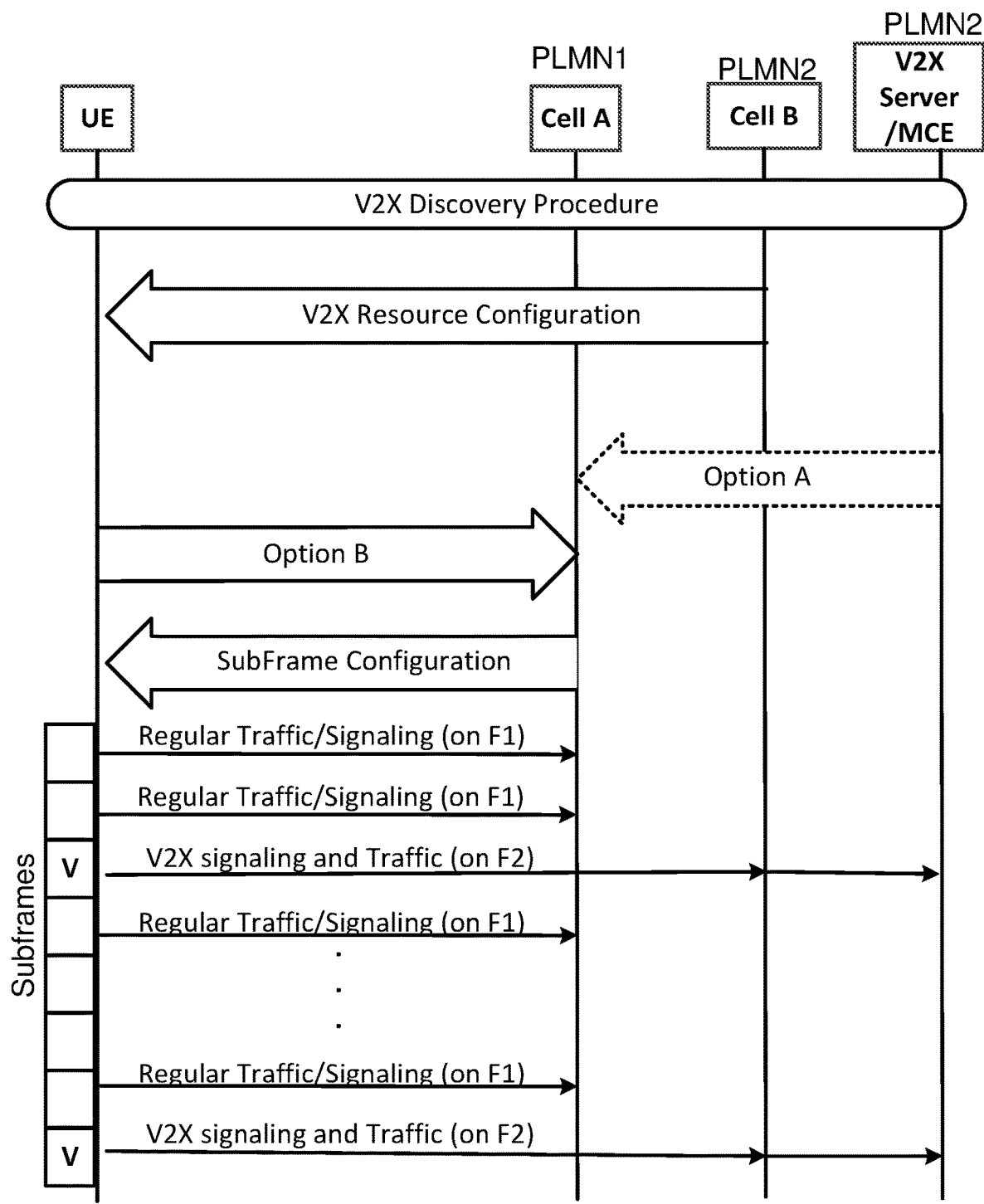
FIG. 24 is an example diagram depicting example signaling flow as per an aspect of an embodiment of the present disclosure.

FIG. 24 shows an example multi-cell V2X Coordination in different PLMN, Option A with inter-PLMN management signaling and Option B with UE Interest Indication. In another example, (Option B in FIG. 24) UE1 who is receiving V2X related timing resource configuration from eNB B (e.g. Cell B) over air interface will provide eNB A (e.g. Cell A) with such information e.g. through an RRC message. A new V2XInterestIndication message or an extension to existing MBMSInterestIndication Message may be used to convey this information to eNB A (e.g. Cell A).

In an example UE determines the union of time resources, e.g. subframes, which are needed for communication with eNB B (e.g. Cell B) for eMBMS/SC-PTM or SPS reception or uplink SPS transmissions, e.g. for V2X services of the UE. In an example the UE may communicate such subframe information as well as operating frequencies, in this case frequency F2, to Cell A. In an example this information may be communicated with an N bit map for each frequency, where each bit position $1 \leq i \leq N$ indicates whether subframe i in the set is reserved for V2X, so that eNB A (e.g. Cell A) avoids/reduces use of such subframes it is resource allocation to the UE. When eNB A (e.g. Cell A) and eNB B (e.g. Cell B) are not synchronized, e.g. there are part of different networks, the UE may also include System Frame Number (SFN) and SubFrame (SF) number of eNB B (e.g. Cell B) in V2XInterestIndication so that eNB A (e.g. Cell A) may determine exact timing of V2X subframes used by UE and eNB B (e.g. Cell B).

In an example the V2XInterestIndication may comprise a V2X priority flags for eNB A (e.g. Cell A) showing if UE considers some V2X traffic and communication with eNB B (e.g. Cell B) as priority over other unicast communication with eNB A (e.g. Cell A) or not. eNB A (e.g. Cell A) may avoid allocating resources to UE1 which conflicts with V2X communication of UE1 and eNB B (e.g. Cell B) unless such allocations are for services which have higher priority over V2X services based on UE preference indicated in the V2XInterestIndication.

In example embodiments, downlink subframe configuration used for V2X, e.g. those configured for eMBMS and SC-PTM transmission, may be exchanged in the network via X2 interface and/or core network signaling. For example, downlink subframe configuration may be common across different UEs.

Information about UE specific V2X subframes for downlink and uplink V2X service may be transmitted via a UE to the base station. UE specific information, e.g., may include SPS configurations and/or UE's priority preferences. A UE may transmit this information to an eNBvia an V2XinterestIndication message. V2X interest Indication may comprise subframe configuration for UE V2X related subframes. For example, it may be a subframe bit map for a frequency. The priority preferences may indicate the UE priority for a service compared with other services.

In an example, UE specific signaling V2X information may be communicated via X2 interface between base stations. A base station may transmit information about V2X subframes and/SPS scheduling of one or more UEs to another base station. The another base station may use this information for scheduling downlink/uplink traffic.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages. In an example, an IE may be a sequence of first parameters (first IEs). The sequence may comprise one or more first parameters. For example, a sequence may have a length max length (e.g. 1, 2, 3, etc). A first parameter in the sequence may be identified by the parameter index in the sequence. The sequence may be ordered.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/ simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
  receiving, by a base station from a wireless device, a plurality of capability parameters comprising a first sequence of one or more parameters indicating whether a vehicle-to-everything (V2X) transmission is supported in a corresponding frequency band combination of a second sequence of frequency band combinations of the wireless device, wherein:
  an index of a parameter in the first sequence identifies the corresponding frequency band combination in the second sequence; and
  the corresponding frequency band combination comprises one or more frequency band identifiers each indicating a specific frequency band; and
  transmitting V2X configuration parameters of a cell operating in one of the frequency band combinations on which the wireless device supports the V2X transmission;
  wherein the plurality of capability parameters are configured to indicate a supported list of frequency band combinations on which the wireless device supports the V2X transmission and to indicate configuration parameters for the supported list of frequency band combinations.

2. The method of claim 1, wherein the V2X configuration parameters comprises:
- a semi-persistent scheduling (SPS) radio network temporary identifier (RNTI);
- at least one SPS configuration parameter; and
- an SPS configuration index for the at least one SPS configuration parameter.

3. The method of claim 2, further comprising transmitting a downlink control information (DCI) corresponding to the SPS RNTI, the DCI comprising the SPS configuration index.

4. The method of claim 3, wherein:
- the DCI indicates activation of at least one SPS configuration corresponding to the SPS configuration index; and
- the DCI further comprises at least one resource parameter.

5. The method of claim 3, wherein the at least one SPS configuration parameter comprises at least one parameter indicating one or more traffic types.

6. The method of claim 3, wherein the DCI comprises at least one parameter indicating one or more traffic types.

7. The method of claim 1, wherein an index of a first capability parameter in the first sequence identifies a corresponding first frequency band combination in the second sequence.

8. The method of claim 1, wherein the V2X configuration parameters are associated with sidelink SPS resources.

9. The method of claim 1, wherein the V2X configuration parameters are associated with uplink SPS resources.

10. The method of claim 2, wherein an index of a first capability parameter in the first sequence identifies a corresponding first frequency band combination in the second sequence.

11. A method comprising:
- transmitting, by a wireless device to a base station, a plurality of capability parameters comprising a first sequence of one or more parameters indicating whether a vehicle-to-everything (V2X) transmission is supported in a corresponding frequency band combination of a second sequence of frequency band combinations of the wireless device, wherein:
- an index of a parameter in the first sequence identifies the corresponding frequency band combination in the second sequence; and
- the corresponding frequency band combination comprises one or more frequency band identifiers each indicating a specific frequency band; and
- receiving V2X configuration parameters of a cell operating in one of the frequency band combinations on which the wireless device supports the V2X transmission;
- wherein the plurality of capability parameters are configured to indicate a supported list of frequency band combinations on which the wireless device supports the V2X transmission and to indicate configuration parameters for the supported list of frequency band combinations.

12. The method of claim 11, wherein the V2X configuration parameters comprises:
- a semi-persistent scheduling (SPS) radio network temporary identifier (RNTI);
- at least one SPS configuration parameter; and
- an SPS configuration index for the at least one SPS configuration parameter.

13. The method of claim 12, further comprising receiving a downlink control information (DCI) corresponding to the SPS RNTI, the DCI comprising the SPS configuration index.

14. The method of claim 13, wherein:
- the DCI indicates activation of at least one SPS configuration corresponding to the SPS configuration index; and
- the DCI further comprises at least one resource parameter.

15. The method of claim 13, wherein the at least one SPS configuration parameter comprises at least one parameter indicating one or more traffic types.

16. The method of claim 13, wherein the DCI comprises at least one parameter indicating one or more traffic types.

17. The method of claim 11, wherein an index of a first capability parameter in the first sequence identifies a corresponding first frequency band combination in the second sequence.

18. The method of claim 11, wherein the V2X configuration parameters are associated with sidelink SPS resources.

19. The method of claim 11, wherein the V2X configuration parameters are associated with uplink SPS resources.

20. The method of claim 1, wherein each of the configuration parameters is configured to indicate at least one of: a transmit power class, uplink and sidelink configuration, modulation configuration, or configuration of link parameters and timers for each band in the band combination, wherein the frequency band combination comprises a list of band identifiers.

* * * * *